US005990572A

United States Patent [19]

Yasukuni et al.

[11] Patent Number: 5,990,572

[45] Date of Patent: Nov. 23, 1999

[54] ELECTRIC CIRCUIT BREAKER FOR VEHICLE

[75] Inventors: Jun Yasukuni, Yokkaichi; Masahiro Kume, Nagoya; Yoshikado Hosoda, Nagoya; Motonori Kido, Nagoya; Fukuma Sakamoto, Nagoya; Hideaki Toyama, Nagoya; Akio Matsumaru, Nagoya; Masasi Sugimoto, Nagoya, all of Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 08/982,302

[22] Filed: Dec. 1, 1997

[30] Foreign Application Priority Data

| | | | |
|---|---|---|---|
| Feb. 28, 1997 | [JP] | Japan | 9-046219 |
| Feb. 28, 1997 | [JP] | Japan | 9-046220 |
| Feb. 28, 1997 | [JP] | Japan | 9-046221 |
| Feb. 28, 1997 | [JP] | Japan | 9-046222 |

[51] Int. Cl.$^6$ .......... B60L 1/00

[52] U.S. Cl. .......... 307/10.1; 180/271; 280/734; 280/735

[58] Field of Search .......... 307/9.1, 10.1, 307/121; 180/282, 271; 280/734, 735; 340/438

[56] References Cited

U.S. PATENT DOCUMENTS

| | | | |
|---|---|---|---|
| 3,700,970 | 10/1972 | Miyoshi | 317/58 |
| 3,743,849 | 7/1973 | Iwata | 307/10 R |
| 3,848,099 | 11/1974 | Christian et al. | 200/61.8 |
| 3,848,100 | 11/1974 | Kozorezo et al. | 200/61.8 |
| 3,851,219 | 11/1974 | Kozorezov et al. | 317/40 A |
| 3,873,786 | 3/1975 | Lagofun | 200/61.8 |
| 5,034,620 | 7/1991 | Cameron | 307/10.7 |
| 5,389,824 | 2/1995 | Moroto et al. | 307/10.1 |
| 5,481,139 | 1/1996 | Lucas | 307/9.1 |
| 5,757,150 | 5/1998 | Kinoshita et al. | 318/139 |
| 5,808,253 | 9/1998 | Hatakeyama | 200/61.8 |
| 5,818,122 | 10/1998 | Miyazawa et al. | 307/10.7 |

FOREIGN PATENT DOCUMENTS

| | | |
|---|---|---|
| U-56-357 | 1/1981 | Japan . |
| A-58-47809 | 3/1983 | Japan . |

*Primary Examiner*—Jeffrey Gaffin
*Assistant Examiner*—Ed Garlepp
*Attorney, Agent, or Firm*—Oliff & Berridge, PLC

[57] ABSTRACT

An electric circuit breaker for interrupting an electric circuit of a vehicle includes a circuit break section having an explosive used for exploding a part of an electric circuit by explosion, a detonating device for exploding the explosive by application of electric power to the explosive, a collision detection device for detecting a collision of the vehicle and, a controller which explodes the explosive by supply of an electric current for detonating purposes to the detonating device in response to a detection signal from the collision detection device. The circuit breaker further includes a housing having a cylindrical member, such as an inner cylindrical portion, and a cover for covering the opening of the inner cylindrical portion. Connector terminals are formed on both ends of the conductor and a horizontal target section to be broken is formed in the middle of the conductor. The horizontal target area is disposed in front of the opening of the cylindrical member and the connector terminals are led to the outside of the housing. The explosive and a filament serving as means for heating the explosive are provided in the cylindrical member. The blasting force of the explosive that causes explosion by heating acts on the horizontal target area in a concentrated manner.

26 Claims, 32 Drawing Sheets

ELECTRIC CIRCUIT BREAKER FOR VEHICLE

BACKGROUND OF THE INVENTION

The present invention relates to an electric circuit breaker which automatically interrupts an electric circuit in the event of an abnormality such as an overload current or a short-circuit current. More particularly, the electric circuit breaker also automatically interrupts an electric circuit in the event of collision of a vehicle.

A general electric circuit for automobile purposes employs a fuse or a fusible link as means for immediately interrupting a circuit in case of an overload current or short-circuit current. The fuse or fusible link principally comprises a fusible conductor housed in a container and connector terminals extended to the outside of the container. Many of the fuses or fusible links are used while being connected to electric connector boxes.

Since the fuse or fusible link is originally intended to interrupt a circuit only after occurrence of an excess current, it is impossible for the fuse or fusible link to forcefully interrupt a circuit at desired timing. In the event of an emergency, such as a car accident, if forceful interruption of a circuit is desired even when there is not a flow of an excess current, it is necessary to provide the electric circuit with a circuit breaker capable of forcefully interrupting a circuit by external operation, in place of or in addition to the fuse or fusible link.

For such purposes, as described in e.g., Unexamined Japanese Utility Model Publication 56-357, an existing electric circuit breaker is configured in the following manner. Namely, a fuse ground switch is positioned between loads connected to a main fuse and a ground terminal within a circuit which supplies power to the loads from a battery via a sealed main fuse. A switch controller which turns off the fuse ground switch is positioned between the loads connected to the main fuse and the ground terminal. A collision detection sensor which activates the switch controller in the event of a collision of the vehicle is connected to the switch controller. In the event of collision of a vehicle, the fuse ground switch is turned off, thereby permitting flow of a large electric current to a sealed main fuse. The main fuse is fused, thereby interrupting supply of an electric current to vehicle loads.

Alternatively, Unexamined Japanese Patent Publication 58-47809 describes a circuit breaker of the type which forcefully breaks a conductor by utilization of blasting force of an explosive. The circuit breaker has single encapsulation glass in which an output fuse, an explosive, and a filament for heating the explosive are filled. An input terminal connected to the filament is led to the outside of the encapsulation glass so as to penetrate through the encapsulation glass. The surface of the encapsulation glass is covered with an explosion-proof film.

In such a circuit breaker, an electric current or voltage greater than a given value is applied to the input terminal in order to heat the filament, thereby blasting the explosive. The conductor can be forcefully ruptured by utilization of the blasting force of the explosive. As a result, in the event of an abnormal condition such as a short circuit in an electric circuit or an emergency condition such as a car accident, the circuit can be interrupted at desired timing by control of the electric current or voltage applied to the input terminal.

In the former electric circuit breaker described in the a foregoing publication (JP(UM) 56-357), a collision-reaction switch constituting the collision detection sensor is turned off at the time of collision of a vehicle, whereby the switch controller turns off the fuse ground switch. As a result, a large electric current commences flowing to the main fuse. Since it takes given time to fuse the main fuse since the electric current is supplied to the main fuse, the electric circuit cannot be immediately interrupted. Particularly, in order to interrupt an electric circuit by fusing a fusible link made of the main fuse, it takes long time to fuse the fusible link.

A self-hold relay constituting the switch controller prevents the circuit breaker from being erroneously operated under the influence of vehicle vibrations or prevents a contact point of the relay from being broken before the main fuse is fused. In order to cause the self-hold relay to withstand a large current supplied from the vehicle power source in the event of a short circuit in the electric circuit, a self-hold relay having a large contact capacity must be used. For this reason, the self-hold relay becomes inevitably bulky. When such a self-hold relay is mounted on a vehicle, it becomes difficult to ensure space for the relay.

In the latter circuit breaker described in the foregoing patent publication (JP 58-47809), the blasting force of the explosive is diffused in all directions within the encapsulation glass, and only a small fraction of the blasting force acts on the output fuse. For this reason, in order to ensure the rupture of a fuse, a considerable amount of blasting force as a whole is required to thoroughly break the fuse. If the blasting force is increased by an increase in the amount of explosive, there will also arise an increase in the blasting force acting on the inner surface of the encapsulation glass other than the output fuse. In order to render the encapsulation glass impervious to the increased blasting force, expensive material needs to be used for the encapsulation glass, or the glass must be subjected to special treatment, thereby entailing an increase in cost.

Furthermore, a filament constituting detonating means for exploding an explosive by heating is connected to a power source via lead wires. Upon receipt of a signal representing an abnormality; i.e., application of an electric current or voltage greater than a certain value, the filament is heated, thereby exploding the explosive. In such a configuration, if there is a flow of an electric current to the filament owing to faulty operation during the assembly of the electric circuit breaker or owing to noise due to a disturbance, there arises a risk of erroneous explosion of the explosive.

SUMMARY OF THE INVENTION

The present invention has been accomplished in view of the foregoing problem in the art, and the object of the present invention is to provide an electric circuit breaker which enables abrupt interruption of an electric circuit through use of a simple and compact structure in the event of collision of a vehicle.

Second object of the present invention is to provide a circuit breaker which ensures urgent and safe interruption of a circuit through use of a simple and inexpensive structure by efficient application of the blasting energy of an explosive to an area to be ruptured.

Third object of the present invention is to provide an electric circuit breaker which is capable of reliably preventing erroneous explosion of an explosive by means of a simple and compact structure.

In accordance with a first aspect of the present invention, there is provided an electric circuit breaker for interrupting an electric circuit of a vehicle, comprising a circuit break section having an explosive used for exploding a part of the electric circuit by explosion and detonating means for exploding the explodes by application of electric power to the explodes; collision detection means for detecting a collision of a vehicle; and control means which explodes the explosive by supply of an electric current for detonating purposes to the detonating means in response to a detection signal from the collision detection means.

With the foregoing structure, an electric current for detonating purposes is supplied to the detonating means in response to a detection signal output from the collision detection means at the time of collision of a vehicle. As a result, the detonating means is heated so as to explode the explosive, thereby instantaneously breaking a part of the electric circuit. The electric current flows to the vehicle loads connected to the electric circuit, thereby effectively preventing damage to the vehicle loads.

Furthermore, in accordance with the first aspect of the present invention, in the electric circuit breaker as mentioned above, the explosive is positioned so as to break a part of a power line connecting a vehicle power source with a collection section of electric wires connected to a plurality of vehicle loads.

With the foregoing structure, an electric current for detonating purposes is supplied to the detonating means in response to a detection signal output from the collision detection means at the time of collision of a vehicle. As a result, the explosive causes explosion, thereby instantaneously breaking the power line. The electric current is prevented from flowing to the plurality of vehicle loads connected to the respective electric wires branched out from the power line.

Moreover, in accordance with the first aspect of the invention, the electric circuit breaker as mentioned above the explosive is positioned so as to break a fusible link connected across a power line which connects a vehicle power source with a collection section of electric wires connected to a plurality of vehicle loads.

With the foregoing structure, an electric current for detonating purposes is supplied to the detonating means in response to a detection signal output from the collision detection means at the time of collision of a vehicle. As a result, the explosive causes explosion, thereby instantaneously breaking the fusible link connected across the power line. The electric current is prevented from flowing to the plurality of vehicle loads connected to the respective electric wires branched out from the power line.

In accordance with a second aspect of the present invention, there is provided an electric circuit breaker comprising a housing which is made of insulating material and includes a cylindrical member having at least one opening in one direction and a cover for covering the opening of the cylindrical member in such a way as to ensure conductor storage space between the opening and the cover; a conductor which has connector terminals at both ends and an area capable of being broken in the middle of the conductor; the area to be broken of the conductor being disposed in front of the opening of the cylindrical member within the conductor storage space; portions between the area to be broken and the connector terminals being provided so as to pass through the housing; the connector terminals being led to the outside of the housing; means which heats an explosive by receipt of power supply from outside being provided in the cylindrical member together with an explosive; and the area to be broken being broken by means of blasting force of the explosive.

With such a structure, the explosive and the means for heating the explosive are provided in the cylindrical member having an opening directed to the area to be broken. Therefore, when the explosive causes explosion by heating by means of the heating means, the blasting force of the explosive concentrates on the area to be broken. As a result, the area to be broken can be thoroughly broken by means of a comparatively small amount of blasting force. Accordingly, the damage which the housing receives as a result of the blasting force can be significantly reduced. For this reason, a circuit can be thoroughly broken in a safe manner without use of expensive material for the housing or without subjecting the housing to special treatment.

Although the explosive and the heating means may be loaded into the cylindrical member, exactly as they are, an explosive sealing section is formed by encapsulation of the explosive and the heating means into a sealing member, and the thus-formed explosive sealing section is loaded into the cylindrical member. A step of setting an explosive can be facilitated, and there is the advantage of rendering the explosive, or the like, waterproof and dustproof in a reliable manner.

In this case, the explosive and the heating means may be integrally molded, or the explosive and the heating means may be encapsulated in a capsule, the explosive sealing section can be manufactured in a simple structure. In the latter case, if the capsule is formed from resin possessing heat shrinkable properties, the explosive and the heating means can be readily sealed in the capsule only by heating the entrance of the capsule until it shrinks after the explosive and the heating means have been loaded in the capsule.

Although the overall housing may be integrally molded, the housing may be formed from a housing body and the cylindrical member. Specifically, the housing body comprises an outer sheath which has an opening to permit communication between inside and outside of the housing body and the cover. An inner cylindrical portion having an opening formed at one end is inserted into the outer sheath in such a way that the opening of the inner cylindrical portion is directed toward the inside of the housing body. The explosive is loaded into the inner cylindrical portion. With such a structure, an explosive can be loaded in simple operation, such as by taking out only the inner cylindrical portion, by loading the explosive sealing section into the inner cylindrical portion, and by insertion of the overall inner cylindrical portion into the outer sheath.

If a small diameter cylindrical section having a diameter smaller than that of the cylindrical member is provided between the area to be broken and the explosive integrally formed with the heating means within the cylindrical member, the degree of concentration of blasting force on the area to be broken can be increased to a much greater extent.

If the inner peripheral surface of the small diameter cylindrical section is tapered toward the area to be broken, a loss of blasting force is reduced, thereby enabling an increase in the degree of concentration of blasting force on the area to be broken.

Preferably, a protective member is disposed outside the housing so as to cover the same. As a result, a higher degree of safety can be ensured by means of the high-strength protective member provided outside the housing even in a case where the housing is formed from light-weight synthetic resin which is easy to form, or where communication holes are formed in the cover so as to permit communication between the inside and outside of the cover, to thereby prevent the rupture of the cover while preventing a sharp increase in the internal pressure of the cover stemming from explosion.

A filter may be provided on a cover section in which the communication holes are formed. With such a structure, broken pieces are prevented from being scattered from the communication holes at the time of explosion of the explosive by means of the filter without impairing the feature of suppressing an increase in the internal pressure obtained as a result of the communication holes.

A waterproof section for covering the communication holes may be ensured in the cover section, and the waterproof section may be broken by means of the blasting force of the explosive. As a result, moisture can be prevented from entering the inside of the cover through the communication holes by means of the waterproof section in normal times. Air escapes from the inside of the cover to outside through the communication holes by rupture of the waterproof section at the time of explosion of the explosive, thereby enabling prevention of a rise in the internal pressure of the cover.

The housing body may be formed from a bottom plate for covering the lower surface of the cylindrical member into which the explosive is loaded, an upper cover for covering the bottom plate and the cylindrical member from above, and a lower cover for covering the same from below. The lower end of the upper cover and the upper end of the lower cover may be joined together while they are overlapped each other. In such a case, the circumference of the cylindrical member into which the explosive is loaded is covered with the upper cover and the lower cover, thereby effectively preventing the housing body from being affected by the blasting force of the explosive.

In a case where the lower cover is integrally formed so as to cover the lower outer surface of the upper cover and the outer surface of the bottom plate, the bottom plate, the upper cover, and the lower cover are tightly connected to each other, thereby enabling an improvement in the bonding strength between the members and the air-tightness of the housing body.

Although the foregoing circuit breaker can be disposed in a suspended position, if the housing or the conductor is fixed on the base, the loss of explosion energy can be reduced to a much greater extent. The breaking force exerted on the area to be broken is increased further by means of the reactive force which the area to be broken receives from the base.

So long as the housing or the conductor is fixed on the outer surface of an electric connection box, and the connector terminals are electrically connected to a circuit within the electric connection box, the need for a wire, such as a cable, for connecting the conductor to the electric connection box is eliminated, thereby simplifying the overall circuit breaker system.

In accordance with a third aspect of the present invention, there is provided an electric circuit breaker including an explosive for breaking an electric circuit and detonating means for exploding the explosive by application of electric power to the explosive, the electric circuit breaker further comprising: a break member which, as a result of explosion of the explosive, projects toward an area of the electric circuit to be broken.

With the foregoing structure, if the detonating means is activated by supply of an electric current for detonating purposes to the detonating means under abnormal circuit conditions, the explosive cause explosion, whereby the break member projects. This break member breaks the area of the electric circuit to be broken.

Furthermore, in accordance with the third aspect of the present invention, in the electric circuit breaker as mentioned above, the break member is formed from an insulating material.

With the foregoing structure, if the electric current for detonating purposes is supplied to the detonating means under abnormal circuit conditions to thereby activate the detonating means. As a result, the explosive explodes, and the break member formed from insulating material projects toward the area to be broken so as to break the area to be broken.

Moreover, in accordance with the third aspect of the invention, in the electric circuit breaker as mentioned above, the area of the electric circuit to be broken, an explosive, and the detonating means are housed in the housing, and a hold section is provided in the housing and holds the break member projected as a result of the explosion of the explosive; and wherein the area to be broken is held in a separated state by means of the break member retained by the hold member after the area has been broken.

With the foregoing structure, if the electric current for detonating purposes is supplied to the detonating means under abnormal circuit conditions to thereby activate the detonating means. As a result, the explosive explodes, and the break member formed from insulating material projects toward the area to be broken so as to break the area to be broken. After having been broken, the area to be broken is held in a separated state by means of the break member retained by the hold member.

In accordance with a fourth aspect of the present invention, there is provided an electric circuit breaker comprising an explosive which breaks a part of the electric circuit by explosion; detonating means for exploding the explosive by application of electric power to the explosive; a pair of lead wires which supply an electric current for detonating purposes to the detonating means; a short-circuit plate for making a short circuit in the lead wires; and release means which releases the lead wires from a short circuit state to their original state by separating the short-circuit plate from the lead wires when the electric circuit breaker is in use.

With the foregoing structure, the pair of lead wires connected to the detonating means are held in a short-circuit state by means of the short-circuit plate. Therefore, even if the electric current for detonating purposes is erroneously supplied to the lead wires during the assembly of the electric circuit breaker, the detonating means is prevented from being activated. When the electric circuit is in use, the short-circuit plate is separated from the lead wires, thereby releasing the lead wires from a short-circuit state. In contrast, if the electric current for detonating purposes is supplied to the lead wires in the event of an abnormality, the detonating means is activated to explode the explosive.

Furthermore, in accordance with the fourth aspect of the present invention, the electric circuit breaker as mentioned above further comprises an area of the electric circuit to be broken; a housing for storing the explosive and the detonating means; a pair of connectors which connect the lead wires connected to the detonating means with another lead wire connected to power-application control means; the connector connected to the detonating means being provided in the housing; the short-circuit plate which makes a short circuit in the pair of lead wires connected to the connector coupled to the detonating means; and the release means which releases the lead wires held in a short circuit state by means of the short-circuit plate to their original state in response to the connection of the lead wires to the connectors.

With the foregoing structure, the pair of lead wires connected to the connector within the housing are in a short circuit state by means of the short-circuit plate. Even in a case where the electric current for detonating purposes is erroneously fed to the lead wires during the assembly of the electric circuit breaker, the detonating means is prevented from being activated. When the electric circuit breaker is in use, the connector connected to the power-application control means is connected to the connector provided in the housing, so that the short-circuit plate is separated from the lead wires, to thereby release the lead wires from a short-circuit state.

Moreover, in accordance with the fourth aspect of the invention, in the electric circuit breaker as mentioned above, the connector provided in the housing is fixed to the housing through use of sealing material comprising synthetic resin material.

With the foregoing structure, the area in the housing where the connector is provided is sealed by means of the sealing material, to thereby prevent moisture from entering the housing through the area where the connector is provided.

Still further, in accordance with the fourth aspect of the invention, in the electric circuit breaker as mentioned above, a seal ring is provided between the connector provided in the housing and the connector connected to the power-application control means.

With the foregoing structure, the connector connected to the detonating means provided in the housing is connected to the connector coupled to the power-application control means, whereby the seal ring is interposed between the mating portions of the connectors. As a result, moisture is prevented from entering the housing through the area where the connector is provided by means of the seal ring.

DETAILED DESCRIPTION OF THE PREFERRED EMBODIMENTS

First Embodiment

Figure 1:
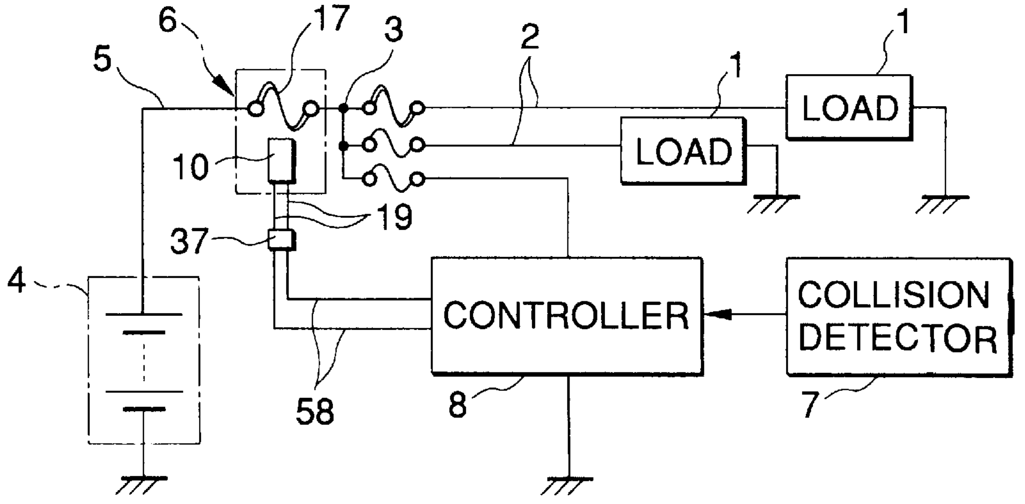
FIG. 1 is a schematic diagram representing one example of an electric circuit having an electric circuit breaker in accordance with the present invention.

FIG. 1 shows an electric circuit of a vehicle having an electric circuit breaker in accordance with an embodiment of the present invention. The electric circuit comprises a collection section 3 where electric wires 2 respectively connected to a plurality of vehicle loads 1 are brought together into one line; a circuit break section 6 which interrupts the electric circuit by rupture of a part of a power line 5 by way of which the collection section 3 is connected to a vehicle power source 4; collision detection means 7 for detecting collision of the vehicle; and control means 8 which controls the circuit break section 6 in such a way that it is activated in response to a detection signal from the collision detection means 7.

Figure 2:
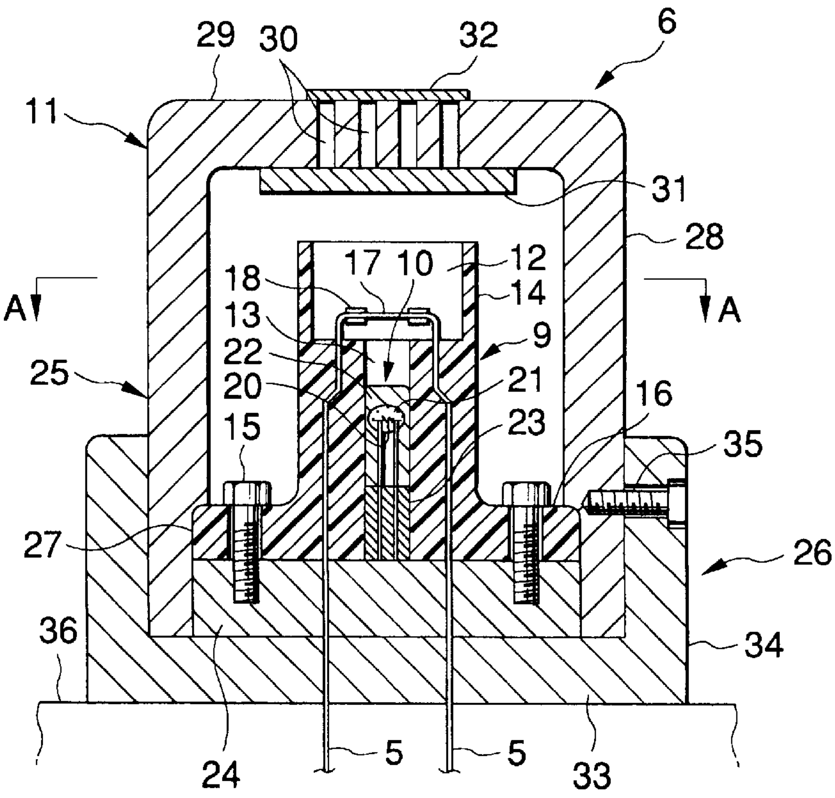
FIG. 2 is a cross-sectional view showing a specific structure of a circuit break section according to a first embodiment of the present invention.
Figure 3:
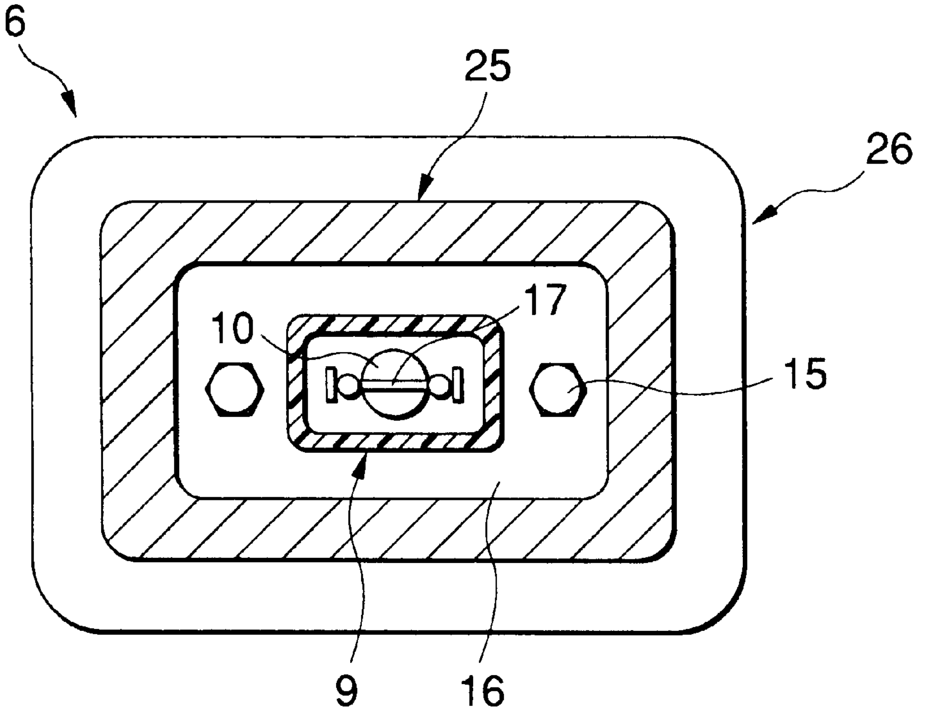
FIG. 3 is a cross-sectional view taken across line A—A shown in FIG. 2.

As shown in FIGS. 2 and 3, the circuit break section 6 comprises a hold member 9 for holding the power line 5; an explosive sealing section 10 disposed within the hold member 9; and a housing 11 which surrounds the hold member 9. The hold member 9 comprises a main body 14 and a mount 16. An opening 12 for explosion purposes is formed in an upper portion of the main body 14, and an opening 13 used for holding the explosive sealing section 10 is formed in a position below the opening 12. The mount 16 is mounted on the housing 11 by means of mount bolts 15. The hold member 9 is formed from insulating material; e.g., high-strength synthetic resins possessing heat resistance such as ceramics, nylon resin containing glass fillers, or PPS resins.

An area to be broken 17 (hereinafter referred to as a target area) is horizontally positioned within the opening 12 of the hold member 9. Heat reservoirs 18 are attached to the upper ends of respective segments of the power line 5 extending in an upward direction through the main body 14 of the hold member 9, and both ends of the target area 17 are connected to the upper ends of the segments of the power line via the heat reservoirs 8. The target area 17 is formed from a thin-walled fusible link in order to ensure that it is broken by the blasting force of an explosive 21 provided in the explosive sealing section 10. Further, the target area 17 is formed so as to be fused in the event of an excess current.

The explosive sealing section 10 is formed by sealing into a sealing member 22 detonating means comprising an electric heater wire 20 connected at both ends to lead wires 19 and the explosive 21 surrounding the detonating means. The lead wires 19 are downwardly led outside through the sealing member 22. Epoxy resin or rubber-like resin is suitable for the sealing member 22. The sealing member 22 is molded indirectly or directly so as to integrally involve the electric heater wire 20 and the explosive 21. The explosive sealing section 10 is inserted into the opening 13 of the hold member 9, and epoxy resin 23 is filled into a lower portion of the opening 13, thereby sealing the lower portion of the explosive sealing section 10.

The housing 11 comprises a bottom plate 24 to which the mount 16 of the hold member 9 is screwed; an upper cover 25 fitted to the bottom plate 24 so as to cover the same from above; and a lower cover 26 fitted to the upper cover 25 so as to cover the circumference of a lower portion of the upper cover 25. The lower cover 26 and the bottom plate 24 are formed from insulating material such as synthetic resin, or the like. Further, the upper cover 25 is formed from synthetic resin or metallic material.

The upper cover 25 comprises a cylindrical portion 28 and a top plate 29 for covering the upper end of the cylindrical portion 28. A stepped portion 27 which abuts the edge of the upper surface of the mount 16 of the hold member 9 is formed on the internal surface in a lower portion of the cylindrical portion 28. A plurality of air-release holes 30 are formed at the center of the-top plate 29. Further, a filter 31 which is formed from meshed or porous metallic material possessing superior heat resistance or heat conductivity is attached to a lower surface of the top plate 29. A waterproof sheet 32 is labeled to the upper surface of the top plate 29 and can be readily broken by means of the blasting force of the explosive 21.

The lower cover 26 comprises a bottom 33 for covering an opening formed at the lower end of the upper cover 25 and a side wall 34 for covering the outer peripheral surface of the lower portion of the upper cover 25. The side wall 34 is screwed to the cylindrical portion 28 of the upper cover 25 by means of the mount bolts 35, and the bottom 33 is fixed on a mount 36 of the vehicle body by means such as a screw.

The power lines 5 connected to the target area 17 are led outside by way of through holes formed in the bottom plate 24 of the housing 11 and in the bottom 33 of the lower cover 26. One end of the power line 5 is connected to the power source 4 for vehicle purposes, and the other end of the same is connected to the collection section 3. The lead wires 19, 19 connected to the detonating means comprising the electric heater wire 20 of the explosive sealing section 10 are connected to the control means 8 via the coupling connector 37 and the lead wires 58, 58.

Figure 4:
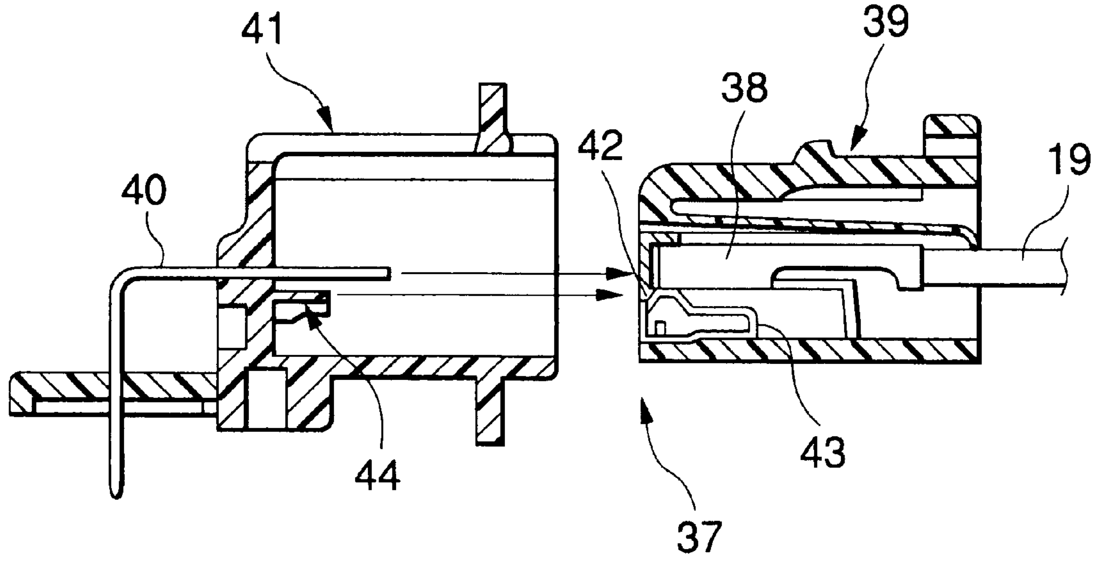
FIG. 4 is a cross-sectional view showing the specific configuration of a coupling connector.

As shown in FIG. 4, the coupling connector 37 comprises a female connector 39 and a male connector 41. The female connector 39 has a pair of female terminals 38 connected to the electric heater wire 20 of the explosive sealing section via the lead wires 19, 19. The male connector 41 has a pair of male terminals 30 to be connected to the female terminals 38. Continuity is established between the lead wires 58, 58 connected to the male terminal 38 and the lead wires 19, 19 by connection of the connectors 39, 41 so as to couple together the terminals 38, 40.

A short-circuit plate 43 is provided in the female connector 39 and is formed from a conductor. The short-circuit plate 43 has contact sections 42 which are brought into pressed contact with the female terminals 38. When the female connector 39 is not connected with the male connector 41, the female terminals 38 are connected together by way of the short-circuit plate 43, thereby bringing into a short-circuit state the detonating means comprising the electric heater wire 20 of the explosive sealing section 10 connected thereto. A protuberance 44 formed from insulating material is positioned in the male connector 41. When the connectors 39, 41 are coupled together, the protuberance 44 is inserted between the female terminals 38 of the female connector 39 and the contact sections 42, to thereby separate the contacts 42 from the female terminals 38. As a result, the lead wires 19, 19 are released from a short-circuit state.

The collision detection means 7 comprises a gravity sensor which is used in an air bag system for protecting passengers from damage at the time of collision of the vehicle and detects impact acceleration. If it is ascertained from a detection signal from the collision detection means 7 that the vehicle has caused a collision, the control means 8 supplies the electric current for detonating purposes to the electric heater wire 20 via the lead wires 19 and 58. The electric heater wire 20 is then heated, thereby exploding the explosive 21.

In the foregoing structure, in the event of the collision of a vehicle, the electric current for detonating purposes is supplied from the control means 8 to the detonating means comprising the electric heater wire 20. The electric heater wire 20 is eventually heated, to thereby increase the temperature of the explosive 21. The explosive 21 is finally exploded. The target area 17 placed in a position above the explosive 21 is broken by the blasting force of the explosive 21, thereby instantaneously interrupting the continuity between the power line 5 and the electric wires 2.

Accordingly, a large current is supplied to the main fuse, thereby fusing the main fuse. Compared with the existing electric circuit breaker configured so as to interrupt the electric circuit of the vehicle by flow of a large current to the main fuse so as to fuse the same, the electric circuit is immediately interrupted, thereby preventing flow of an electric current to the vehicle loads 1. As a result, the vehicle loads 1 can be effectively prevented from being damaged.

In the foregoing embodiment, the target area 17 is ensured in a part of the power line 5 that connects the vehicle power source 4 with the collection section 3 of the electric wires 2 connected to the plurality of vehicle loads 1, and the target area 17 is broken by the blasting force of the explosive 21. As a result, the electric currents can be simultaneously prevented from flowing to the plurality of vehicle loads 1 by interruption of the power line 5 connected to the vehicle loads 1.

The power line 5 itself or a part of the electric wires 2 may be broken by explosion of the explosive 1. However, as described in the previous embodiment, in the case where the target area 17 comprising a fusible link is positioned in a part of the power line 5 that connects the vehicle power source 4 with the collection section 3 of the electric wires 2 connected to the plurality of vehicle loads 1, and the as fusible link is broken by means of the blasting force of the explosive 1, there is eliminated a need of the area used for positioning the fusible link aside from the circuit break section 6. Therefore, the present invention has the advantage of simplifying the structure of the electric circuit breaker and rendering the electric circuit breaker compact.

The target area 17, the detonating means comprising the electric heater wire 20, and the hold means 9 holding the explosive 21 are positioned within the housing 11 comprising the bottom plate 24, the upper cover 25, and the lower cover 26. With this structure, the sealing member 22 can be effectively prevented from being scattered around as a result of explosion of the explosive 21.

Further, the air-release holes 30 are formed in the top plate 29 of the upper cover 25. The upper-side of the air-release holes 30 is covered with the waterproof sheet 32, and the lower-side of the air-release holes 30 is covered with the filter 31. Moisture is prevented from entering the inside of the housing 11 through the air-release holes 30 in normal times by means of the waterproof sheet 32. The waterproof sheet 32 is broken by the air blast caused by the explosive 21 at the time of collision, thereby releasing air from the inside of the housing 11 to the outside through the air-release holes 30. As a result, an increase in the internal pressure of the housing 11 can be prevented. Further, the broken pieces of the sealing member 22 can be prevented from being scattered around the outside through the air-release holes 30 by means of the filter 31.

In the present embodiment, the lead wires 19, 19 connected to the detonating means comprising the electric heater wire 20 of the explosive sealing section 10 are An-coupled to the lead wires 58, 58 connected to the control means 8 via the coupling connector 37. The short-circuit plate 43 that connects the female terminals 38 together in normal times is provided for the female connector 39 constituting the coupling connector 37. The detonating means comprising the electric heater wire 20 of the explosive sealing section 10 is held in a short-circuit state. With the structure, the explosive 21 can be prevented from being erroneously exploded under the influence of noise or static electricity due to a disturbance when the electric circuit breaker is assembled or stored.

A protuberance 44 formed from insulating material is positioned in the male connector 41. When the female connector 39 is coupled to the male connector 41, the protuberance 44 is inserted between the female terminals 38 of the female connector 39 and the short-circuit plate 43, to thereby separate the short-circuit plate 43 from the female terminals 38. As a result, the electric heater wire 20 is released from a short-circuit state. When the electric circuit breaker 6 is in use, the electric heater wire 20 is released from a short-circuit state by connection of the connectors 39, 42, thereby ensuring continuity between the lead wires 19, 19 and the lead wires 58, 58.

As shown in the foregoing embodiment, in a case where the explosive sealing section 10 formed by encapsulation of the electric heater wire 20 and the explosive 21 into the sealing member 22 is positioned in the opening 13 of the hold member 9, there is the advantage of being able to readily and safely set the explosive 21, as well as to make the explosive 21 waterproof thoroughly.

Figure 5:
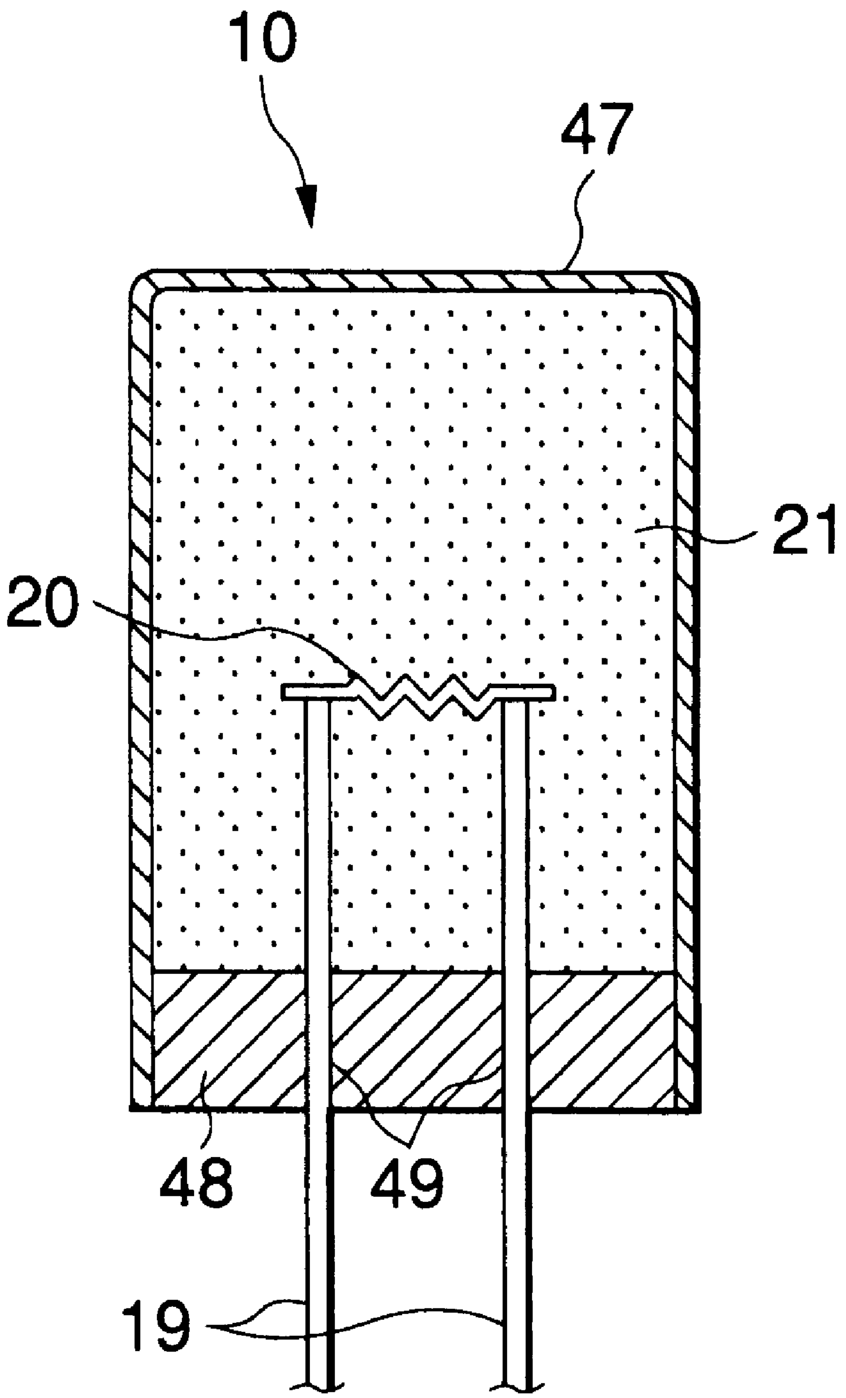
FIG. 5 is a cross-sectional view showing another example of an area of the electric circuit to be broken.

In place of the foregoing structure, the explosive sealing section 10 may be formed through use of a capsule 47 such as that shown in FIG. 5. The capsule 47 which is opened at a downward end is formed from stainless steel into a thin-walled container. A closure 48 is attached so as to close the opening formed at the lower end of the capsule 47 while the electric heater wire 20 and the explosive 21 are loaded in the capsule 47, and the closure 48 is fixed to the opening by required means. A pair of lead wire insert holes 49 are formed in the closure 48, and the pair of lead wires 19, 19 connected to the electric heater wire 20 are led to the outside of the capsule 47 through the lead wire insert holes 49.

Even in such a structure, the previously-completed explosive sealing section 10 can be readily positioned only by insertion of it into the opening 13 of the hold member 9. The thin-walled capsule 47 is broken in an upward direction at the time of explosion of the explosive 21, and the blasting force acts on the target area 17 in a concentrated manner. Therefore, the target area 17 can be broken without fail. Further, since the explosive 21 is sealed in the capsule 47 before explosion, the explosive can be thoroughly made waterproof and dustproof. In place of the electric heater wire 20, the explosive sealing section 10 may be provided with the detonating means that makes a spark when receiving electric power.

Figure 6:
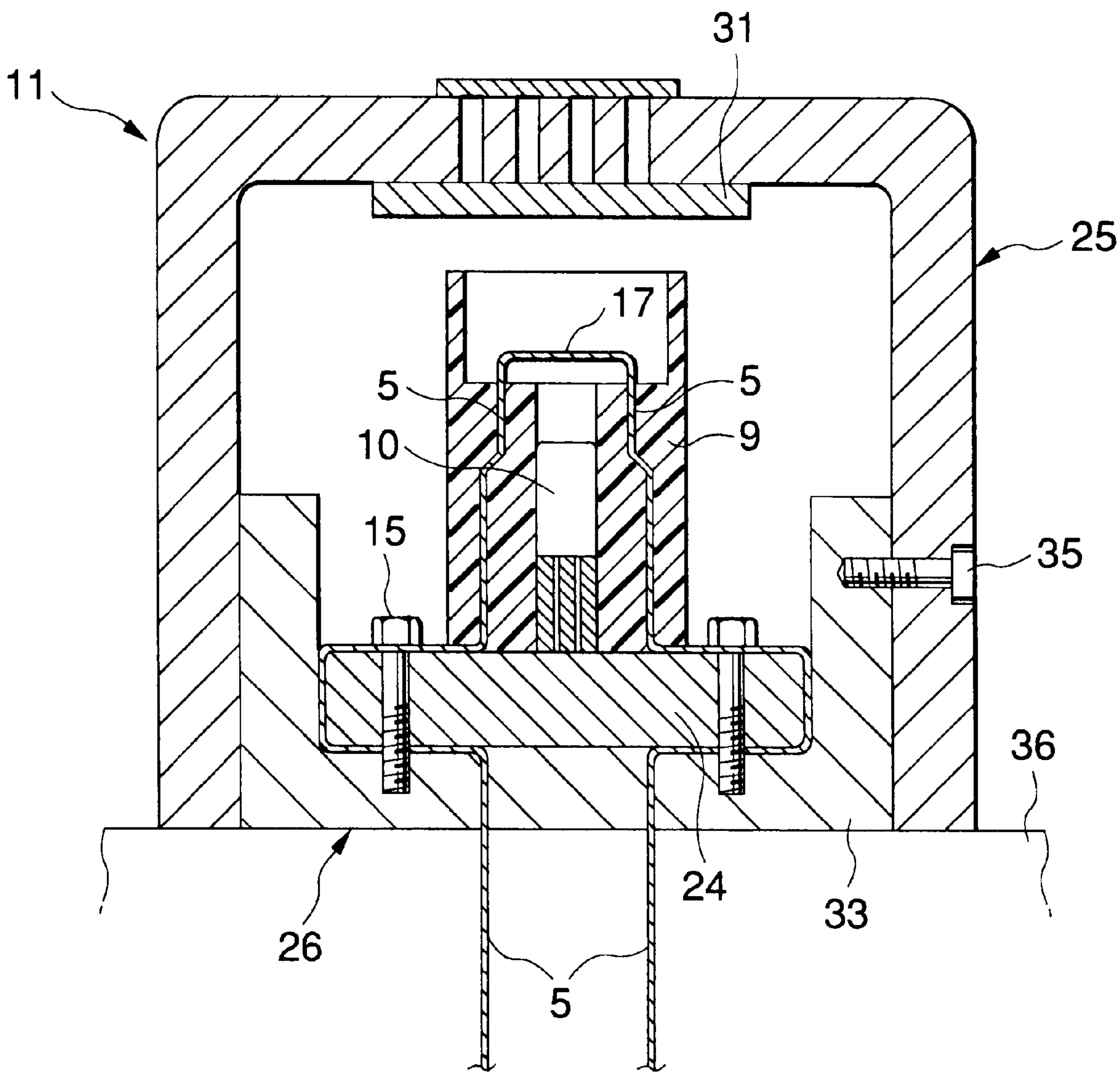
FIG. 6 is a cross-sectional view showing still another example of the area of the electric circuit to be broken.

As shown in FIG. 6, both ends of the lead wire 5 connected to the target area 17 are extended so as to run along the lower surface of the hold member 9, the upper surface, side surfaces, and lower surface of the bottom plate

24, so that the ends of the lead wire 5 are led to the outside of the lower cover 26 through the bottom wall 33. Further, the lead wire 5 may be fixed on the bottom plate 24 and the bottom 33 of the lower cover 26 by means of the mount bolts 15.

Figure 7:
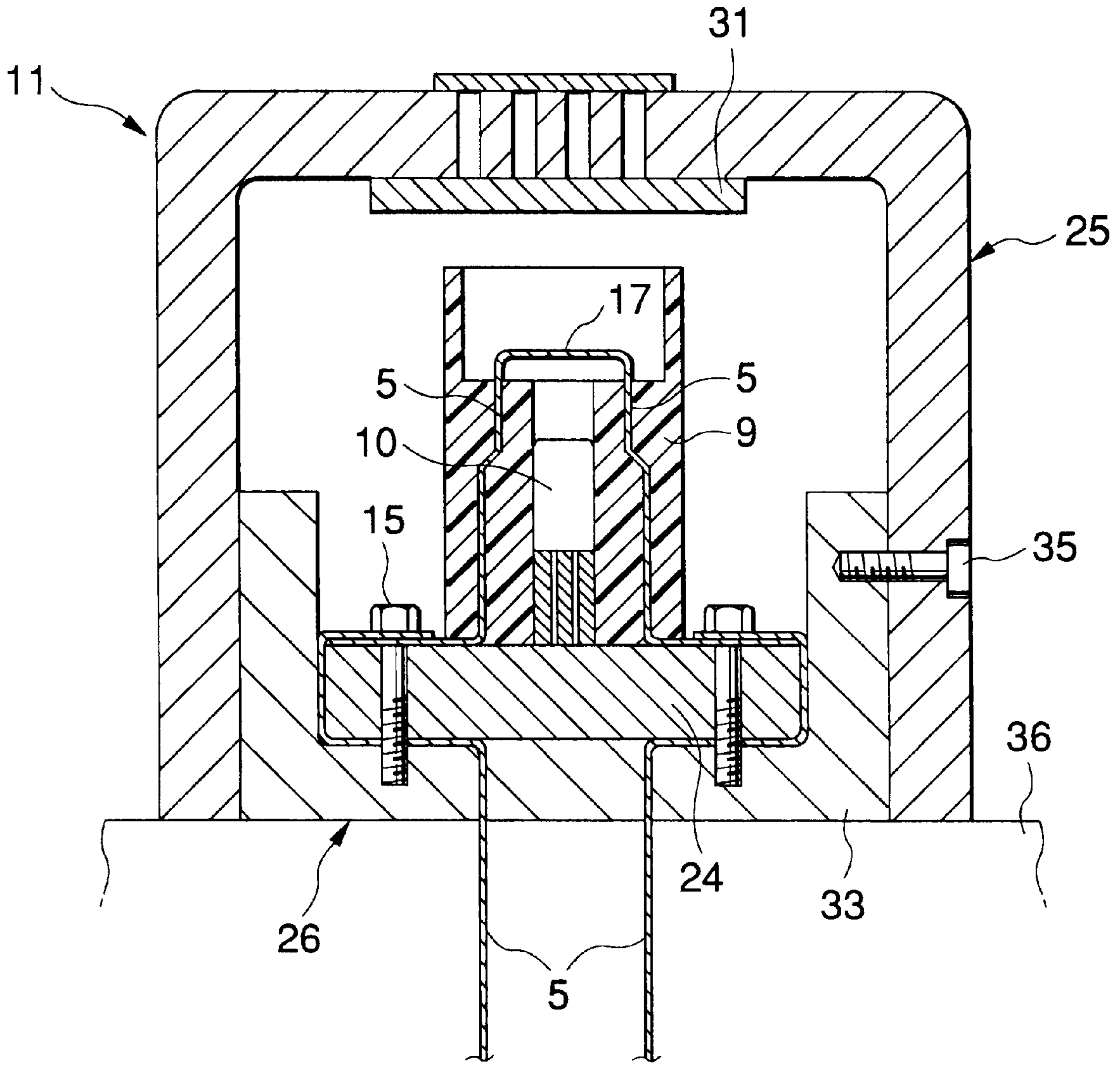
FIG. 7 is a cross-sectional view showing a yet another example of the area of the electric circuit to be broken.

With the foregoing structure, the interval between both ends of the lead wire 5 regulated by means of connectors provided in the mount 36 of the vehicle body may be different from the interval between both ends of the lead wire 5 regulated by the insert holes formed in the hold member 9. Even in such a case, the present invention has the advantage of enabling proper routing of the lead wire 5. Alternatively, as shown in FIG. 7, the upper portion of the lead wire 5 and the lower portion of the same may be formed separately from each other. The thus-formed upper and lower portions of the lead wire 5 may be connected together by overlapping the ends of the upper and lower portions each other at the positions where the mount bolts 15 will be fixed.

Figure 8:
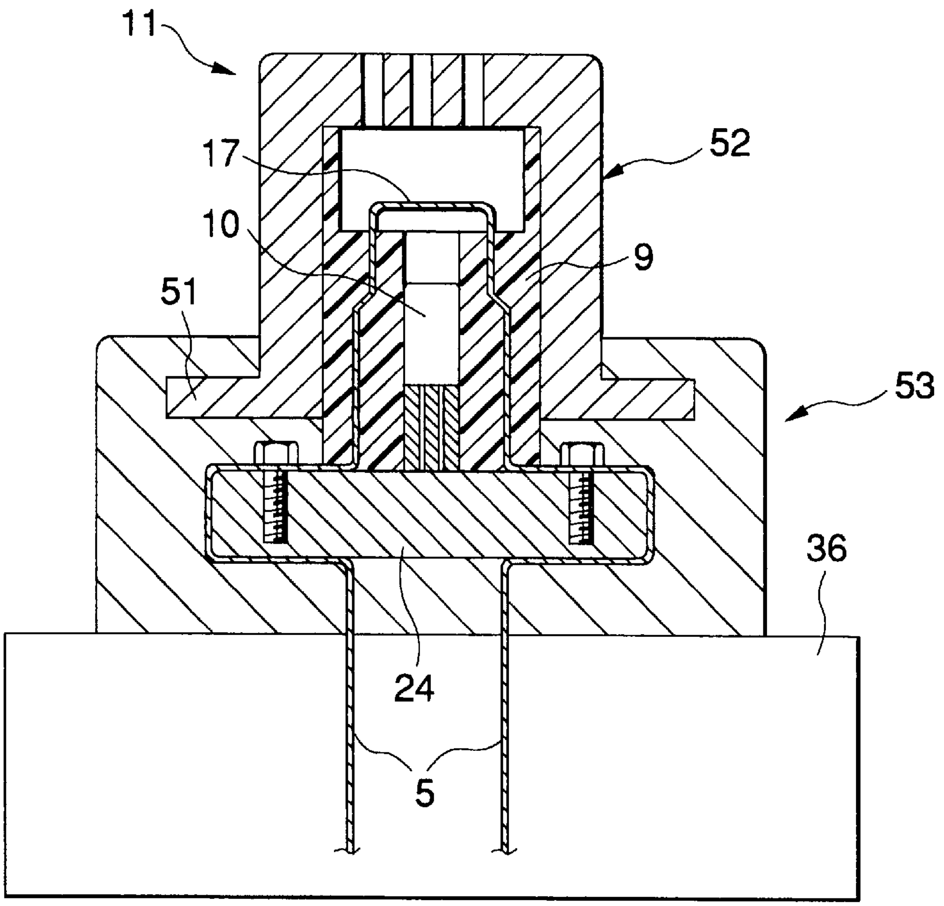
FIG. 8 is a cross-sectional view showing a further example of the area of the electric circuit to be broken.

As shown in FIG. 8, an upper cover 52 which has a horizontally-protruding flange 51 at the lower end is fitted so as to cover the hold member 9 of the explosive sealing section 10. The upper cover 52 and the bottom plate 24 are immersed into the mold resin contained in a mold, to thereby form a lower cover 53 so as to integrally surround the lower portion of the upper cover 52 and the outer portion of the bottom plate 24. With such a structure, bonding strength and air-tightness between the upper cover 52, the bottom plate 24, and the lower cover 53 can be effectively improved.

Figure 9:
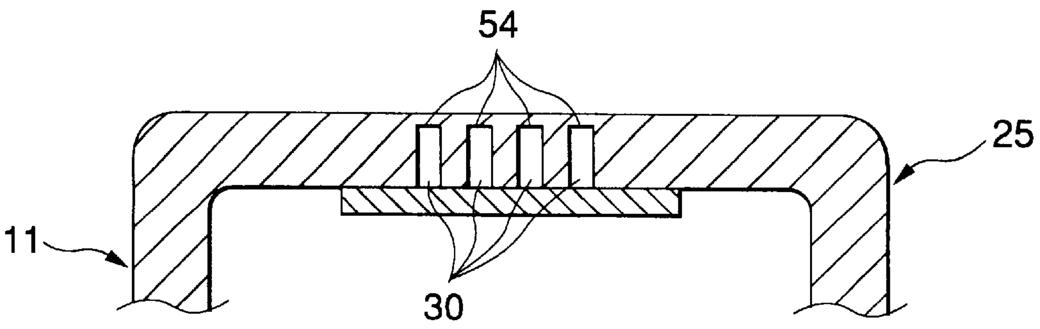
FIG. 9 is a cross-sectional view showing another example of a housing.

In the previous embodiment, the explanation has been given of the case where the air-release holes 30 formed in the top plate 29 of the upper cover 25 are covered with the separate waterproof sheet 32 is labeled to the top plate 29. However, as shown in FIG. 9, a closing section 54 for closing the upper ends of the air-release holes 30 may be integrally formed in the top plate 29 of the upper cover 25. The closing section 54 may be broken by means of the blasting force of the explosive 21, thereby allowing communication between the inside and outside of the housing 11 through the air-release holes 30.

Figure 10:
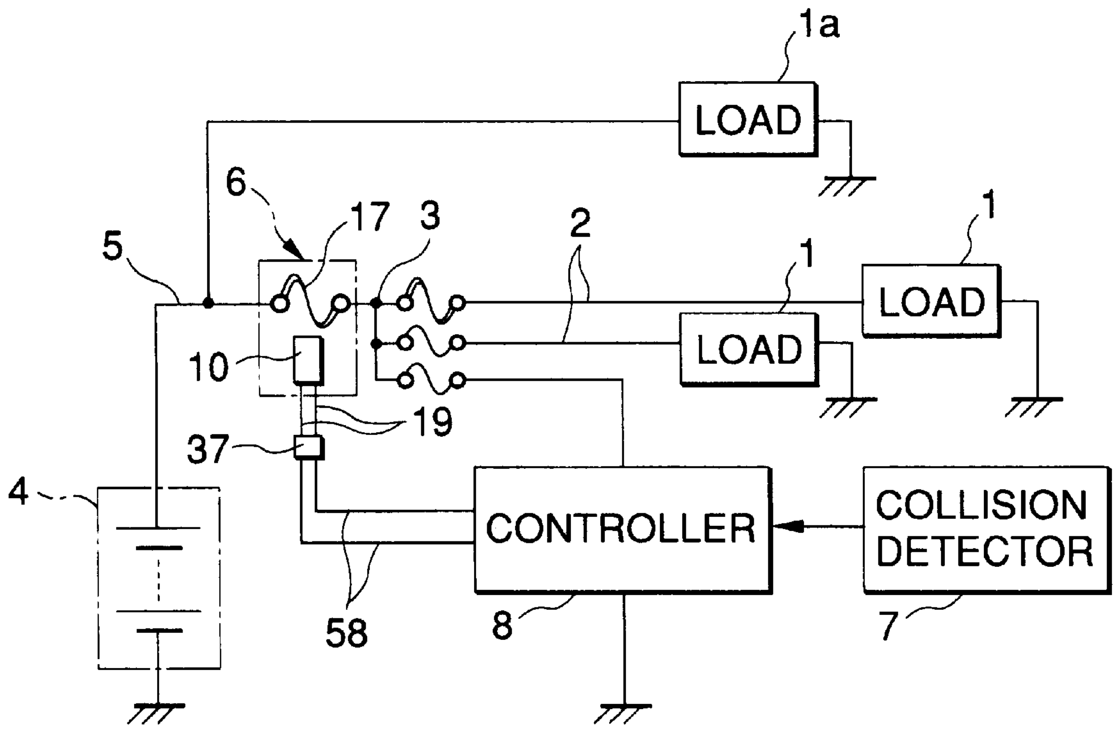
FIG. 10 is a cross-sectional view showing another example of an electric circuit breaker for vehicle purposes according to the present invention.

As shown in FIG. 10, a vehicle load which is desirably maintained in an active state at the time of collision of a vehicle; e.g., a vehicle load 1*a* such as a room lamp or hazard flashers used for indicating that the vehicle is a hazard, is desirably connected to the power line 5 in an upstream position with respect to the location of the circuit breaker 6, thereby ensuring supply of an electric current to the vehicle load 1*a* even after the target area 17 of the electric circuit has been broken.

As has been described above, in accordance with a first aspect of the present invention, there is provided an electric circuit breaker for interrupting an electric circuit of a vehicle, comprising a circuit break section having an explosive used for exploding a part of the electric circuit by explosion and detonating means for exploding the explodes by application of electric power to the explodes; collision detection means for detecting a collision of a vehicle; and control means which explodes the explosive by supply of an electric current for detonating purposes to the detonating means in response to a detection signal from the collision detection means. With the foregoing structure, an electric current for detonating purposes is supplied to the detonating means in response to a detection signal output from the collision detection means at the time of collision of a vehicle. As a result, the detonating means is heated so as to explode the explosive, thereby instantaneously breaking a part of the electric circuit. Accordingly, a large current flows to the main fuse, to thereby fuse the main fuse. Compared with the existing electric circuit breaker configured which interrupts an electric circuit of a vehicle by flow of a large current to the main fuse so as to fuse the same, the electric circuit is immediately interrupted, thereby preventing flow of an electric current to the vehicle loads. As a result, the vehicle loads can be effectively prevented from being damaged.

Furthermore, in accordance with the first aspect of the present invention, the explosive is positioned so as to break a part of a power line connecting a vehicle power source with a collection section of electric wires connected to a plurality of vehicle loads. As a result, the electric currents can be simultaneously prevented from flowing to the plurality of vehicle loads by interruption of the power line connected to the plurality of vehicle loads.

Moreover, in accordance with the first aspect of the invention, the explosive is positioned so as to break a fusible link connected across a power line which connects a vehicle power source with a collection section of electric wires connected to a plurality of vehicle loads. With such a configuration, there is no need for positioning the fusible link aside from the circuit break section, thereby resulting in an advantage of making the structure of the electric circuit breaker simple, as well as of reducing the space for the electric circuit.

Second Embodiment

Figure 11:
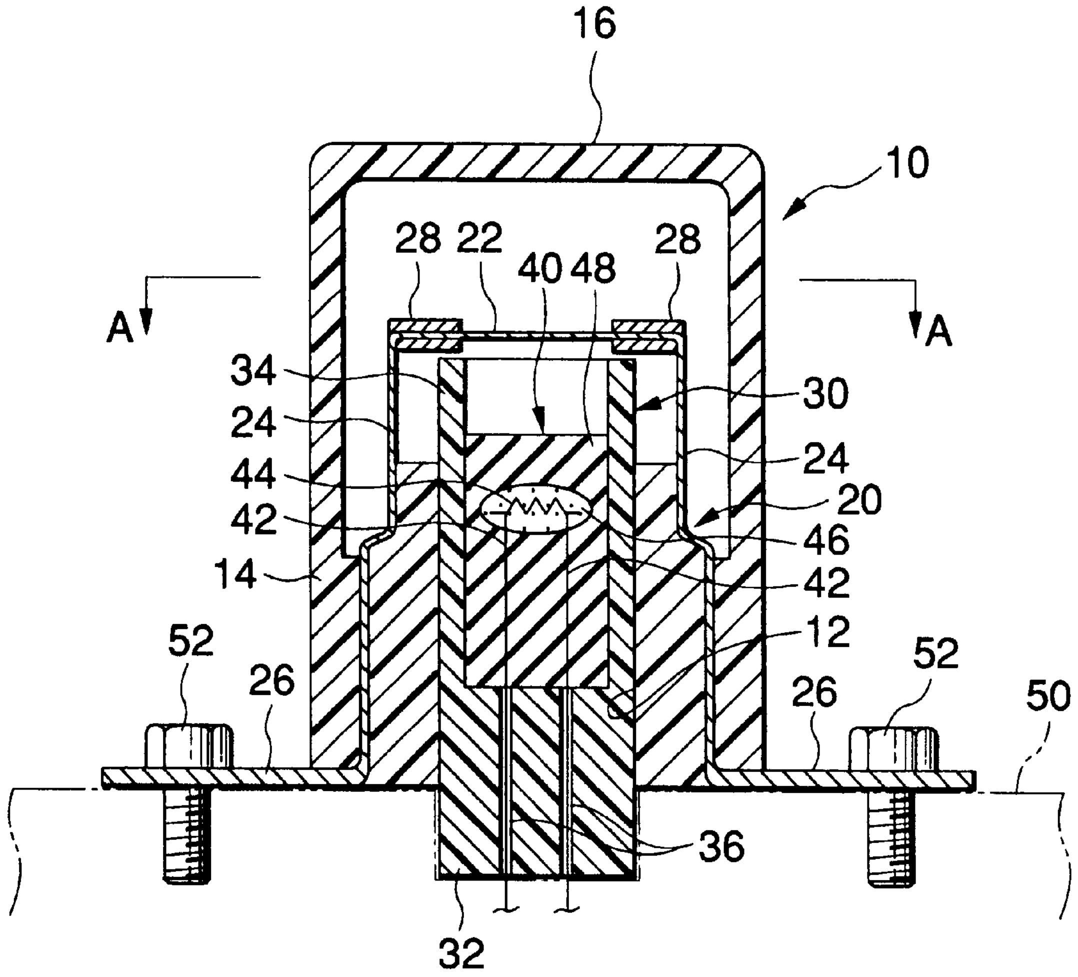
FIG. 11 is a cross-sectional front view showing a circuit breaker in accordance with a second embodiment of the present invention.
Figure 12:
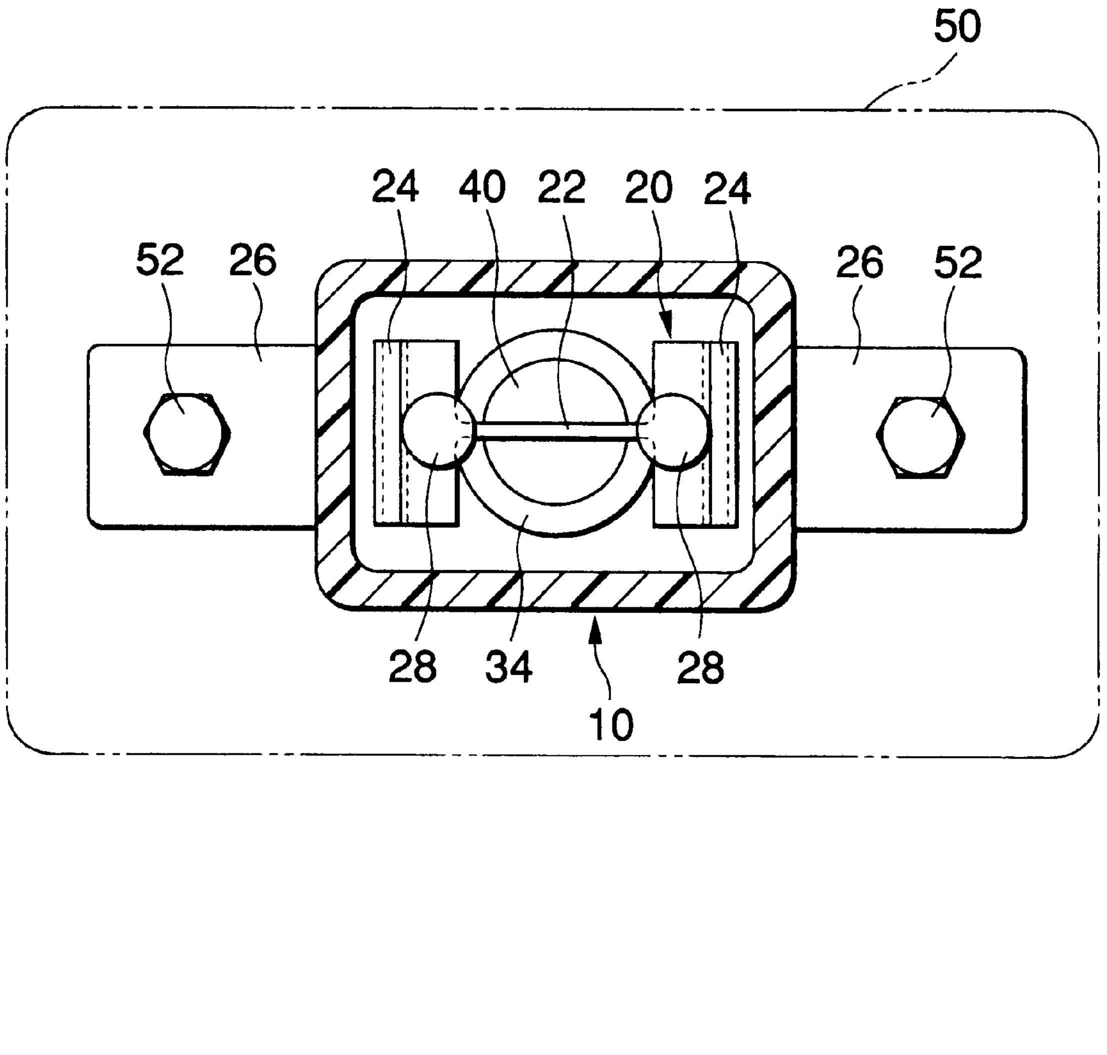
FIG. 12 is a cross-sectional view taken across line A—A shown in FIG. 11.

With reference to FIGS. 11 and 12, a circuit breaker in accordance with a second embodiment of the present invention will be described.

A circuit breaker, which will now be described, comprises a housing body 10 constituting a housing of the circuit breaker; a cylindrical member 30; a conductor 20 constituting an electric circuit; and an explosive sealing section 40 disposed within the cylindrical member 30.

The housing body 10 comprises an outer sheath 14 having a through hole 12 formed at the center thereof and a cover 16. The through hole 12 is open at both longitudinal ends, and the cover 16 is formed so as to cover the upper opening. Conductor storage space of a given size is formed on the inside of the cover 16. For example, the housing body 10 can be manufactured by formation of the center portion of the outer sheath 14; by formation of the outer peripheral portion of the outer sheath 14 and the cover 16 in an integrated manner; and by bonding together the center portion and the thus-integrated outer peripheral portion.

Any type of material may be used for the housing body 10, so long as it has insulation characteristics. For example, the housing body 10 may be made of ceramics. More preferable material comprises light-weight synthetic resin which is easy to mold, and particularly heat-resistant and high-strength resin such as glass-contained nylon resin or PPS resin.

The conductor integrally comprises a horizontal area 22 to be broken, a pair of downwardly-extended portions 24, each of which extends from each end of the horizontal area 22; and connector terminals 26, each of which horizontally and outwardly extends from the lower end of each downwardly-extended portion 24 at right angles.

The horizontal area 22 is formed to a narrow width so that it can be broken by a small amount of blasting force. In the present embodiment, the conductor 20 is formed from the same material as that used for a common fuse. The horizontal area 22 is designed so as to be broken in the event of an excess current and is disposed immediately above the through hole 12 within the conductor storage space. The downwardly-extended portions 24 in the conductor storage space penetrate through the outer sheath 14 of the housing body 10 in a downward direction. The connector terminals 26 are led to the outside of the housing body 10 (i.e., in sidewise directions from the lower end of the housing body 10 in the illustrated example). A heat reservoir 28 is attached to the boundary between the horizontal portion 22 and the downwardly-extended portion 24.

The cylindrical member 30 is also made of synthetic resin, or the like, and comprises an inner cylindrical portion 34 extended from a bottom portion 32 in an upward direction. A pair of wire insert holes 36 are formed so as to longitudinally pass through the bottom portion 32. The cylindrical member 30 is fitted into the through hole 12 and is bonded to the internal peripheral surface of the through hole 12 by means of an adhesive. As a result, the upper and lower ends of the cylindrical member 30 protrude from the outer sheath 14 in a longitudinal direction. Further, an opening formed at the upper end of the inner cylindrical portion 34 is held at a position immediately below the horizontal section 22.

The explosive sealing section 40 comprises a filament 44 which is connected at both ends to wires 42 and is embedded in an explosive 46, and the filament 44 is further sealed in a sealing member 48. The wires 42 are led so as to penetrate through the sealing member 48 in a downward direction. The sealing member 48 is preferably made of epoxy resin or rubber-like resin and is integrally molded in an indirect or direct manner while the filament 44 and the explosive 46 are involved in the sealing member 48. The overall explosive sealing section 40 is inserted into the inner cylindrical portion 34 of the cylindrical member 30. The wires 42 led out of the sealing member 48 are extended to the outside of the cylindrical member 30 through the wire insert holes 36 in a downward direction.

The connector terminals 26 are mounted on the upper surface of a base 50 through use of bolts 52, or the like. Wires led out of an electric circuit (not shown) are connected to the connector terminals 26. The wires 42 led to the outside of the cylindrical member 30 are connected to a control section (not shown) through insert holes formed in the base 50.

The operation of the circuit breaker will now be described.

If there arises a car accident, or the like, an abnormality instruction signal is input to the wires 42. In response to this signal, power is applied to the filament 44, so that the filament 44 is heated. When the temperature of the explosive 46 exceeds a given temperature as a result of heating of the filament 44, the explosive 46 cause explosion.

Since the blasting force of the explosive 46 is diffused in all directions within an existing circuit breaker, only a small fraction of the blasting force is exerted on the horizontal section 22. In contrast, in the circuit breaker shown in FIG. 11, the explosive sealing section 40 is loaded in the inner cylindrical portion 34 which is open in only the direction of the horizontal section 22. If the explosive 46 causes explosion, the blasting force is concentrated on the horizontal section 22 to thereby entail rupture of the sealing section 40. Accordingly, even in the case of a comparatively small amount of blasting force, the horizontal section 22 can be thoroughly broken, thereby correspondingly eliminating damage to the cylindrical member 30 or the cover 16. In this way, sufficient safety can be ensured without use of expensive high-strength material for the housing including the cylindrical member 30 and the housing body 10, or without subjecting the housing to special explosion-proof treatment.

Particularly in the case of the foregoing circuit breaker, since the lower surface of the housing 10 and the connector terminals 26 is fixed on the upper surface of the base 50, the blasting force can be prevented from escaping in a downward direction. The blasting force imparted to the horizontal section 22 can be increased by means of the upward reactive force which the housing 10 and the connector terminals 26 receive from the base 50.

In the foregoing circuit breaker, the cylindrical member 30 may be omitted, and the explosive sealing section 40 may be directly loaded into the through hole 12. In this case, however, there is a need for another step of closing an opening formed at the lower end of the through hole 12 after the explosive sealing section 40 has been loaded into the through hole 12. In contrast to this structure, the structure shown in FIGS. 11 and 12 has the advantage of readily loading the explosive sealing section 40 in the circuit breaker in a simple operation by filling of the explosive sealing section 40 into the inner cylindrical portion 34 of the cylindrical member 30 outside the housing body 10 in advance, and by insertion of the overall cylindrical member 30 into the through hole 12.

The filament 44 and the explosive 46 may also be directly loaded into the inner cylindrical portion 34 or the through hole 12. However, as previously mentioned, if the explosive sealing section 40 is molded in advance, and the overall explosive sealing section 40 is inserted into the inner cylindrical portion 34, the loading of the explosive 46 can be simplified further, thereby resulting in the advantage of rendering the explosive 46 waterproof or dustproof to a much greater extent without fail.

Figure 13:
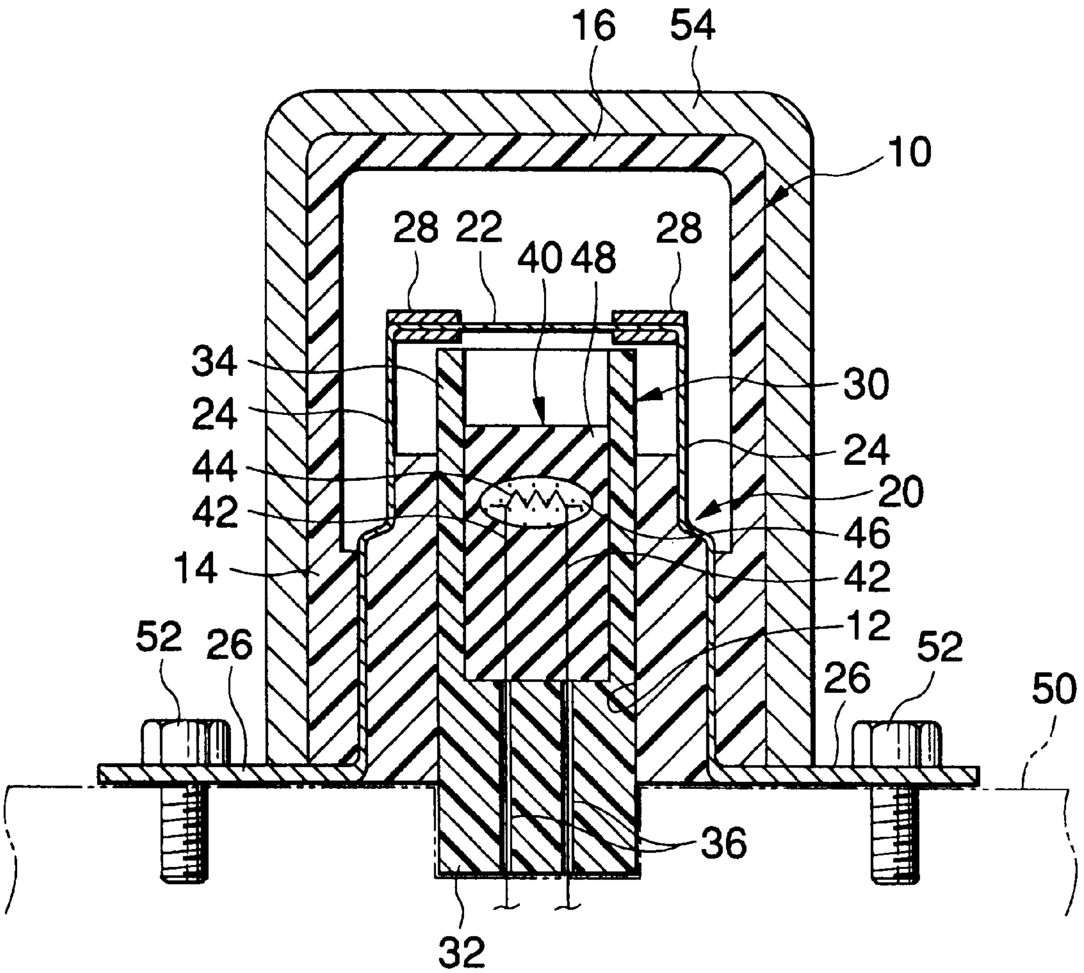
FIG. 13 is a cross-sectional front view showing a circuit breaker which is a second example according to the second embodiment of the present invention.

FIG. 13 shows a circuit breaker in accordance with a second example of the second embodiment of the present invention. A protective member 54 is provided outside the housing body 10 so as to cover the overall housing body 10. With such a structure, even if the housing body 10 and the cylindrical member 30 are formed from light-weight material which is easy to mold such as synthetic resin, the protective member 54 which is made of high-strength metal, such as steel, copper, aluminum, or alloys thereof, and is provided outside the housing body 10 and the cylindrical member 30 can ensure sufficient resistance to explosion.

The protective member 54 may be formed from thick material comprising high-strength resin or high-elastic resin, as well as from the foregoing metal.

Figure 14:
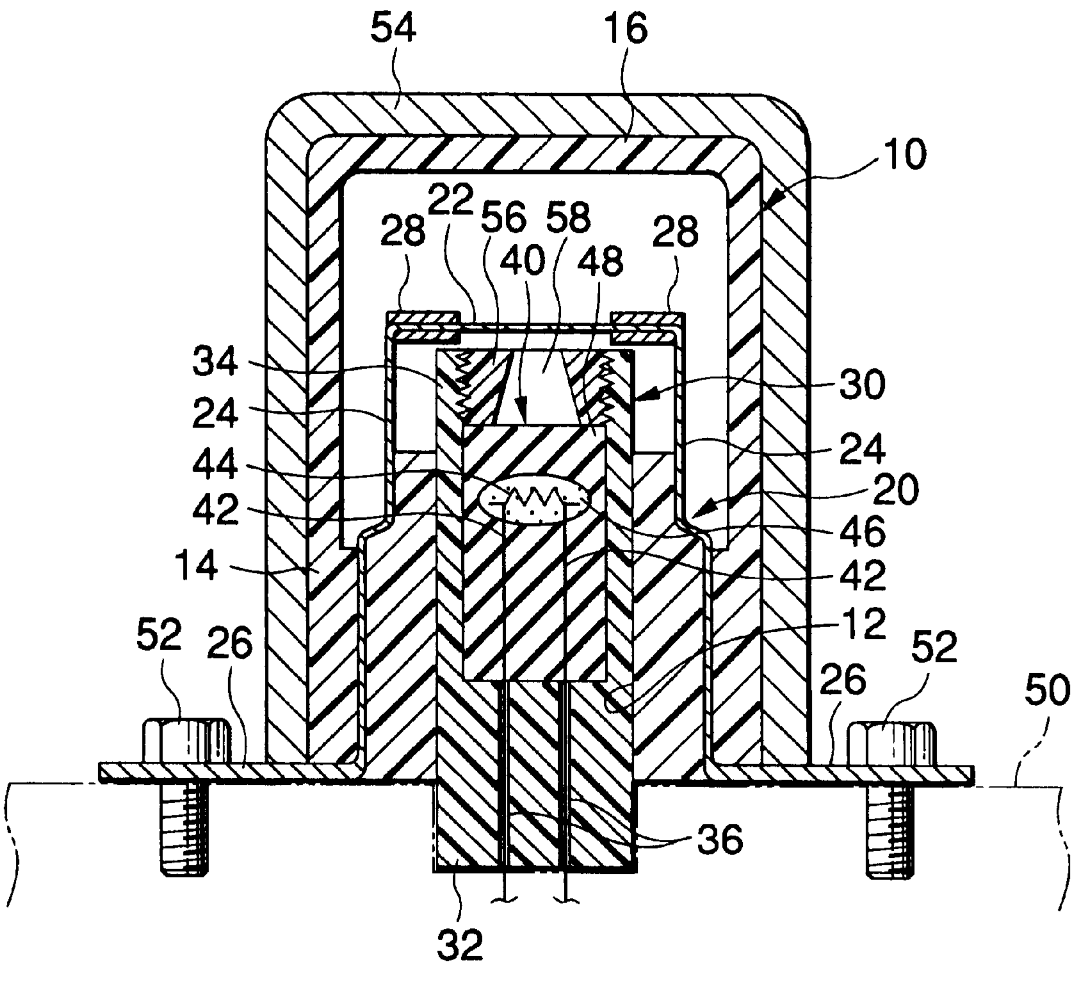
FIG. 14 is a cross-sectional front view showing a circuit it breaker which is a third example according to the second embodiment of the present invention.

FIG. 14 shows a circuit breaker in accordance with a third example of the second embodiment of the present invention. A small diameter cylindrical section 56 is provided in such a way as to close the upper end of the inner cylindrical portion 34. The small-diameter cylindrical section 56 has a funnel-like through hole 58 whose diameter is smaller than the inner diameter of the inner cylindrical portion 34.

A screw thread is formed on the outer peripheral surface of the small diameter and the inner peripheral surface of the inner cylindrical portion 34. The small diameter cylindrical section 56 may be screwed into the inner cylindrical portion 34 by means of these screw threads which mesh with each other. Alternatively, the small diameter cylindrical section 56 may be fixed into the inner cylindrical portion 34 by another means such as an adhesive.

With such a structure, as a result of presence of the small diameter cylindrical section 56 having a diameter smaller than that of the inner cylindrical portion 34, the degree of concentration of blasting force on the horizontal section 22 can be increased to a much greater extent, which in turn enables a further reduction in the blasting force of the explosive 46 required to break the horizontal section 22. The effect of increasing the concentration of blasting force can also be accomplished by means of; e.g., a non-funnel-like through hole 58 (i.e., the inner diameter of the through hole 58 is constant in the axial direction). However, if the through hole 58 is tapered in such a way as that is shown in FIG. 14, the impact exerted on the small diameter cylindrical section 56 is reduced, thereby enabling an improvement in the degree of concentration of the blasting force while a loss of explosion energy is reduced.

Figure 15:
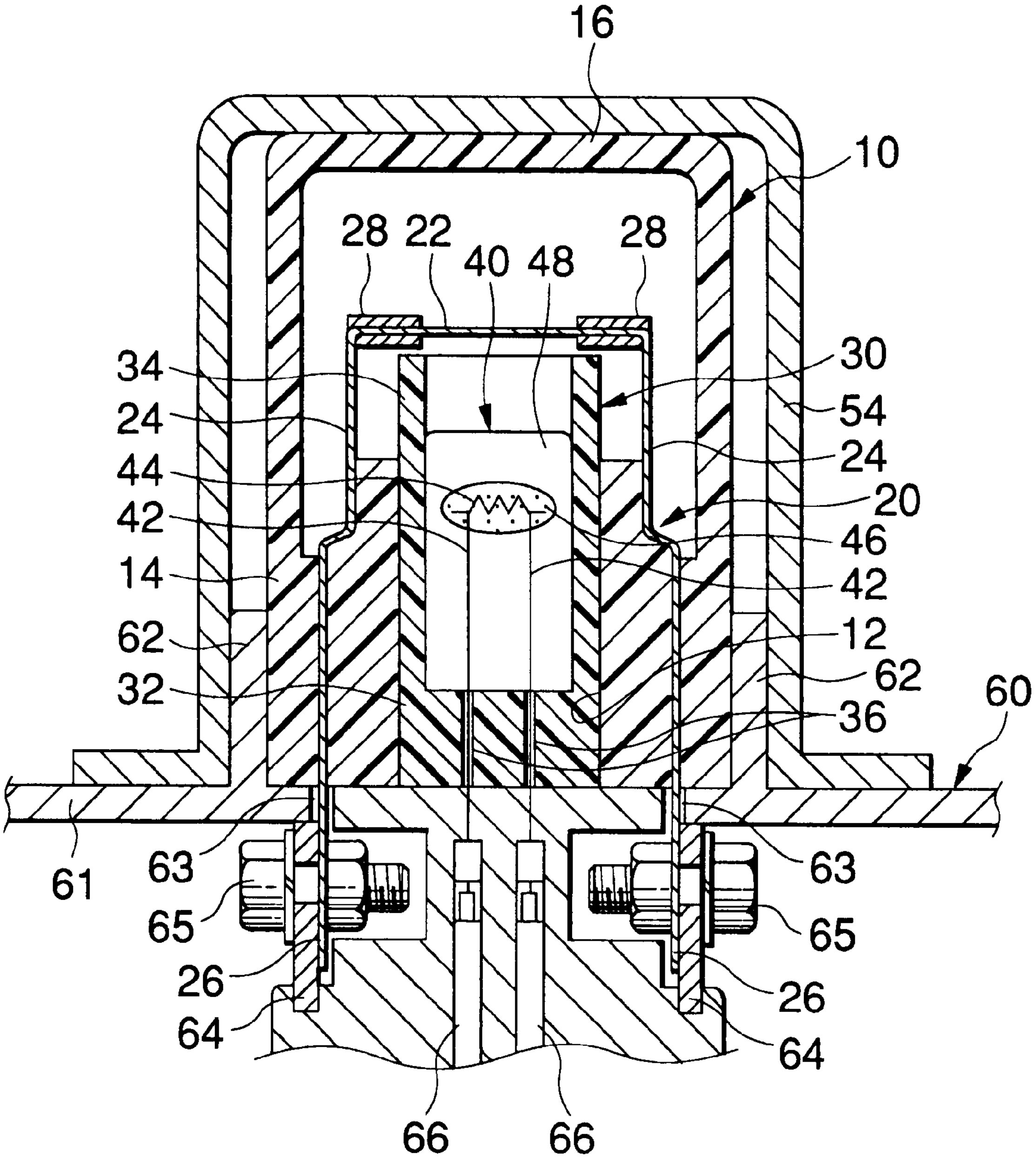
FIG. 15 is a cross-sectional front view showing a circuit breaker which is a fourth example according to the second embodiment of the present invention.

FIG. 15 shows a circuit breaker in accordance with a fourth example of the second embodiment of the present invention. An electric connection box 60 is used as a base of the circuit breaker. The housing body 10 is directly mounted on a top plate 61 of the electric connection box 60. More specifically, a frame 62 is provided in an upright position on the upper surface of the top plate 61, and a lower portion of the housing body 10 is fitted into the space formed by the frame 62. A lower portion of the protective member 54 is fitted around the frame 62.

The connector terminals 26 are led outside the housing body 10 in a downward direction and are extended into the electric connection box 60 via through holes 63 formed in the top plate 60. An electric circuit is incorporated into the electric connection box 60. A pair of terminal plates 64 and the connector terminals 26, both of which constitute the electric circuit, are mechanically and electrically connected together by means of bolts 65. Further, electric wires 66 led out of an unillustrated control circuit are provided in the housing of the electric connection box 60, and the electric wires 66 and the wires 36 extended from the circuit breaker are electrically connected to each other.

If the housing body 10, or the like, is directly mounted on the outer surface of the electric connection box 60 in the manner as previously described, there is eliminated a need for a cable for connecting the circuit breaker with the electric connection box, thereby enabling simplification of the overall circuit breaker system.

Figure 16:
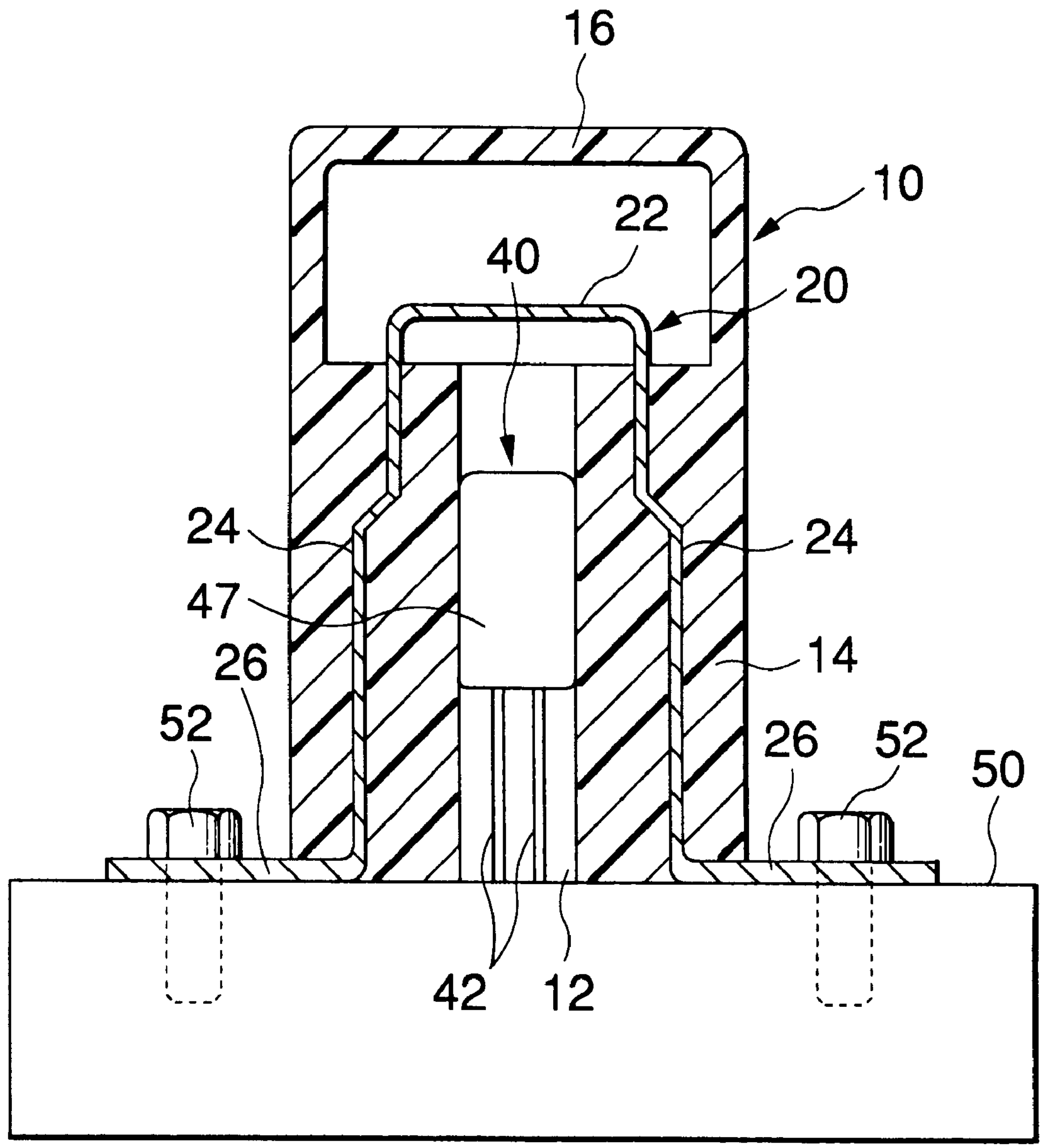
FIG. 16 is a cross-sectional front view showing a circuit breaker which is a fifth example according to the second embodiment of the present invention.
Figure 17:
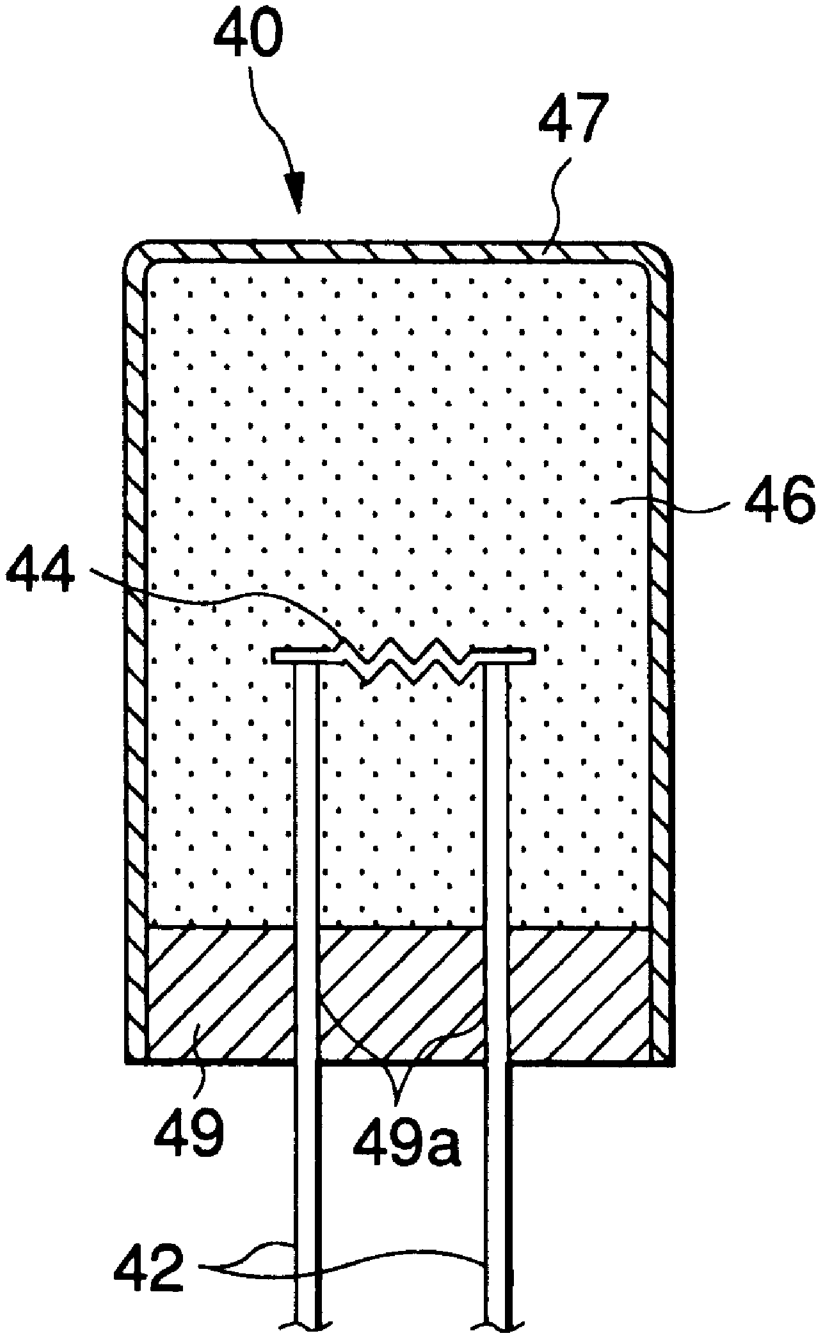
FIG. 17 is a cross-sectional front view showing an explosive sealing section provided in the circuit breaker shown in FIG. 16.

FIGS. 16 and 17 show a circuit breaker in accordance with a fifth example of the second embodiment of the present invention.

In the fifth embodiment, the explosive sealing section 40 is formed through use of a capsule 47 such as that shown in FIG. 17. The capsule 47 is formed from stainless steel, or the like, into a thin-walled container having an opening only in a downward direction. While the filament 44 and the explosive 46 are loaded in the capsule 47, a closure 49 is fitted so as to close an opening formed at the lower end of the capsule 47 by required means. A pair of wire insert holes 49*a* are formed in the closure 49, and the pair of wires 42 connected to the filament 44 are led to the outside the capsule 47 through the wire insert holes 49*a*. As shown in FIG. 6, the overall explosive sealing section 40 is directly fitted into the through hole 12 of the housing body 10, and they are fixed to each other by means of an adhesive, or the like.

Even with such a structure, a circuit breaker can be simply assembled only by insertion of the previously-completed explosive sealing section 40 into the through hole 12. The thin-walled capsule 47 is broken in an upward direction at the time of explosion of the explosive 46, and the blasting force acts on the horizontal section 22 in a concentrated manner, thereby ensuring rupture of the horizontal section 22. Since the explosive 46 is sealed in the capsule 47 before explosion, the explosive 46 can be held in waterproof and dustproof conditions.

Figure 18:
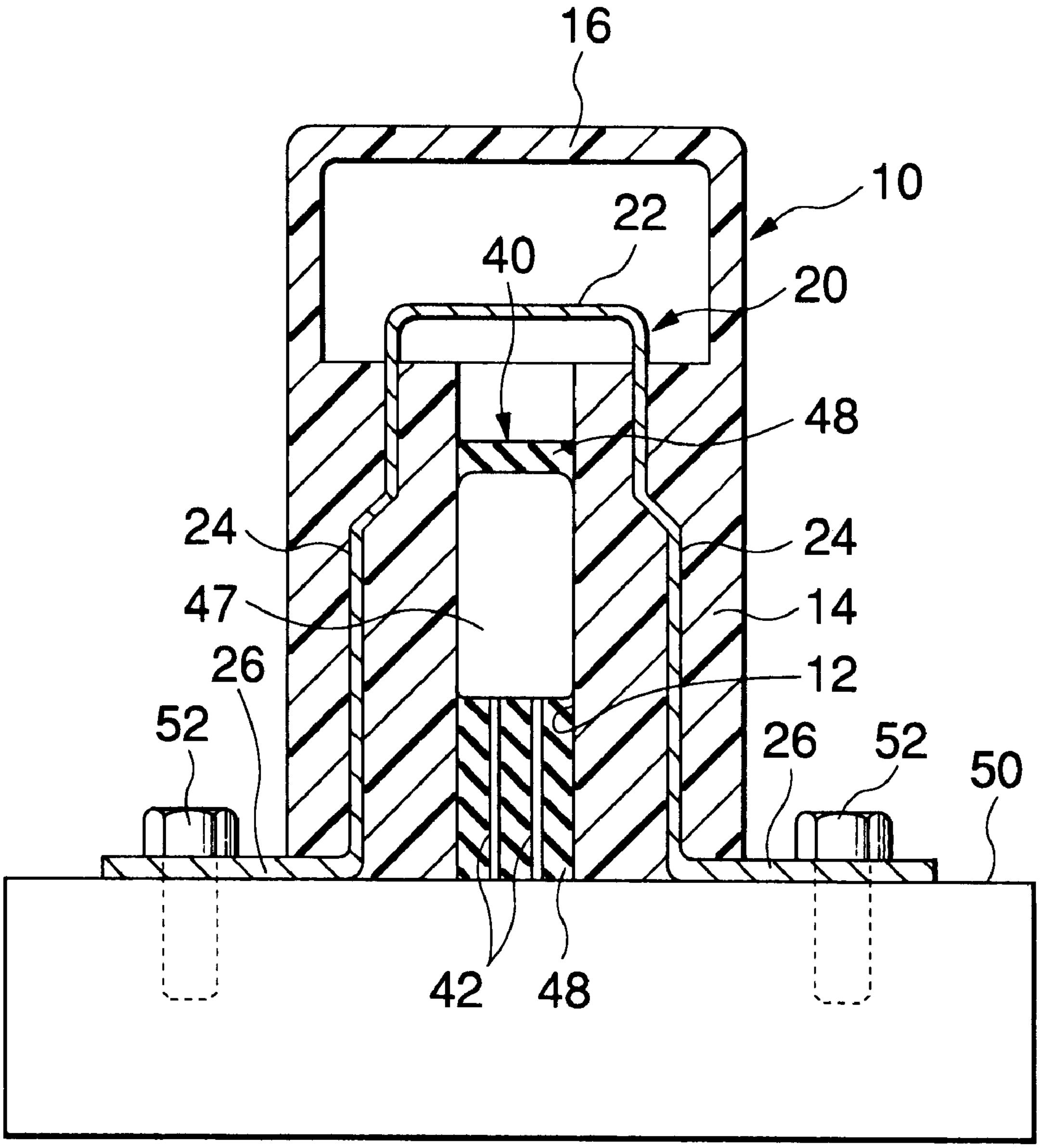
FIG. 18 is a cross-sectional front view showing the circuit breaker which is a sixth example according to the second embodiment.

As shown in FIG. 18, in accordance with a sixth example of the second embodiment, so long as both longitudinal ends, or one longitudinal end of the through hole 12, is closed by means of a sealing material 48, the waterproof and dustproof effects of the explosive 46 can be improved to a much greater extent. Further, the explosive sealing section 40 can be fixed in a more reliable manner.

If the capsule 47 is formed from resin possessing heat shrinkable properties, the opening of the capsule 47 can be readily sealed only by heating it after the filament 44 and the explosive 46 have been loaded in the capsule 47. In this way, the explosive 46 can be thoroughly sealed in the capsule 47. Even in the sixth example, it is only essential for the wires 42 to be led outside the opening of the capsule 47.

Figure 19:
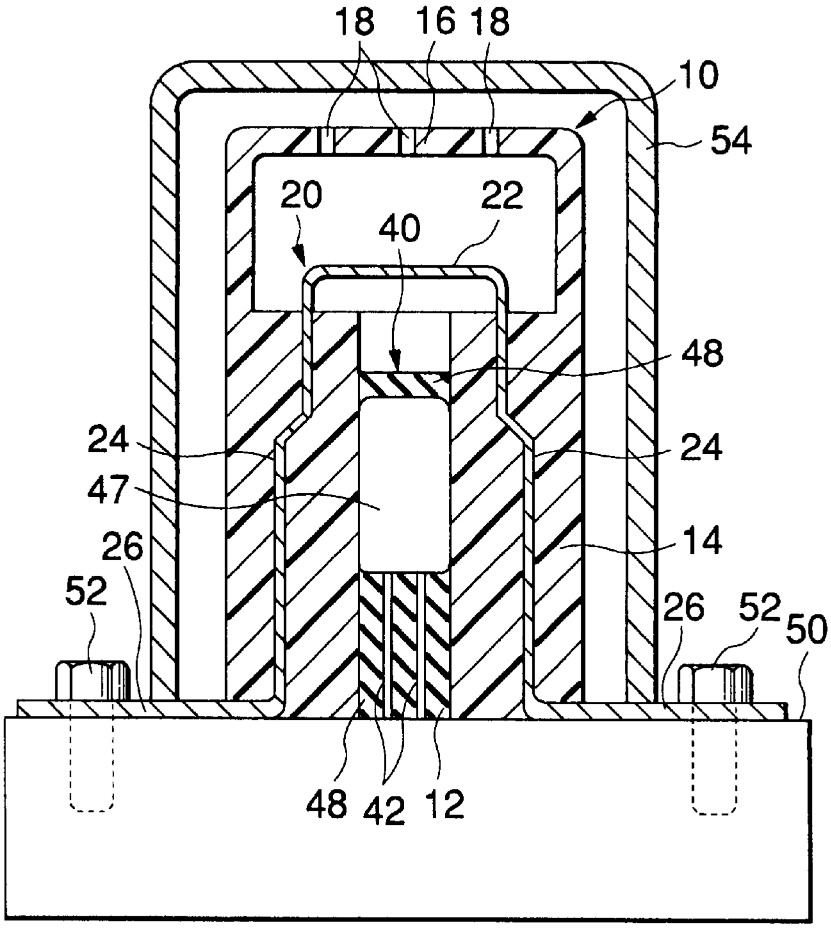
FIG. 19 is a cross-sectional front view showing a circuit breaker which is a seven th example according to the second embodiment of the present invention.
Figure 20:
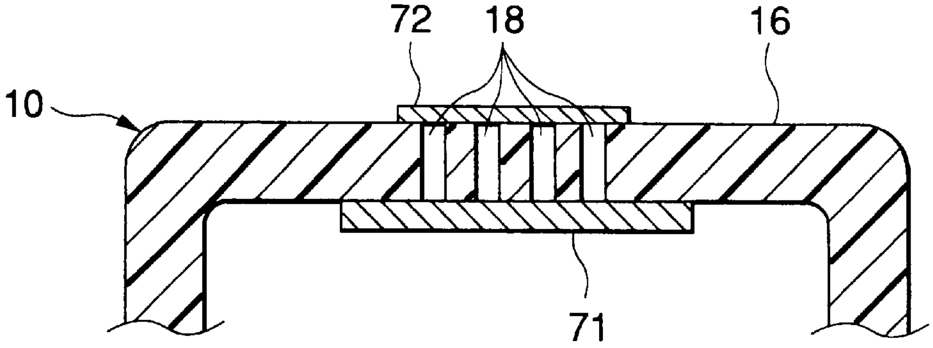
FIG. 20 is a cross-sectional front view showing a circuit breaker which is a another example according to the second embodiment of the present invention.

FIG. 19 shows a circuit breaker in accordance with a seventh example of the second embodiment of the present invention. Communication holes 18 are formed at suitable positions in the cover 16 (in the top plate of the cover in the case of the illustrated example) so as to permit communication between the inside and outside of the cover 16, and the foregoing protective member 54 is provided outside the cover 16. With such a structure, air escapes from the inside of the cover 16 to outside through the communication holes 18, thereby preventing a sharp increase in the internal pressure of the cover 16 at the time of explosion. Accordingly, the rupture of the overall cover 16 which would otherwise be caused by a sharp rise in the internal pressure can be thoroughly prevented. Further, the protective member 54 is disposed outside the cover 16, thereby preventing the high-pressure air ejected from the communication holes 17 from directly impinging on other components. As shown in FIG. 20, a filter 71 made of meshed or porous metallic material is attached to the inner surface of the cover 16 so as to cover the communication holes 18. With the foregoing structure, the need for the aforementioned protective member 54 can be eliminated, and broken pieces of the sealing member 48 caused as a result of explosion of the explosive 46 can be effectively prevented from being scattered outside the communication holes 18. Further, air escapes from the inside of the cover 16 to outside through the communication holes 18, thereby preventing a rise in internal pressure.

A waterproof section which is made from a waterproof sheet 72 and is readily broken by the blasting force of the explosive 46 may be labeled to the outer surface of the cover 16 so as to cover the communication holes 18. With such a structure, moisture is prevented from entering the cover 16 from the communication holes 18 in normal times by means of the waterproof sheet 72. The waterproof sheet 72 is broken by means of blasting force resulting from explosion of the explosive 46, permitting air from escaping from the inside of the cover 16 to outside through the communication holes 18. In this way, a sharp rise in the internal pressure of the cover 16 can be prevented.

Figure 21:
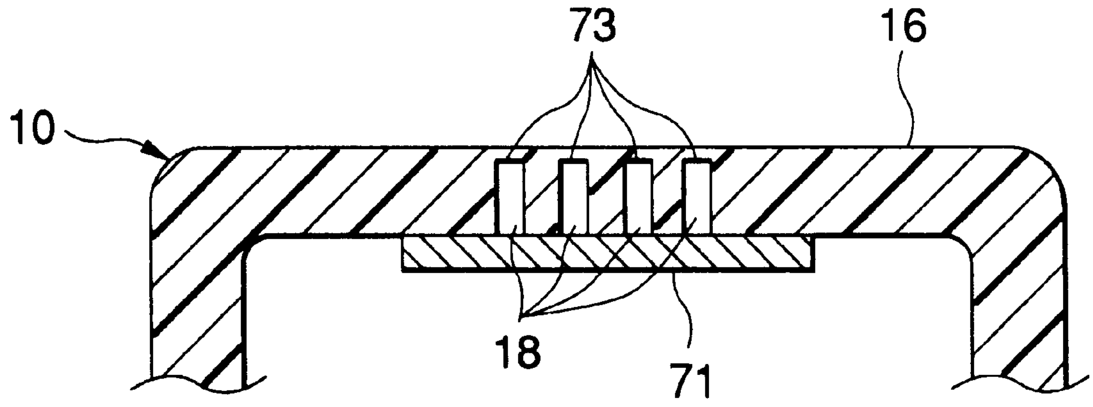
FIG. 21 is a cross-sectional front view showing a circuit breaker which is a still another example according to the second embodiment of the present invention.

As shown in FIG. 21, a thin-walled closing section 73 may be integrally formed with the cover 16 so as to close the upper ends of the communication holes 18. A waterproof section made from the closing section 73 is broken by means of the blasting force of the explosive 46, thereby permitting communication between the inside and outside of the cover 16 through the communication holes 18.

Figure 22:
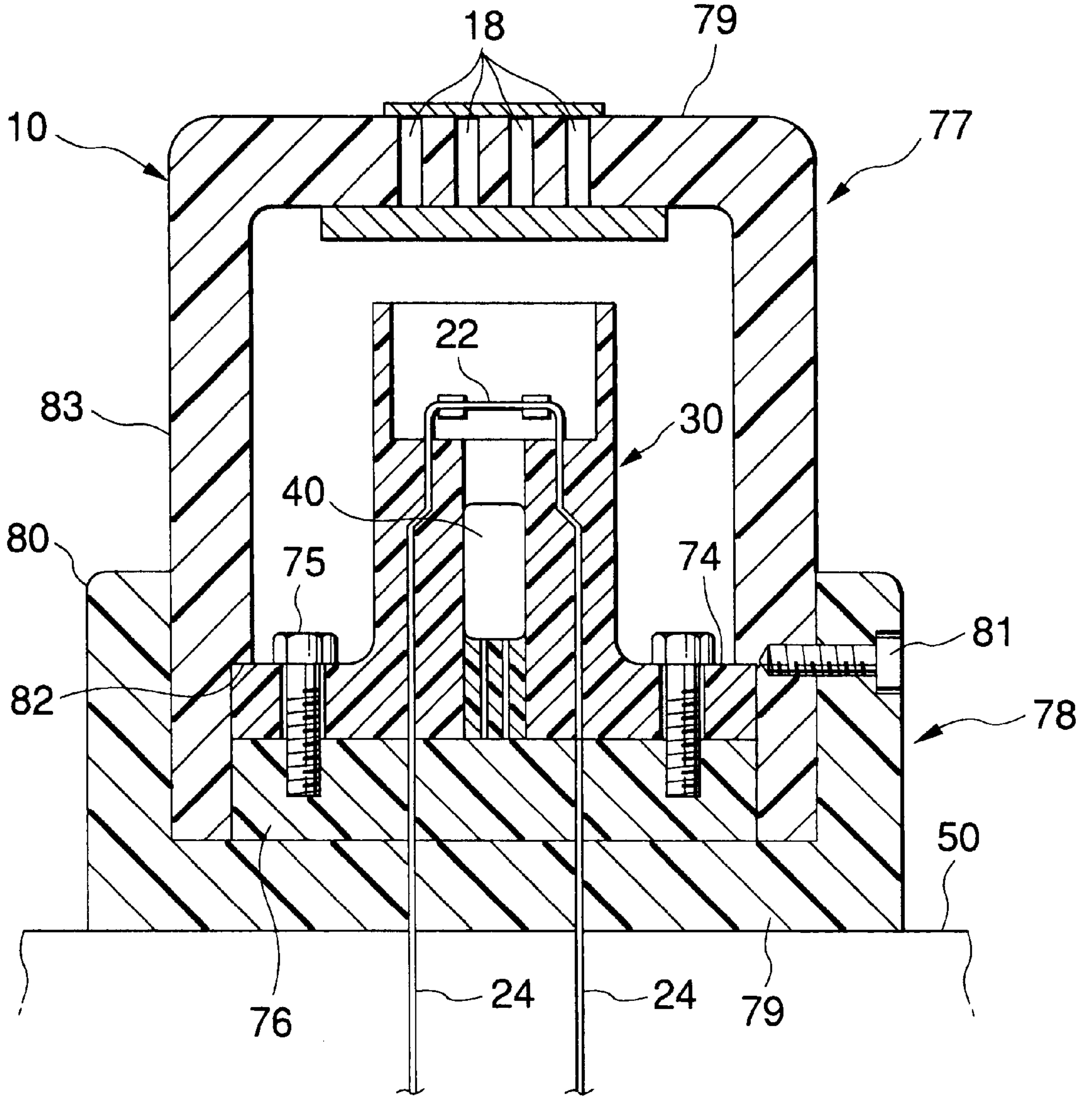
FIG. 22 is a cross-sectional front view showing a circuit breaker which is a still another example according to the second embodiment of the present invention.

As shown in FIG. 22, the housing body 10 comprises a bottom plate 76, an upper cover 77, and a lower cover 78. A mount section 74 horizontally protruding from the lower end of the cylindrical member 30 into which the explosive sealing section 40 is fitted is mounted on the bottom plate 76 by means of mount bolts 75. The upper cover 77 covers the bottom plate 76 and the cylindrical member 30 from above, and the lower cover 78 covers the same from below. The lower end of the upper cover 77 and the upper end of the lower cover 78 may be joined to each other while they are fitted together.

The upper cover 77 comprises a cylindrical portion 83 and a top portion 79 connected so as to close an upper portion of the cylindrical portion 83. A stepped portion 82 is formed on the inner surface in the vicinity of the lower end of the cylindrical portion 83, and the edge of the upper surface of the mount section 74 abuts the stepped portion 82. The lower cover 78 comprises a bottom wall 79 for covering an opening formed at the lower end of the upper cover 77 and a side wall 80 for covering the outer peripheral surface in the vicinity of the lower portion of the upper cover 77. The side wall 80 is fitted to the cylindrical portion 83 of the upper cover 77 by screwing of mount bolts 81, thereby integrally connecting the upper cover 77 to the lower cover 78.

With such a structure, the circumference of the cylindrical member 30 into which the explosive sealing section 40 is inserted is covered with the bottom plate 76, the upper cover 771 and the lower cover 78. The influence of blasting force of the explosive 46 can be effectively prevented from exerting on the housing body 10.

Figure 23:
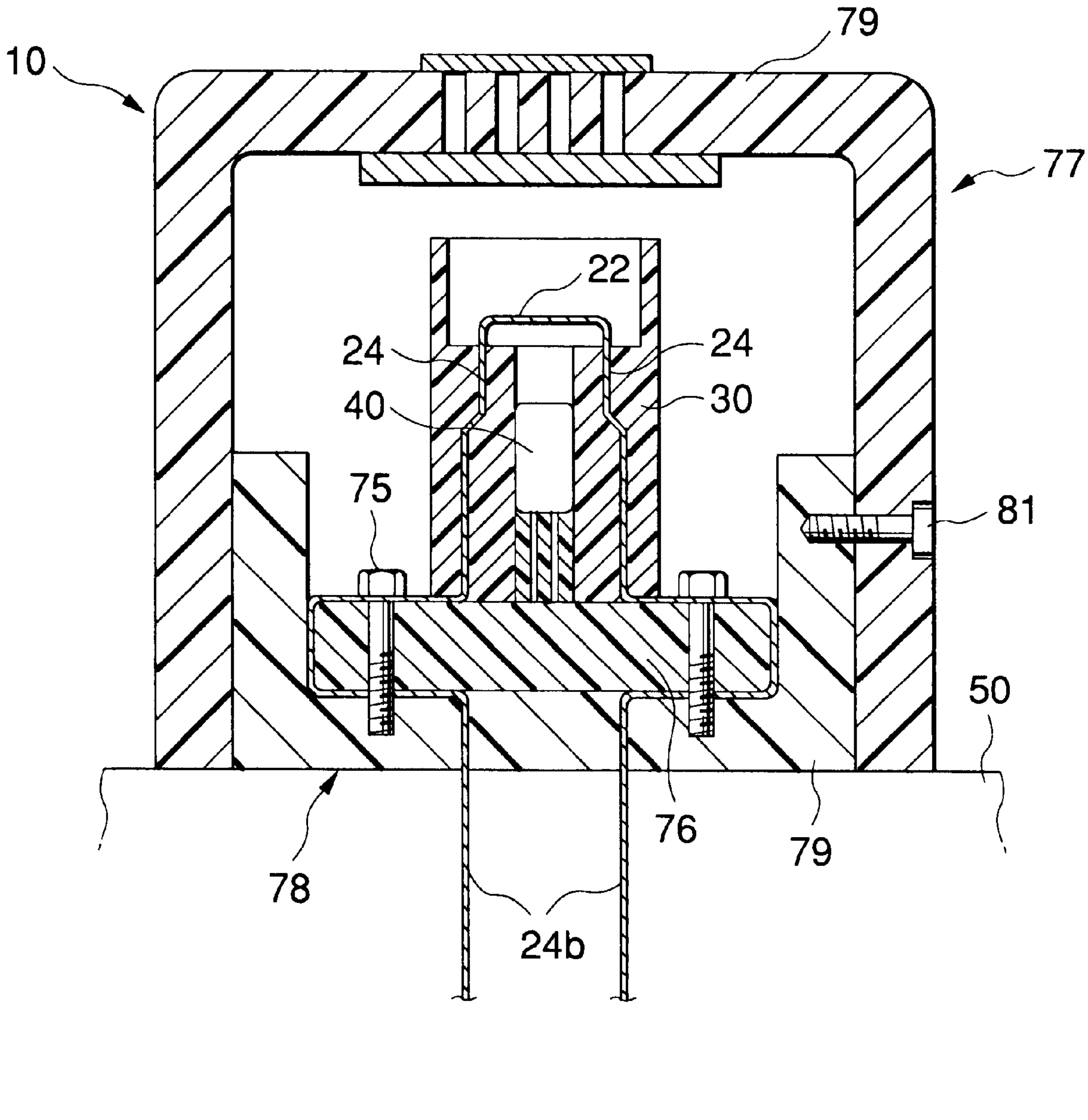
FIG. 23 is a cross-sectional front view showing a circuit breaker which is a still another example according to the second embodiment of the present invention.

In the embodiment shown in FIG. 22, the front ends of the downwardly-extended portions 24, 24 downwardly extended from both ends of the horizontal section 22 are led to outside from through holes formed in the bottom plate 59 in a downward direction. As shown in FIG. 23, the downwardly-extended portions 24, 24 connected to the horizontal section 22 are extended so as to run along the lower surface of the cylindrical member 30, the upper surface, side surfaces, and lower surface of the bottom plate 76, so that the ends of the downwardly-extended portions 24, 24 are led to the outside of the lower cover 78 through the bottom wall 79.

Figure 24:
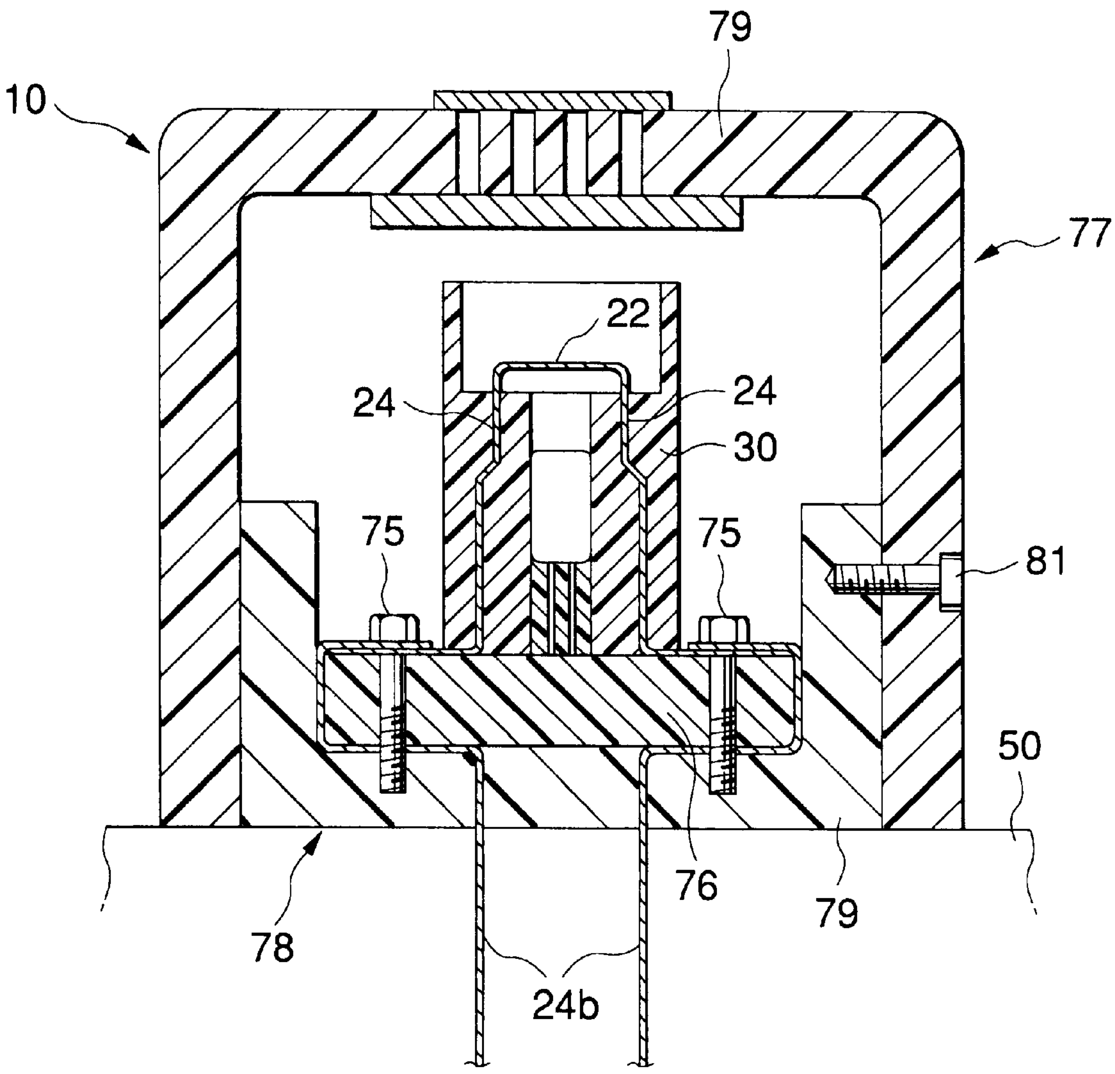
FIG. 24 is a cross-sectional front view showing a circuit breaker which is a still another example according to the second embodiment of the present invention.

The interval between lower ends 24*b*, 24*b* of the downwardly-extended portions 24, 24 regulated by means of connectors provided in the base 50 may be different from the interval between the downwardly-extended portions 24, 24 regulated by the insert holes formed in the cylindrical member 30. Even in such a case, the foregoing structure permits the downwardly-extended portions 24, 24 to be routed properly. Alternatively, the upper portion of the downwardly-extended portions 24, 24 and the lower portion of the same may be formed separately from each other. As shown in FIG. 24, the thus-formed upper and lower portions of the downwardly-extended portions 24, 24 may be connected together by overlapping the ends of the upper and lower portions each other at the positions where the mount bolts 75 will be fixed.

Figure 25:
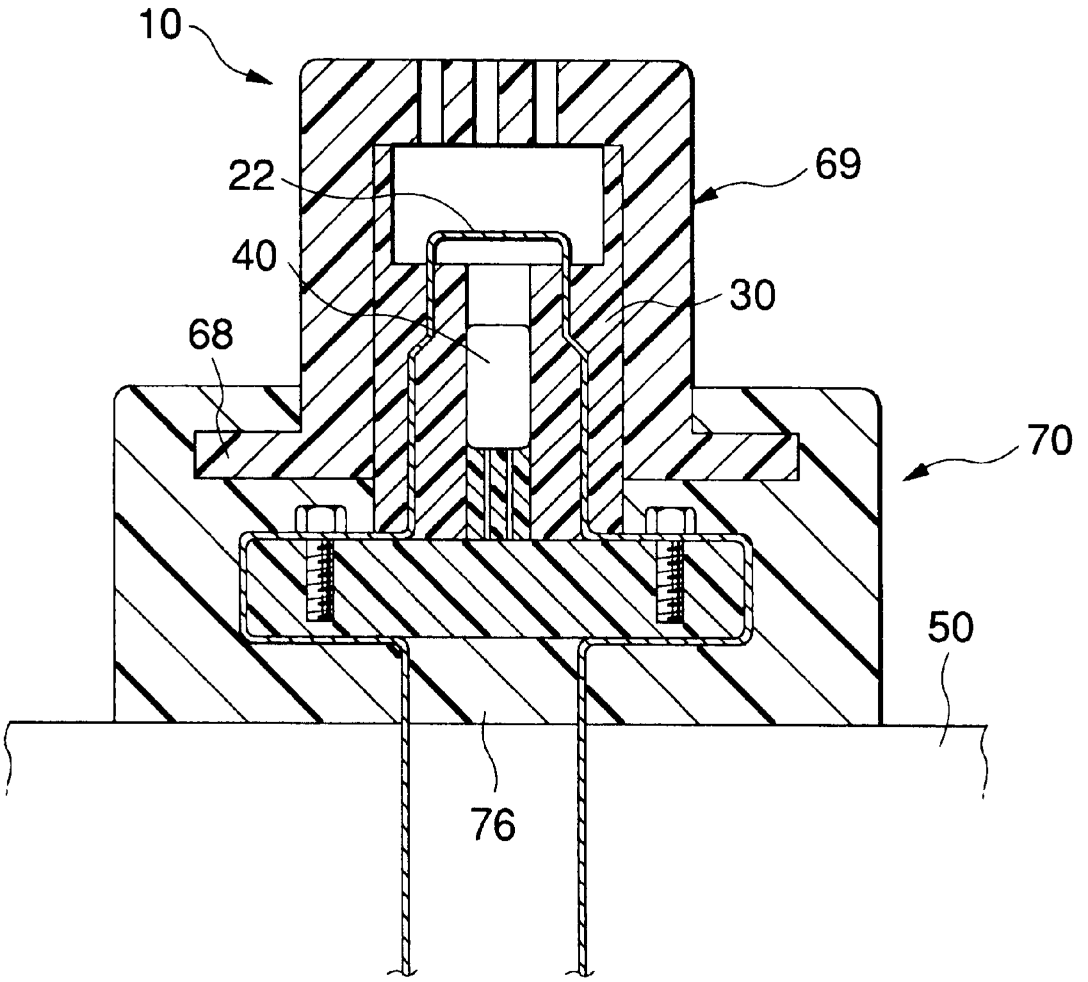
FIG. 25 is a cross-sectional front view showing a circuit breaker which is a still another example according to the second embodiment of the present invention.

As shown in FIG. 25, an upper cover 69 which has a horizontally-protruding flange 68 at the lower end is fitted so as to cover the cylindrical member 30 containing the explosive sealing section 40. The upper cover 69 and the bottom plate 76 are immersed into the mold resin contained in a mold, to thereby form a lower cover 70 so as to integrally surround the lower portion of the upper cover 69 and the outer portion of the bottom plate 76. With such a structure, bonding strength and air-tightness between the upper cover 69, the bottom plate 76, and the lower cover 70 can be effectively improved.

As has been described above, the second aspect of the present invention is directed to a circuit breaker in which an area to be broken is disposed in front of an opening of a cylindrical section within a housing. An explosive and means for heating the explosive are provided in the cylindrical section in such a way as to concentrate the blasting force of the explosive on the area to be broken. As a result, the area to be broken can be thoroughly broken by means of a comparatively small amount of blasting force. Accordingly, the present invention has the advantage of enabling abrupt interruption of a circuit in a safe and reliably manner by means of a simple and inexpensive structure.

An explosive sealing section is formed by encapsulation of the explosive and the heating means into a sealing member, and the thus-formed explosive sealing section is loaded into the cylindrical member. A step of setting an explosive can be facilitated, and there is the advantage of rendering the explosive, or the like, waterproof and dust-proof in a reliable manner.

In this case, if the explosive and the heating means are integrally molded, or if the explosive and the heating means are encapsulated in a capsule, the explosive sealing section can be manufactured in a simple structure. Particularly, in the latter case, if the capsule is formed from resin possessing heat shrinkable properties, there is the advantage of enabling reliable sealing of the explosive and the heating means by simple operation, such as heating of the capsule.

The housing is formed from a housing body and the cylindrical member. The housing body comprises an outer sheath which has an opening to permit communication between inside and outside of the housing body and the cover. An inner cylindrical portion having an opening formed at one end is inserted into the outer sheath in such a way that the opening of the inner cylindrical portion is directed toward the inside of the housing body, thereby constituting the cylindrical member. So long as the explosive is loaded into the inner cylindrical portion, the step of loading an explosive into a housing can be facilitated to a much greater extent.

In a circuit breaker, a small diameter cylindrical section having a diameter smaller than that of the cylindrical member is provided between the area to be broken and the explosive integrally formed with the heating means within the cylindrical member. The degree of concentration of blasting force on the area to be broken can be increased to a much greater extent. The blasting force required to break the area to be broken can be correspondingly reduced.

Particularly in the case where the small diameter cylindrical section is tapered toward the area to be broken, a loss of blasting force is reduced, thereby enabling an increase in the degree of concentration of blasting force on the area to be broken.

In the circuit breaker having a protective member disposed outside the housing so as to cover the same, a higher degree of safety can be ensured by means of the protective member even in a case where the housing is formed from light-weight synthetic resin which is easy to form. Particularly in the case of the circuit breaker in which communication holes are formed in the cover so as to permit communication between the inside and outside of the cover, the rupture of the cover is prevented while preventing a sharp increase in the internal pressure of the cover stemming from explosion. As a result, there is the advantage of ensuring prevention of the high-pressure air ejected from the communication holes from impinging on other components.

In a case where a filter is provided on a cover section in which the communication holes are formed so as to cover the communication holes, broken pieces are prevented from being scattered from the communication holes at the time of explosion of the explosive by means of the filter.

A waterproof section for covering the communication holes is ensured in the cover section. In the case where the waterproof section is broken by means of the blasting force of the explosive, moisture can be prevented from entering the inside of the cover through the communication holes by means of the waterproof section in normal times. Air escapes from the inside of the cover to outside through the communication holes by rupture of the waterproof section at the time of explosion of the explosive, thereby enabling prevention of a rise in the internal pressure of the cover.

The housing body comprises a bottom plate for covering the lower surface of the cylindrical member into which the explosive is loaded, an upper cover for covering the bottom plate and the cylindrical member from above, and a lower cover for covering the same from below. The lower end of the upper cover and the upper end of the lower cover are joined together while they are overlapped each other. The circumference of the cylindrical member into which the explosive is loaded is covered with the upper cover and the lower cover, thereby effectively preventing the housing body from being affected by the blasting force of the explosive.

In the circuit breaker in which the lower cover is integrally formed so as to cover the lower outer surface of the upper cover and the outer surface of the bottom plate, the bottom plate, the upper cover, and the lower cover are tightly connected to each other, thereby enabling an improvement in the bonding strength between the members and the air-tightness of the housing body.

In the circuit breaker in which the housing or the conductor is fixed on the base, the loss of explosion energy can be reduced to a much greater extent, thereby increasing the degree of concentration of the blasting force on the area to be broken to a much greater extent.

If the housing or the conductor is fixed on the outer surface of an electric connection box, and if the connector terminals are electrically connected to a circuit within the electric connection box, the need for a wire, such as a cable, for connecting the conductor to the electric connection box is eliminated, thereby simplifying the overall circuit breaker system.

Third Embodiment

Figure 26:
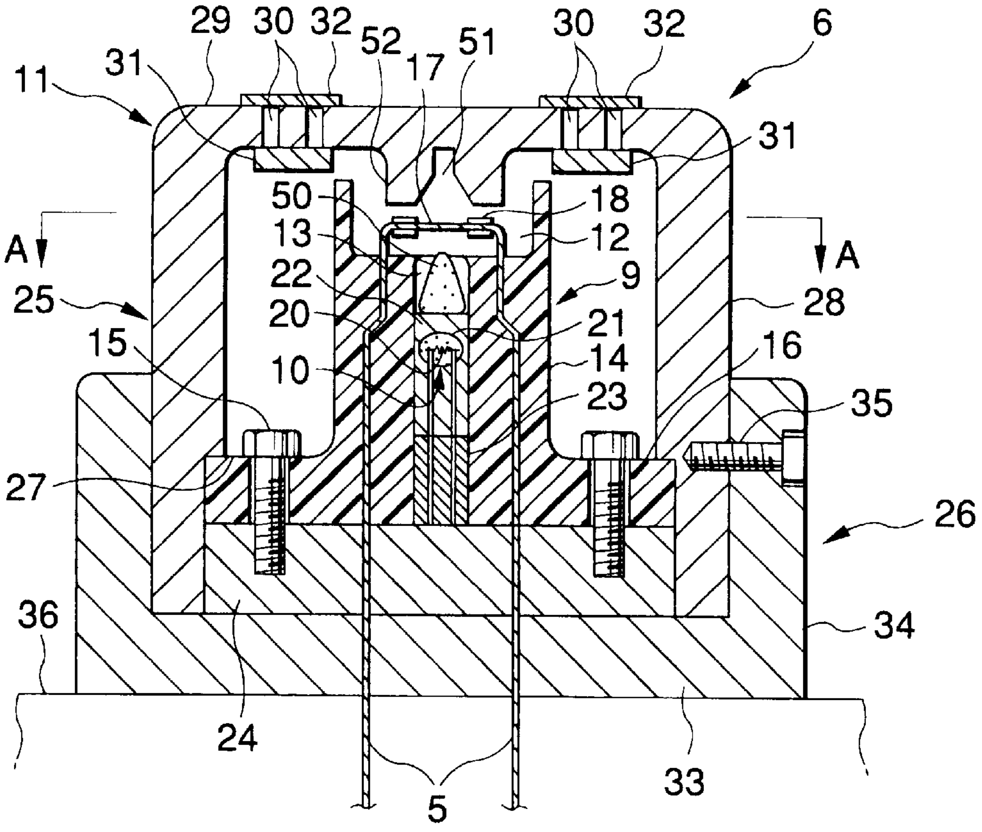
FIG. 26 is a cross-sectional view showing a third embodiment of the electric circuit breaker in accordance with the present invention.

FIG. 26 shows the circuit break section according to a third embodiment of the present invention. The circuit break section 6 comprises a hold member 9 for holding the power line 5; an explosive sealing section 10 disposed within the hold member 9; a housing 11 which surrounds the hold member 9; and a break member 50 for breaking the electric circuit. The hold member 9 comprises a main body 14 and a mount 16. An opening 12 for explosion purposes is formed in an upper to portion of the main body 14, and an opening 13 used for holding the explosive sealing section 10 is formed in a position below the opening 12. The mount 16 is mounted on the housing 11 by means of mount bolts 15. The hold member 9 is formed from insulating material; e.g., high-strength synthetic resins possessing heat resistance such as ceramics, nylon resin containing glass fillers, or PPS resins.

An area to be broken 17 (hereinafter referred to as a target area) is horizontally positioned within the opening 12 of the hold member 9. Heat reservoirs 18 are attached to the upper ends of respective segments of the power line 5 extending in an upward direction through the main body 14 of the hold member 9, and both ends of the target area 17 are connected to the upper ends of the segments of the power line via the heat reservoirs 8. The target area 17 is formed from a thin-walled fusible link in order to ensure that it is broken by means of a break member 50 which projects toward the target area 17 in accordance with the blasting force of the explosive 21 provided in the explosive sealing section 10. Further, the target area 17 is formed so as to be fused in the event of an excess current.

The explosive sealing section 10 is formed by sealing into a sealing member 22 detonating means comprising an electric heater wire 20 connected at both ends to lead wires 19 and an explosive 21 surrounding the detonating means. The lead wires 19 are downwardly led outside through the sealing member 22. Epoxy resin or rubber-like resin is suitable for in the sealing member 22. The sealing member 22 is molded indirectly or directly so as to integrally involve the electric heater wire 20 and the explosive 21.

The break member 50 is retained in a position above the explosive sealing section 10 held in the opening 13 of the hold member 9. The break member 50 is formed from insulating material such as ceramics having a strength sufficient to break the target area 17 and is formed into a conical shape. A protuberance is formed at the upper end of the opening 13 in order to prevent removal of the break member 50.

The housing 11 comprises a bottom plate 24 to which the mount 16 of the hold member 9 is screwed; an upper cover 25 fitted to the bottom plate 24 so as to cover the same from above; and a lower cover 26 fitted to the upper cover 25 so as to cover the circumference of a lower portion of the upper cover 25. The lower cover 26 and the bottom plate 24 are formed from insulating material such as synthetic resin, or the like. Further, the upper cover 25 is formed from synthetic resin or metallic material.

The upper cover 25 comprises a cylindrical portion 28 and a top plate 29 for covering the upper end of the cylindrical portion 28. A stepped portion 27 which abuts the edge of the upper surface of the mount 16 of the hold member 9 is formed on the internal surface in a lower portion of the cylindrical portion 28. A hold section 52 protrudes from the center of the top plate 29 and has a recess 51 for receiving the break piece 50 projected from the hold member 9 as a result of the explosion of the explosive 21. A plurality of air-release holes 30 are formed around the hold section 52 of the top plate 29. Further, a filter 31 which is formed from meshed or porous metallic material possessing superior heat resistance or heat conductivity is attached to a lower surface of the top plate 29. A waterproof sheet 32 is labeled to the upper surface of the top plate 29 and can be readily broken by means of the blasting force of the explosive 21.

The lower cover 26 comprises a bottom 33 for covering an opening formed at the lower end of the upper cover 25 and a side wall 34 for covering the outer peripheral surface of the lower portion of the upper cover 25. The side wall 34 is screwed to the cylindrical portion 28 of the upper cover 25 by means of the mount bolts 25, and the bottom 33 is fixed on a mount 36 of the vehicle body by means such as a screw.

The power line 5 connected to the target area 17 is led outside by way of through holes formed in the bottom plate 24 of the housing 11 and in the bottom 33 of the lower cover 26. One end of the power line 5 is connected to the power source 4 for vehicle purposes, and the other end of the same is connected to the collection section 3. The lead wires 19, 19 connected to the detonating means comprising the electric heater wire 20 of the explosive sealing section 10 are connected to the control means 8 via the coupling connector 37 and the lead wires 58, 58.

The coupling connector 37 comprises a female connector 39 and a male connector 41. The female connector 39 has a pair of female terminals 38 connected to the electric heater wire of the explosive sealing section via the lead wires 19, 19. The male connector 41 has a pair of male terminals 30 to be connected to the female terminals 38. Continuity is established between the lead wires 58, 58 connected to the male terminal 38 and the lead wires 19, 19 by connection of the connectors 39, 41 so as to couple together the terminals 38, 40.

A short-circuit plate 43 is provided in the female connector 39 and is formed from a conductor. The short-circuit plate 43 has contact sections 42 which are brought into pressed contact with the female terminals 38. When the female connector 39 is not connected with the male connector 41, the female terminals 38 are connected together by way of the short-circuit plate 43, thereby bringing into a short-circuit state the detonating means comprising the electric heater wire 20 of the explosive sealing section 10 connected thereto. A protuberance 44 formed from insulating material is positioned in the male connector 41. When the connectors 39, 41 are coupled together, the protuberance 44 is inserted between the female terminals 38 of the female connector 39 and the contact sections 42, to thereby separate the contacts 42 from the female terminals 38. As a result, the lead wires 19, 19 are released from a short-circuit state.

The collision detection means 7 comprises a gravity sensor which is used in an air bag system for protecting passengers from damage at the time of collision of the vehicle and detects impact acceleration. If it is ascertained from a detection signal from the collision detection means 7 that the vehicle has caused a collision, the control means 8 supplies the electric current for detonating purposes to the electric heater wire 20 via the lead wires 19 and 58. The electric heater wire 20 is then heated, thereby exploding the explosive 21.

Figure 27:
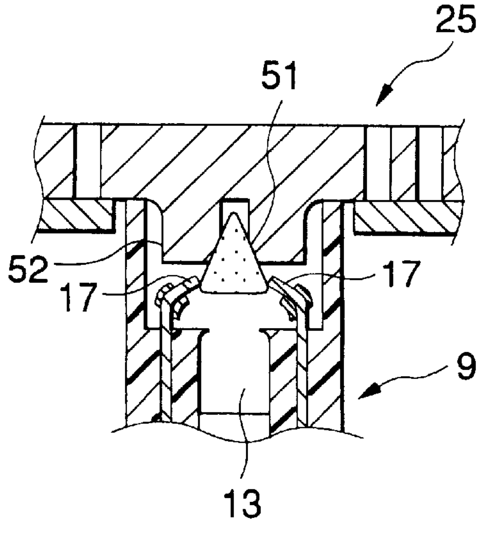
FIG. 27 is a cross-sectional view showing a target area of the electric circuit after the area has been broken.

In the foregoing structure, in the event of the collision of a vehicle, the electric current for detonating purposes is supplied from the control means 8 to the detonating means comprising the electric heater wire 20. The electric heater wire 20 is eventually heated, to thereby increase the temperature of the explosive 21. The explosive 21 is finally exploded. The break member 50 placed in a position above the explosive 21 is projected in an upward direction from the opening 13 of the hold member 9 by means of the blasting force of the explosive 21. As shown in FIG. 27, the target area 17 is broken, so that the continuity between the power line 5 and the electric wires 2 is instantaneously interrupting.

The break member 50 upwardly projected from the opening 13 of the hold member 9 is held by the hold section 52 while being stabbed into the recess 51 of the upper cover 25. The broken pieces of the target area 17 are held in a separated state by means of the break member 50 retained by the hold section 52.

The electric circuit breaker 6 having the detonating means which comprises the explosive 21 used for breaking the electric circuit and the electric heater wire 20 for exploding the explosive 21 by application of an electric current to the explosive 21 is provided with the break member 50 which projects to beak the target area 17 of the electric circuit as a result of explosion of the explosive 21. With this break member, the blasting force of the explosive 21 can be effectively utilized. Even in a case where the amount of explosive is reduced in comparison with the amount of explosive used in the existing circuit breaker for breaking an area to be broken in the electric circuit by means of the blasting force of the explosive, the electric circuit is interrupted without fail at the time of an abnormality such as collisions, to thereby prevent an electric current to flow to the vehicle load 1 and to effectively prevent damage.

In the foregoing embodiment, the break member 50 is formed from insulating material such as ceramics, thereby resulting in an advantage of prevention of continuity between the broken pieces of the target area 17 by means of the break member 50.

Particularly, as described with reference to the embodiment, the detonating means which comprises the target area 17 of the electric circuit, the explosive 21, and the electric heater wire 20 is housed within the housing 11, and the housing 11 is provided with the hold section 52 for holding the break member 50 protruded as a result of explosion of the explosive 21. The broken pieces of the target area 17 are held in a separated state by means of the break member 50 which is formed from insulating material and is retained by the hold section 52. Accordingly, the break member 50 can effectively prevent contact and continuity between the broken pieces of the break member 50.

In the foregoing embodiment, the target area 17 is ensured in a part of the power line 5 that connects the vehicle power source 4 with the collection section 3 of the electric wires 2 connected to the plurality of vehicle loads 1, and the target area 17 is broken by the break member 50 projected by means of the blasting force of the explosive 21. As a result, the electric currents can be simultaneously prevented from flowing to the plurality of vehicle loads 1 by interruption of the power line 5 connected to the vehicle loads 1.

The power line 5 itself or a part of the electric wires 2 may be broken by means of the beak member 50. However, as described in the previous embodiment, in the case where the target area 17 comprising a fusible link is positioned in a part of the power line 5 that connects the vehicle power source 4 with the collection section 3 of the electric wires 2 connected to the plurality of vehicle loads 1, and the fusible link is broken by means of the blasting force of the explosive 21, there is eliminated a need of the area used for positioning the fusible link aside from the circuit break section 6. Therefore, the present invention has the advantage of simplifying the structure of the electric circuit breaker and rendering the electric circuit breaker compact.

The target area 17, the detonating means comprising the electric heater wire 20, and the hold means 9 holding the explosive 21 are positioned within the housing 11 comprising the bottom plate 24, the upper cover 25, and the lower cover 26. With this structure, the sealing member 22 can be effectively prevented from being scattered around as a result of explosion of the explosive 21.

Further, the air-release holes 30 are formed in the top plate 29 of the upper cover 25. The upper-side of the air-release holes 30 is covered with the waterproof sheet 32, and the lower-side of the air-release holes 30 is covered with the filter 31. Moisture is prevented from entering the inside of the housing 11 through the air-release holes 30 in normal times by means of the waterproof sheet 32. The waterproof sheet 32 is broken by the air blast caused by the explosive 21 at the time of collision, thereby releasing air from the inside of the housing 11 to the outside through the air-release holes 30. As a result, an increase in the internal pressure of the housing 11 can be prevented. Further, the broken pieces of the sealing member 22 can be prevented from being scattered around the outside through the air-release holes 30 by means of the filter 31.

In the present embodiment, the lead wires 19, 19 connected to the detonating means comprising the electric heater wire 20 of the explosive sealing section 10 are coupled to the lead wires 58, 58 connected to the control means 8 via the coupling connector 37. The short-circuit plate 43 that connects the female terminals 38 together in normal times is provided for the female connector 39 constituting the coupling connector 37. The detonating means comprising the electric heater wire 20 of the explosive sealing section 10 is held in a short-circuit state. With the structure, the explosive 21 can be prevented from being erroneously exploded under the influence of noise or static electricity due to a disturbance when the electric circuit breaker is assembled or stored.

A protuberance 44 formed from insulating material is positioned in the male connector 41. When the female connector 39 is coupled to the male connector 41, the protuberance 44 is inserted between the female terminals 38 of the female connector 39 and the short-circuit plate 43, to thereby separate the short-circuit plate 43 from the female terminals 38. As a result, the electric heater wire 20 is released from a short-circuit state. When the electric circuit breaker 6 is in use, the electric heater wire 20 is released from a short-circuit state by connection of the connectors 39, 42, thereby ensuring continuity between the lead wires 19, 19 and the lead wires 58, 58.

As shown in the foregoing embodiment, in a case where the explosive sealing section 10 formed by encapsulation of the electric heater wire 20 and the explosive 21 into the sealing member 22 is positioned in the opening 13 of the hold member 9, there is the advantage of being able to readily and safely set the explosive 21, as well as to make the explosive 21 waterproof thoroughly.

In place of the foregoing structure, the explosive sealing section 10 may be formed through use of a capsule 47 similar to the first embodiment. The capsule 47 which is opened at a downward end is formed from stainless steel into a thin-walled container. A closure 48 is attached so as to close the opening formed at the lower end of the capsule 47 while the electric heater wire 20 and the explosive 21 are loaded in the capsule 47, and the closure 48 is fixed to the opening by required means. A pair of lead wire insert holes 49 are formed in the closure 48, and the pair of lead wires 19, 19 connected to the electric heater wire 20 are led to the outside of the capsule 47 through the lead wire insert holes 49.

Even in such a structure, the previously-completed explosive sealing section 10 can be readily positioned only by insertion of it into the opening 13 of the hold member 9. The thin-walled capsule 47 is broken in an upward direction at the time of explosion of the explosive 21, and the blasting force acts on the target area 17 in a concentrated manner. Therefore, the target area 17 can be broken without fail. Further, since the explosive 21 is sealed in the capsule 47 before explosion, the explosive can be thoroughly made waterproof and dustproof. In place of the electric heater wire 20, the explosive sealing section 10 may be provided with the detonating means that makes a spark when receiving electric power.

Figure 28:
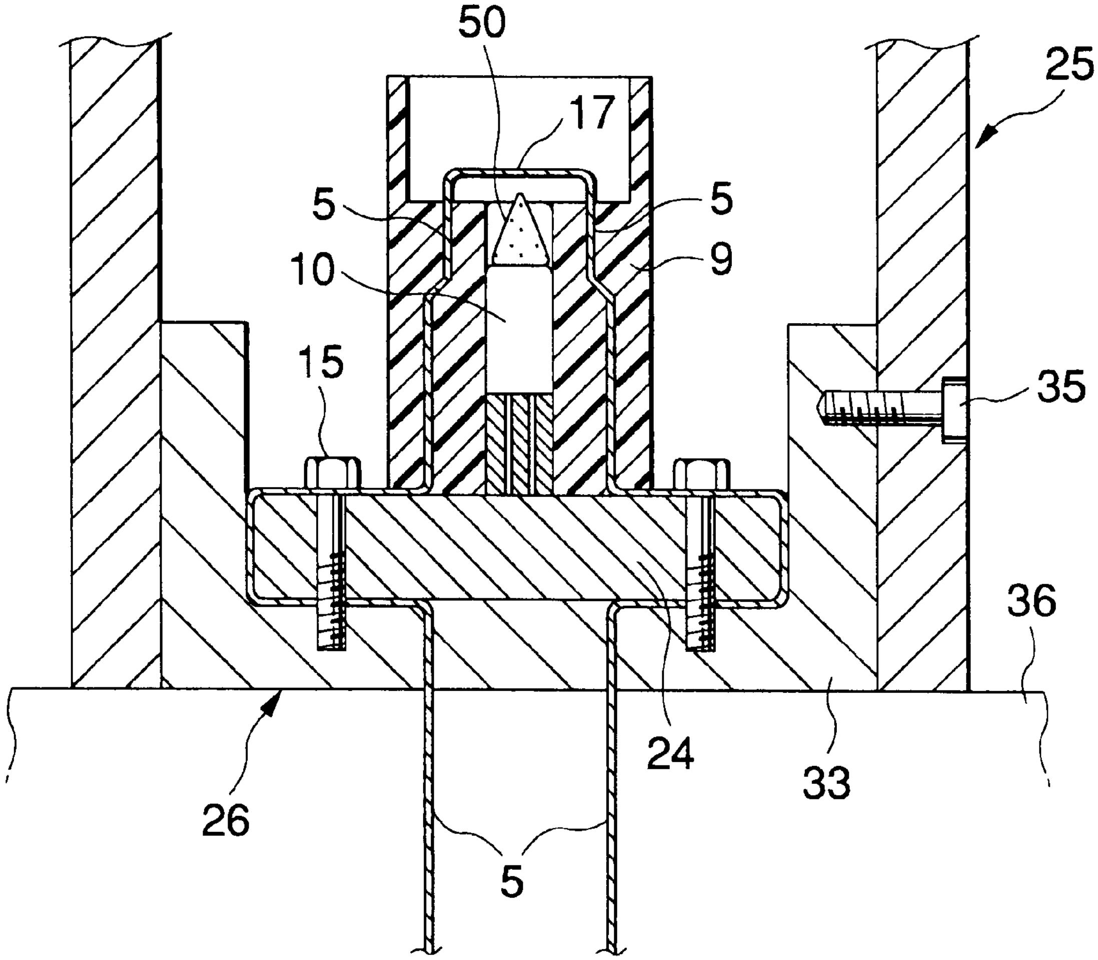
FIG. 28 is a cross-sectional view showing another example of the electric circuit breaker according to the ninth embodiment.

As shown in FIG. 28, both ends of the lead wire 5 connected to the target area 17 may be extended so as to run along the lower surface of the hold member 9, the upper surface, side surfaces, and lower surface of the bottom plate 24, so that the ends of the lead wire 5 are led to the outside of the lower cover 26 through the bottom wall 33. Further, the lead wire 5 may be fixed on the bottom plate 24 and the bottom 33 of the lower cover 26 by means of the mount bolts 15.

Figure 29:
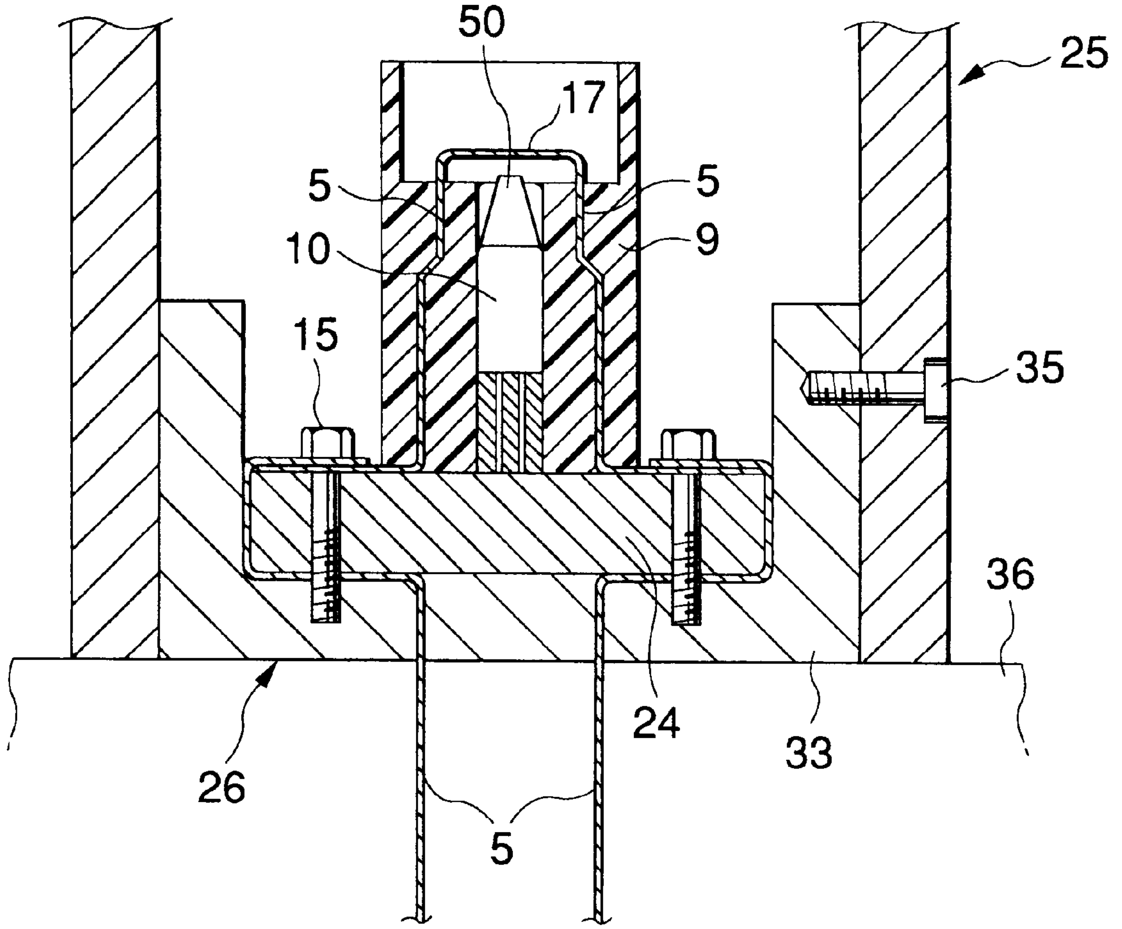
FIG. 29 is a cross-sectional view showing still another example of the electric circuit breaker according to ninth embodiment.

With the foregoing structure, the interval between both ends of the lead wire 5 regulated by means of connectors provided in the mount 36 of the vehicle body may be different from the interval between both ends of the lead wire 5 regulated by the insert holes formed in the hold member 9. Even in such a case, the present invention has the advantage of enabling proper routing of the lead wire 5. Alternatively, as shown in FIG. 29, the upper portion of the lead wire 5 and the lower portion of the same may be formed separately from each other. The thus-formed upper and lower portions of the lead wire 5 may be connected together by overlapping the ends of the upper and lower portions each other at the positions where the mount bolts 15 will be fixed.

In the previous embodiment, the explanation has been given of the case where the air-release holes 30 formed in the top plate 29 of the upper cover 25 are covered with the separate waterproof sheet 32 is labeled to the top plate 29. However, a closing section for closing the upper ends of the air-release holes 30 may be integrally formed in the top plate 29 of the upper cover 25. The closing section may be broken by means of the blasting force of the explosive 21, thereby allowing communication between the inside and outside of the housing 11 through the air-release holes 30.

Furthermore, similar to the first embodiment, a vehicle load which is desirably maintained in an active state at the time of collision of a vehicle; e.g., a vehicle load 1*a* such as a room lamp or hazard flashers used for indicating that the vehicle is a hazard, is desirably connected to the power line 5 in an upstream position with respect to the location of the circuit breaker 6, thereby ensuring supply of an electric current to the vehicle load la even after the target area 17 of the electric circuit has been broken.

The electric circuit breaker according to the present invention is not limited to vehicle applications but may be applied to various types of electric circuits which are configured so as to interrupt circuitry in the event of an abnormality such as the flow of an overload current or short-circuit current. Further, as shown in FIG. 29, the break member 50 is not limited to a cone but may be modified into various shapes such as a truncated cone.

As has been described above, in accordance with a third aspect of the present invention, there is provided an electric circuit breaker including an explosive for breaking an electric circuit and detonating means for exploding the explosive by application of electric power to the explosive, the improvement being characterized by comprising: a break member which, as a result of explosion of the explosive, projects toward an area of the electric circuit to be broken. With the foregoing structure, in comparison with the amount of explosive required for an existing circuit breaker designed to break an area to be broken by means of the air blast of the explosive, the amount of explosive required for the electric circuit breaker according to the present invention can be reduced. In the event of an abnormality such as a collision, an electric current is prevented from flowing to loads connected to the electric circuit by thorough interruption of the electric circuit, thereby effectively preventing damage to the loads.

Furthermore, in accordance with the present invention, the break member is formed from an insulating material, thereby resulting in an advantage of enabling prevention of continuity between the broken pieces by means of the break member.

Moreover, in accordance with the present invention, the area of the electric circuit to be broken, an explosive, and the detonating means are housed in the housing, and a hold section is provided in the housing and holds the break member projected as a result of the explosion of the explosive; and wherein the area to be broken is held in a separated state by means of the break member retained by the hold member after the area has been broken. Accordingly, the break member can effectively prevent continuity between the broken pieces after the target area has been broken.

Fourth Embodiment

Figure 30:
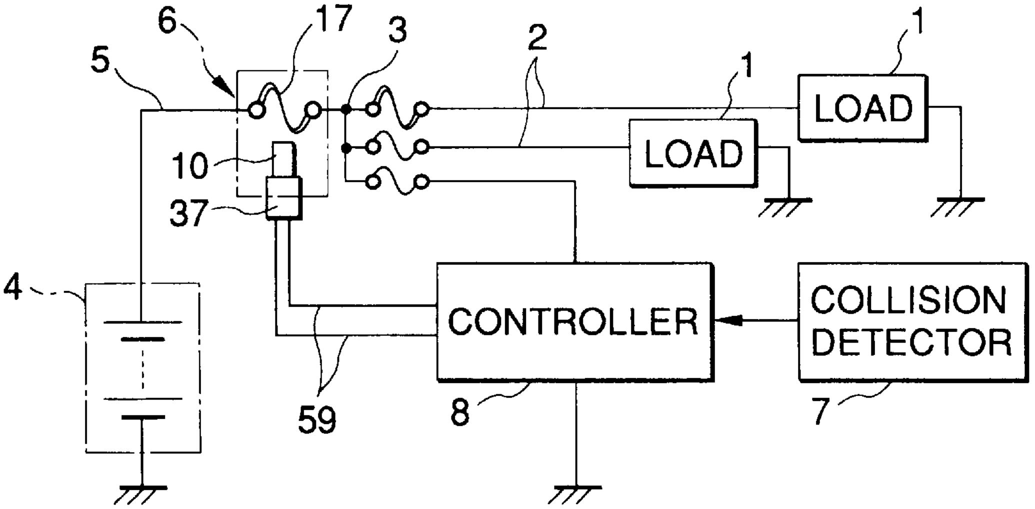
FIG. 30 is a schematic diagram representing one example of an electric circuit having an electric circuit breaker in accordance with the present invention.

FIG. 30 shows an electric circuit of a vehicle having an electric circuit breaker in accordance with a fourth embodiment of the present invention. The electric circuit comprises a collection section 3 where electric wires 2 respectively connected to a plurality of vehicle loads 1 are brought together into one line; a circuit break section 6 which interrupts the electric circuit by rupture of a part of a power line 5 by way of which the collection section 3 is connected to a vehicle power source 4; collision detection means 7 for detecting collision of the vehicle; and control means 8 which controls the circuit break section 6 in such a way that it is activated in response to a detection signal from the collision detection means 7.

Figure 31:
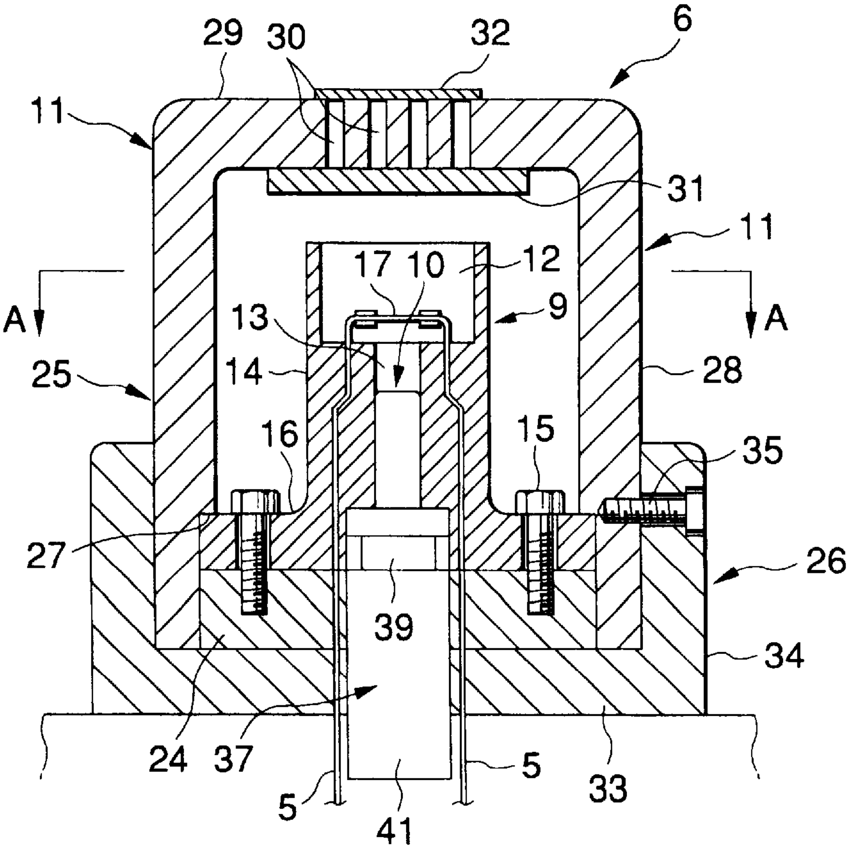
FIG. 31 is a cross-sectional view showing the electric circuit breaker in accordance with a fourth embodiment of the present invention.

As shown in FIG. 31, the circuit beak section 6 comprises a hold member 9 for holding the power line 5; an explosive sealing section 10 disposed within the hold member 9; a housing 11 which surrounds the hold member 9; and a coupling connector 37. The hold member 9 comprises a main body 14 and a mount 16. An opening 12 for explosion purposes is formed in an upper portion of the main body 14, and an opening 13 used for holding the explosive sealing section 10 is formed in a position below the opening 12. The mount 16 is mounted on the housing 11 by means of mount bolts 15. The hold member 9 is formed from insulating material; e.g., high-strength synthetic resins possessing heat resistance such as ceramics, nylon resin containing glass fillers, or PPS resins.

An area to be broken 17 (hereinafter referred to as a target area) is horizontally positioned within the opening 12 of the hold member 9. Heat reservoirs 18 are attached to the upper ends of respective segments of the power line 5 extending in an upward direction through the main body 14 of the hold member 9, and both ends of the target area 17 are connected to the upper ends of the segments of the power line 5 via the heat reservoirs 8. The target area 17 is formed from a thin-walled fusible link in order to ensure that it is broken by means of the blasting force of the explosive 21 provided in the explosive sealing section 10. Further, the target area 17 is formed so as to be fused in the event of an excess current.

Figure 32:
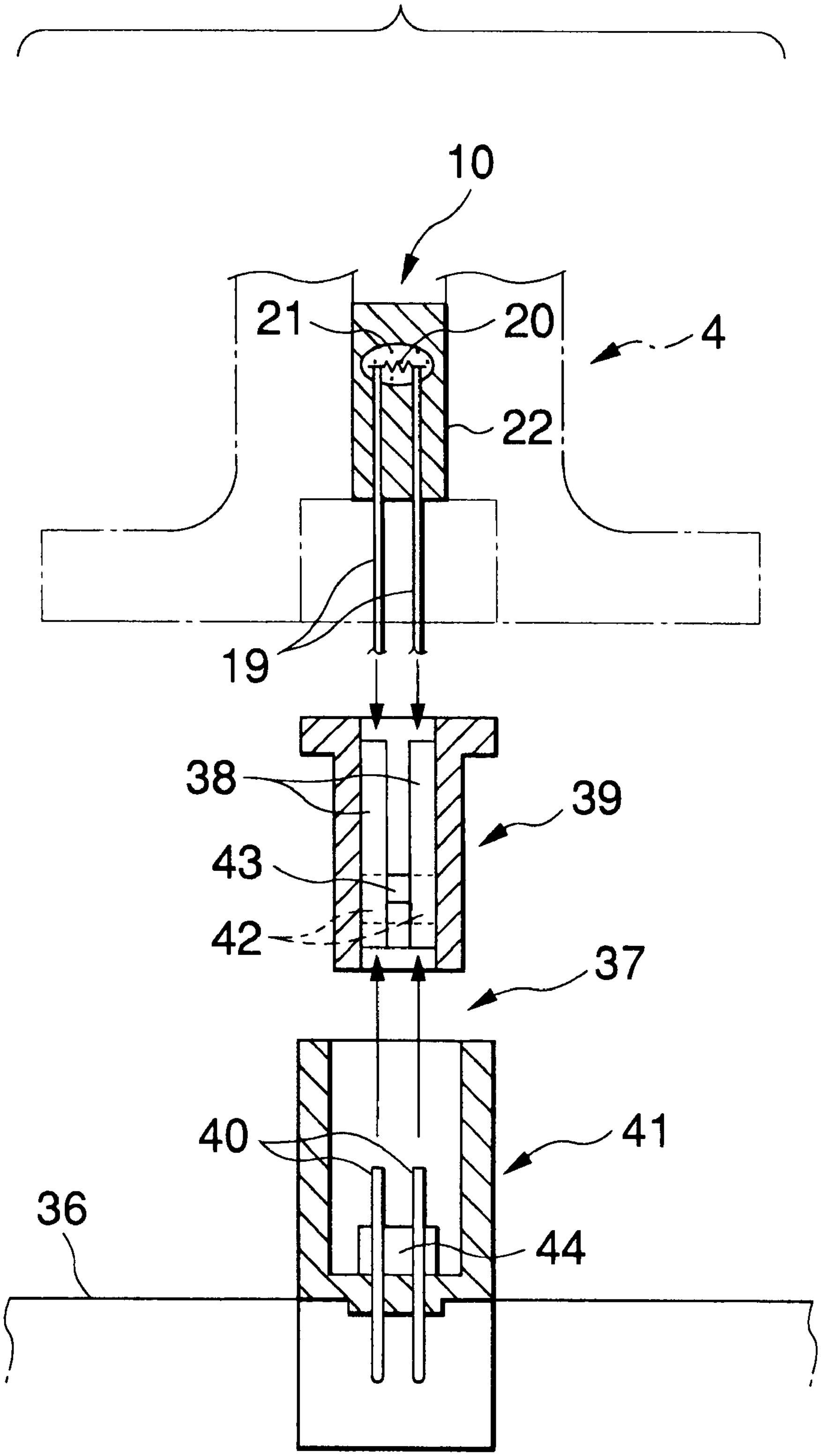
FIG. 32 is an explanatory view showing the principle elements of the electric circuit breaker in accordance with the fourth embodiment.

As shown in FIG. 32, the explosive sealing section 10 is formed by sealing into a sealing member 22 detonating means comprising an electric heater wire 20 connected at both ends to lead wires 19 and an explosive 21 surrounding the 40 detonating means. The lead wires 19 are downwardly led outside through the sealing member 22. Epoxy resin or rubber-like resin is suitable for the sealing member 22. The sealing member 22 is molded indirectly or directly so as to integrally involve the electric heater wire 20 and the explosive 21.

The lead wires 19, 19 downwardly led to the outside of the sealing member 22 are inserted into a female connector 39 of a coupling connector 37 positioned in the vicinity of the lower end of the housing 11, so that the lead wires 19, 19 are connected to female terminals 38 within the female connector 39. The female connector 39 is connected to a male connector 41 which is connected to power-application control means comprising the control means 8 via leads 58, 58. As a result of connection of the connectors 39, 41, male terminals 40 within the male connector 41 are connected to the female terminals 38, thereby connecting the lead wires 19, 19 to the lead wires 58, 58.

Figure 33:
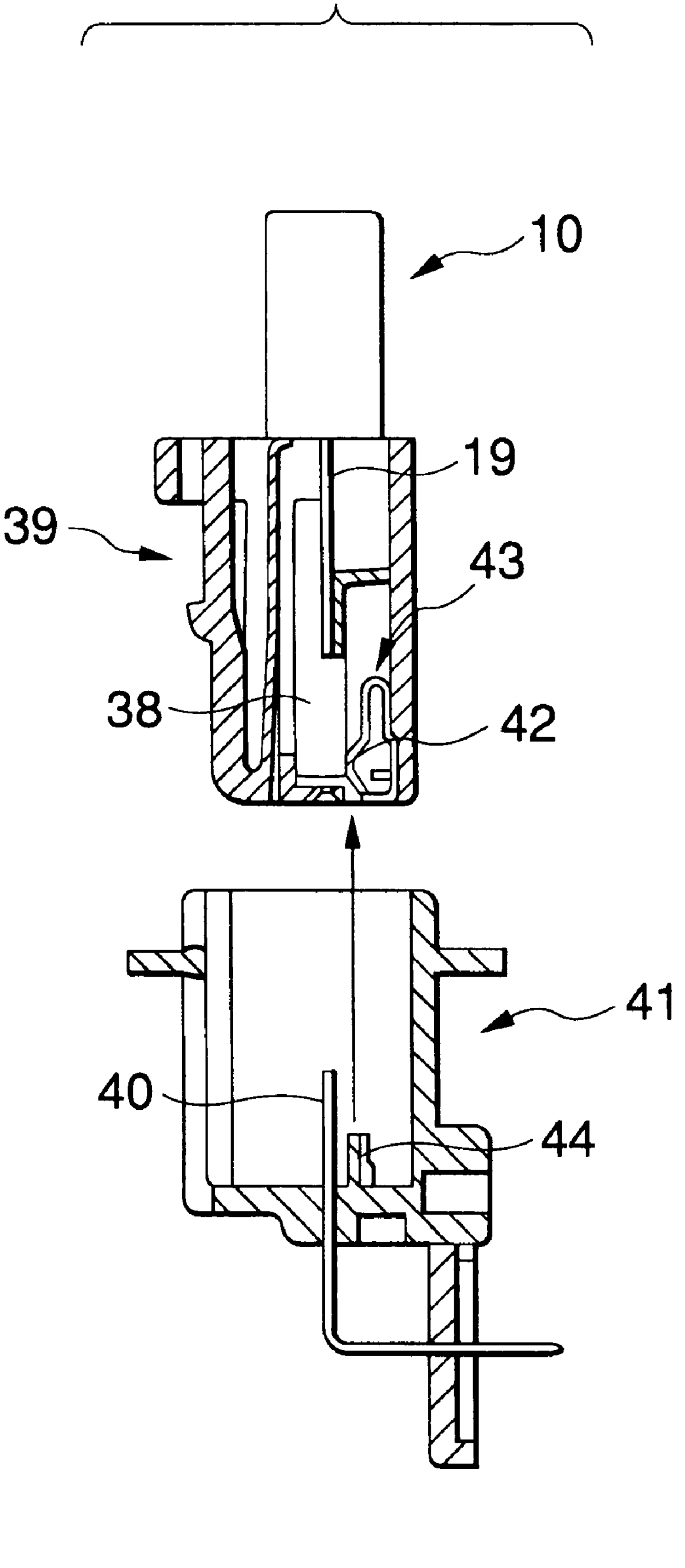
FIG. 33 is a cross-sectional view showing the structure of a coupling connector.

As show in FIG. 33, a short-circuit plate 43 formed from a conductor is provided in the female connector 39. The short-circuit plate 43 has contact sections 42 which are brought into pressed contact with the female terminals 38. When the female connector 39 is not connected with the male connector 41, the female terminals 38 are connected together by way of the short-circuit plate 43, thereby bringing into a short-circuit state the lead wires 19, 19 and the electric heater wire 20 of the explosive sealing section 10 connected thereto. A protuberance 44 formed from insulating material is positioned in the male connector 41. When the connectors 39, 41 are coupled together, the protuberance 44 is inserted between the female terminals 38 of the female connector 39 and the contact sections 42, to thereby separate the contacts 42 from the female terminals 38. As a result, the lead wires 19, 19 are released from a short-circuit state.

As shown in FIG. 31, the housing 11 comprises a bottom plate 24 to which the mount 16 of the hold member 9 is screwed; an upper cover 25 fitted to the bottom plate 24 so as to cover the same from above; and a lower cover 26 fitted to the upper cover 25 so as to cover the circumference of a lower portion of the upper cover 25. The lower cover 26 and the bottom plate 24 are formed from insulating material such as synthetic resin, or the like. Further, the upper cover 25 is formed from synthetic resin or metallic material.

The upper cover 25 comprises a cylindrical portion 28 and a top plate 29 for covering the upper end of the cylindrical portion 28. A stepped portion 27 which abuts the edge of the upper surface of the mount 16 of the hold member 9 is formed on the internal surface in a lower portion of the cylindrical portion 28. A plurality of air-release holes 30 are formed in the center of the top plate 29. Further, a filter 31 which is formed from meshed or porous metallic material possessing superior heat resistance or heat conductivity is attached to a lower surface of the top plate 29. A waterproof sheet 32 is labeled to the upper surface of the top plate 29 and can be readily broken by means of the blasting force of the explosive 21.

The lower cover 26 comprises a bottom 33 for covering an opening formed at the lower end of the upper cover 25 and a side wall 34 for covering the outer peripheral surface of the lower portion of the upper cover 25. The side wall 34 is screwed to the cylindrical portion 28 of the upper cover 25 by means of the mount bolts 25, and the bottom 33 is fixed on a mount 36 of the vehicle body by means such as a screw.

The power line 5 connected to the target area 17 is led outside by way of through holes formed in the bottom plate 24 of the housing 11 and in the bottom 33 of the lower cover 26. One end of the power line 5 is connected to the power source 4 for vehicle purposes, and the other end of the same is connected to the collection section 3. The lead wires 19, 19 connected to the detonating means comprising the electric heater wire 20 of the explosive sealing section 10 are connected to the control means 8 via the coupling connector 37 and the lead wires 58, 58.

The collision detection means 7 comprises a gravity sensor which is used in an air bag system for protecting passengers from damage at the time of collision of the vehicle and detects impact acceleration. If it is ascertained from a detection signal from the collision detection means 7 that the vehicle has caused a collision, the control means 8 supplies the electric current for detonating purposes to the electric heater wire 20 via the lead wires 19 and 58. The electric heater wire 20 is then heated, thereby exploding the explosive 21.

In the foregoing structure, in the event of the collision of a vehicle, the electric current for detonating purposes is supplied from the control means 8 to the detonating means comprising the electric heater wire 20. The electric heater wire 20 is eventually heated, to thereby increase the temperature of the explosive 21. The explosive 21 is finally exploded. The target area 17 positioned above the explosive 21 is broken by means of the blasting force of the explosive 21, thereby instantaneously interrupting the continuity between the power line 5 and the electric wires 2.

As previously mentioned, the electric circuit breaker comprises the explosive 21 which breaks a part of the electric circuit by explosion; the circuit break section 6 which has the detonating means comprising the electric heater wire 20 used for exploding the explosive 21 by application of power to the explosive 21; the pair of lead wires 19, 19 which supply the electric current for detonating purposes to the electric heater wire 20; and the short-circuit plate 43 for making a short circuit in the lead wires 19, 19. When the electric circuit breaker is in use, the short-circuit plate 43 is separated from the lead wires 19 by means of the release means comprising the protuberance 44, thereby releasing the lead wires 19 from a short-circuit state. As a result, even in a case where during assembly or inspection the electric circuit is affected by the noise or static electricity stemming from a disturbance, an electric current is prevented from flowing to the explosive 21. In this way, the erroneous explosion of the explosive 21 can be fully prevented.

Further, when the electric circuit breaker is in use, the lead wires are released from a short-circuit state by means of the release means. With such an arrangement, the lead wires 58, 58 connected to the control means 8 are connected to the lead wires 19, 19. Accordingly, in the event of the collision of a vehicle, the electric current for detonating purposes is supplied to the electric heater wire 20, to thereby abruptly explode the explosive 21. The target area 17 is broken by the blasting force of the explosive 21, thereby instantaneously interrupting the continuity between the power line 5 and the electric wires 2. An electric current is prevented from flowing to the vehicle loads 1, which in turn effectively hinders damage to the vehicle loads 1.

In the foregoing embodiment, the electric circuit breaker has the housing 11 that comprises the target area 17 of the electric circuit, the explosive 21, and the detonating means including the electric heater wire 20 and the coupling connector 37. The coupling connector 37 comprises the pair of connectors 39, 41 used for connecting the lead wires 19, 19 to the lead wires 58, 58 connected to the power-application means (control means 8). The connector (i.e., the female connector) 39 connected to the detonating means is provided within the housing 11, and the pair of lead wires 19, 19 connected to the connector 39 are brought into a short-circuit state by means of the short-circuit plate 43. Even if the electric current for detonating purposes flows to the lead wires 19, 19 during assembly or inspection of the electric circuit breaker, the erroneous explosion of the explosive 21 can be thoroughly prevented.

The connector 41 connected to the power-application control means 41 is provided with the release means that causes the short-circuit plate 43 to release the electric wires 19, 19 from a short-circuit state in response to the coupling of the connector 39 to the connector 41. By virtue of the release means, when the electric circuit breaker is in use, the lead wires 19, 19 are readily released from a short-circuit state, and the lead wires 19, 19 can be properly connected to the lead wires 58, 58.

More specifically, as a result of the housing 11 of the circuit break section 6 being attached to the mount 36 of the vehicle, the female connector 39 is coupled to the male connector 41 that is fixed on the mount 36 of the vehicle body in advance through use of mount bolts or the like. In response to the coupling action, the protuberance 44 of the male connector 41 is inserted between the female terminals 38 of the female connector 39 and the short-circuit plate 43. As a result, the short-circuit plate 43 is separated from the female terminals 38. Consequently, the mounting of the housing 11 to the mount 36 of the vehicle, the release of the lead wires 19, 19 from a short-circuit state, and the connection of the lead wires 19, 19 to the lead wires 58, 58 can be simultaneously performed, thereby resulting in a remarkable improvement in the ease of assembly of the electric circuit breaker.

Particularly in a case where the mount 36 of the vehicle on which the housing 11 of the circuit break section 6 is mounted is formed into an electric connection box, there is eliminated a need of an additional cable used for connecting the lead wires 19, 19 provided in the housing 11 to the electric circuit housed in the electric connection box, thereby enabling effective simplification of the overall electric circuit breaker system.

In the foregoing embodiment, the target area 17 is ensured in a part of the power line 5 that connects the vehicle power source 4 with the collection section 3 of the electric wires 2 connected to the plurality of vehicle loads 1, and the target area 17 is broken by means of the blasting force of the explosive 21. As a result, the electric currents flowing to the plurality of vehicle loads 1 can be simultaneously interrupted only by disconnection of the power line 5 connected to the vehicle loads 1.

The power line 5 itself or a part of the electric wires 2 may be broken by explosion of the explosive 21. However, as described in the previous embodiment, in the case where the target area 17 comprising a fusible link is positioned in a part of the power line 5 that connects the vehicle power source 4 with the collection section 3 of the electric wires 2 connected to the plurality of vehicle loads 1, and the fusible link is broken by means of the blasting force of the explosive 21, there is eliminated a need of the area used for positioning the fusible link aside from the circuit break section 6. Therefore, the present invention has the advantage of simplifying the structure of the electric circuit breaker and rendering the electric circuit breaker compact.

The target area 17, the detonating means comprising the electric heater wire 20, and the hold means 9 holding the explosive are positioned within the housing 11 comprising the bottom plate 24, the upper cover 25, and the lower cover 26. With this structure, the sealing member 22 can be effectively prevented from being scattered around as a result of explosion of the explosive 21.

Further, the air-release holes 30 are formed in the top plate 29 of the upper cover 25. The upper-side of the air-release holes 30 is covered with the waterproof sheet 32, and the lower-side of the air-release holes 30 is covered with the filter 31. Moisture is prevented from entering the inside of the housing 11 through the air-release holes 30 in normal times by means of the waterproof sheet 32. The waterproof sheet 32 is broken by the air blast caused by the explosive 21 at the time of collision, thereby releasing air from the inside of the housing 11 to the outside through the air-release holes 30. As a result, an increase in the internal pressure of the housing 11 can be prevented. Further, the broken pieces of the sealing member 22 can be prevented from being scattered around the outside through the air-release holes 30 by means of the filter 31.

As shown in the foregoing embodiment, in a case where the explosive sealing section 10 formed by encapsulation of the electric heater wire 20 and the explosive 21 into the sealing member 22 is positioned in the opening 13 of the hold member 9, there is the advantage of being able to readily and safely set the explosive 21, as well as to make the explosive 21 waterproof thoroughly.

In place of the foregoing structure, the explosive sealing section 10 may be formed through use of a capsule 47 similarly to the first embodiment. The capsule 47 which is opened at a downward end is formed from stainless steel into a thin-walled container. A closure 48 is attached so as to close the opening formed at the lower end of the capsule 47 while the electric heater wire 20 and the explosive 21 are loaded in the capsule 47, and the closure 48 is fixed to the opening by required means. A pair of lead wire insert holes 49 are formed in the closure 48, and the pair of lead wires 19, 19 connected to the electric heater wire 20 are led to the outside of the capsule 47 through the lead wire insert holes 49.

Even in such a structure, the previously-completed explosive sealing section 10 can be readily positioned only by insertion of it into the opening 13 of the hold member 9. The thin-walled capsule 47 is broken in an upward direction at the time of explosion of the explosive 21, and the blasting force acts on the target area 17 in a concentrated 45 manner. Therefore, the target area 17 can be broken without fail. Further, since the explosive 21 is sealed in the capsule 47 before explosion, the explosive can be thoroughly made waterproof and dustproof. In place of the electric heater wire 20, the explosive sealing section 10 may be provided with the detonating means that makes a spark when receiving electric power.

Figure 34:
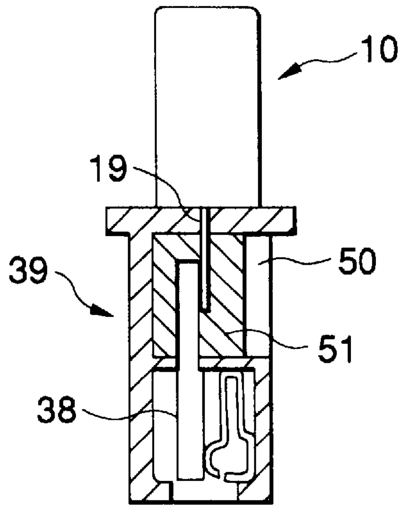
FIG. 34 is a cross-sectional view showing another example of attachment of the explosive sealing section.

As shown in FIG. 34, the explosive sealing section 10 may be coupled to the female connector 39, and the lead wires 19 of the explosive sealing section 10 may be connected to the female terminal 38 of the female connector 39. Sealing material 51, such as epoxy resin, may be poured to and solidify the joint where the lead wires 19 are connected to the female terminal 38 through an opening 50 formed in the side wall of the female connector 39. With such a structure, entry of moisture into the explosive sealing section 10 can be effectively prevented by sealing the lower surface of the explosive sealing section 10 with the sealing material 51. The lead wires 19 and the female terminals 38 can be stably held in a connected state. Further, the sealing material 51 prevents the blasting force of the explosive 21 from escaping in a downward direction.

Figure 35:
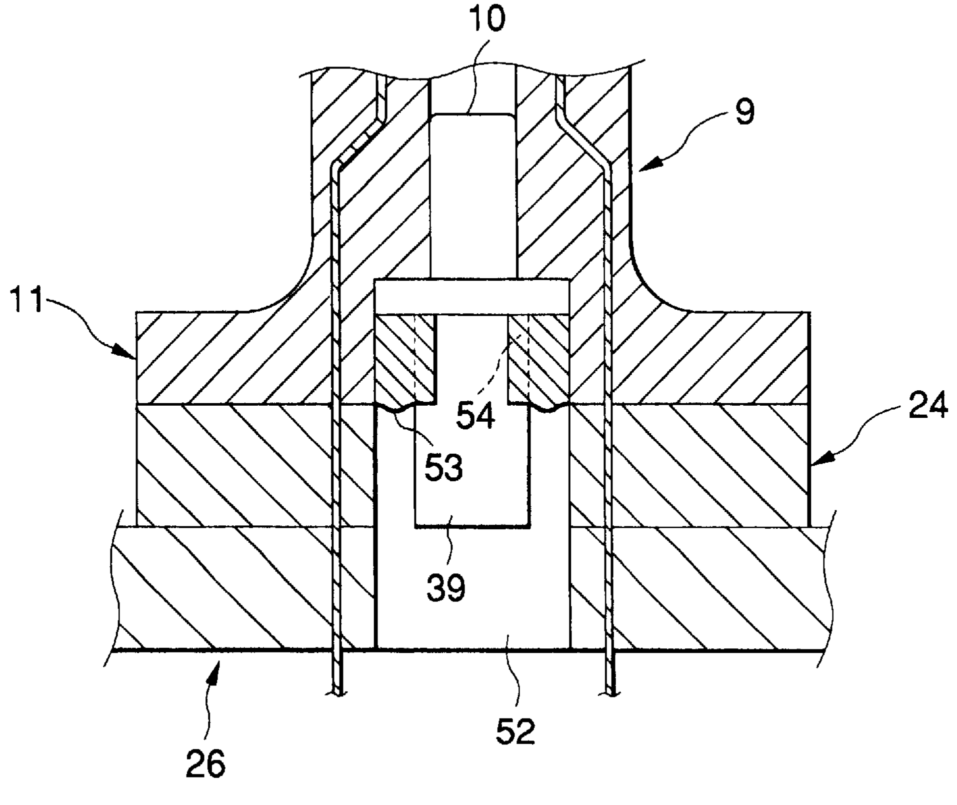
FIG. 35 is a cross-sectional view showing still another example of attachment of the explosive sealing section.

As shown in FIG. 35, the connector comprising the female connector 39 connected to the detonating means is provided in the housing 11. Preferably, sealing material 53, such as epoxy resin, is poured into an opening 52 formed in a lower portion of the housing 11 in order to solidify a lower portion of the female connector 39, so that the female connector 39 is fixed by the sealing material 53.

With the foregoing structure, the female connector 39 can be stably attached to the housing 11, and the location of the female connector 39 is sealed, thereby effectively preventing the entry of moisture into the housing 11 through the opening 52. In order to make the mounted state of the female connector 39 stable in a more effective manner, it is desirable that an indentation 54 to which the sealing material 53 is filled be formed in a part of or the overall the wall surface of the female connector 39.

Figure 36:
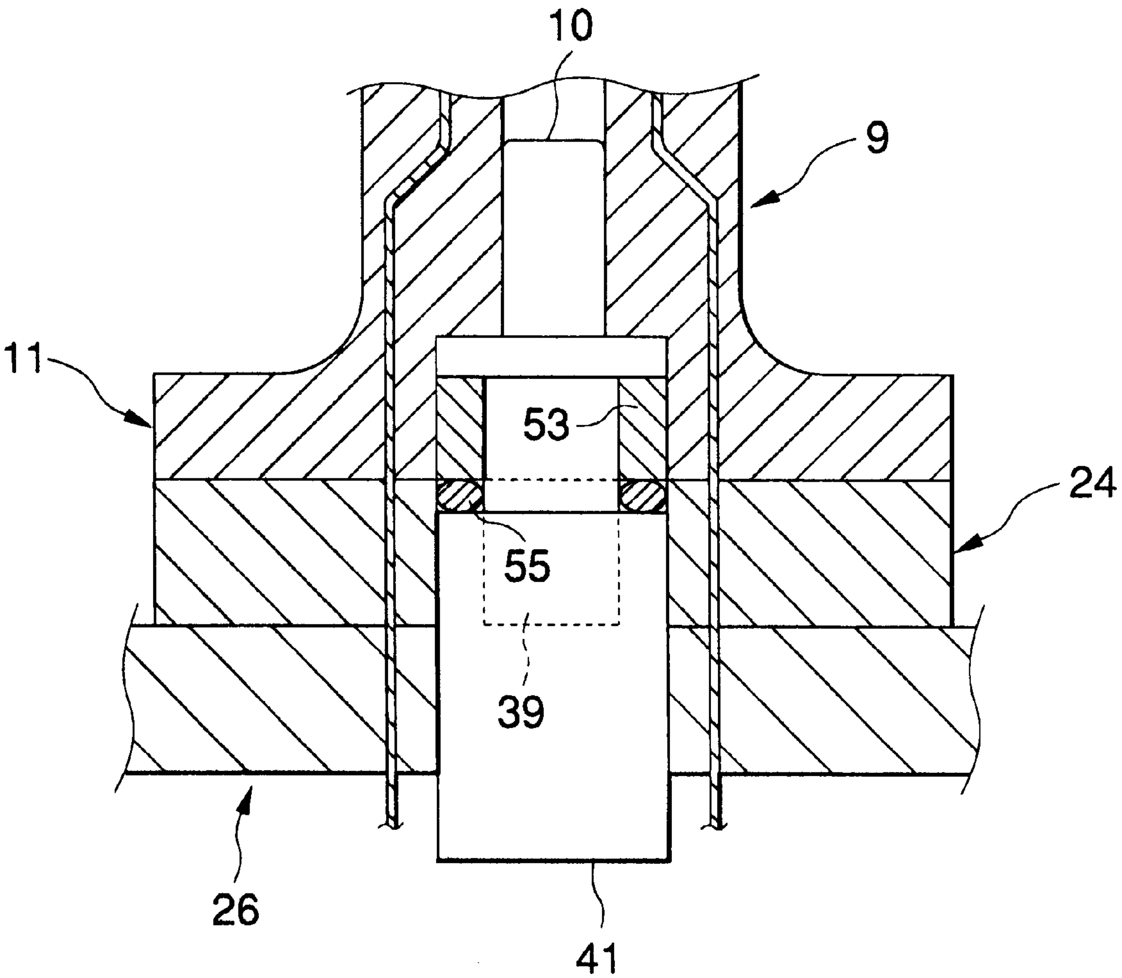
FIG. 36 is a cross-sectional view showing still another example of attachment of the explosive sealing section.

As shown in FIG. 36, an O-shaped or square seal ring 55 comprising synthetic rubber is provided on the lower end of the sealing material 53 in such a way as to be interposed between the female connector 39 positioned within the housing 11 and the male connector 31 connected to the female connector 39. In this case, the joint between the connectors 39, 41 is sealed with the seal ring 55, thereby more effectively preventing entry of moisture into the housing 11 through the joint. The sealing material 53 may be omitted, and the joint between the connectors 39, 41 may be sealed solely with the sealing ring 55.

Figure 37:
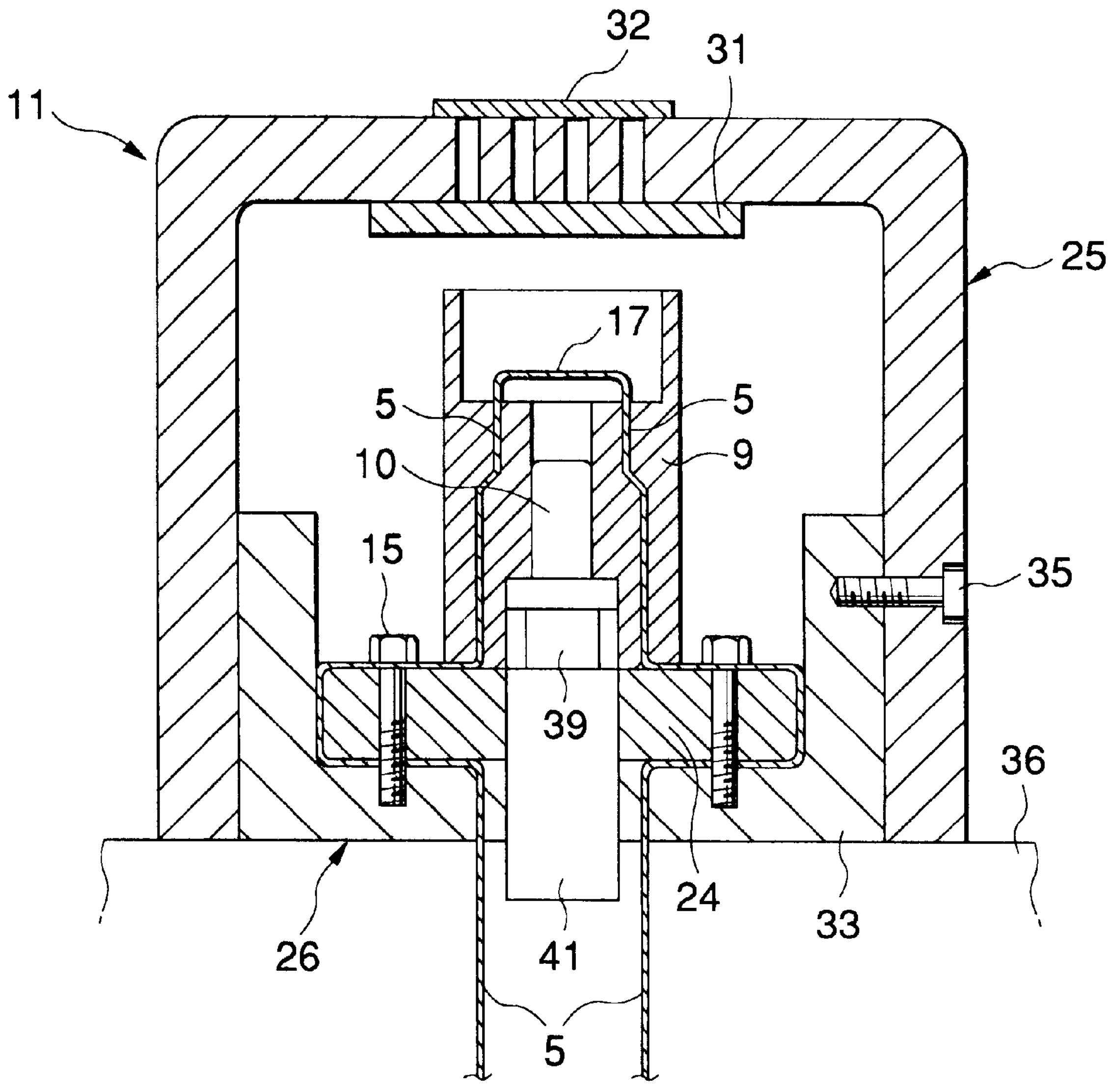
FIG. 37 is a cross-sectional view showing another example of the electric circuit breaker in accordance with the fourth embodiment of the present invention.

As shown in FIG. 37, both ends of the lead wire 5 connected to the target area 17 are extended so as to run along the lower surface of the hold member 9, the upper surface, side surfaces, and lower surface of the bottom plate 24, so that the ends of the lead wire 5 are led to the is outside of the lower cover 26 through the bottom wall 33. Further, the lead wire 5 may be fixed on the bottom plate 24 and the bottom 33 of the lower cover 26 by means of the mount bolts 15.

Figure 38:
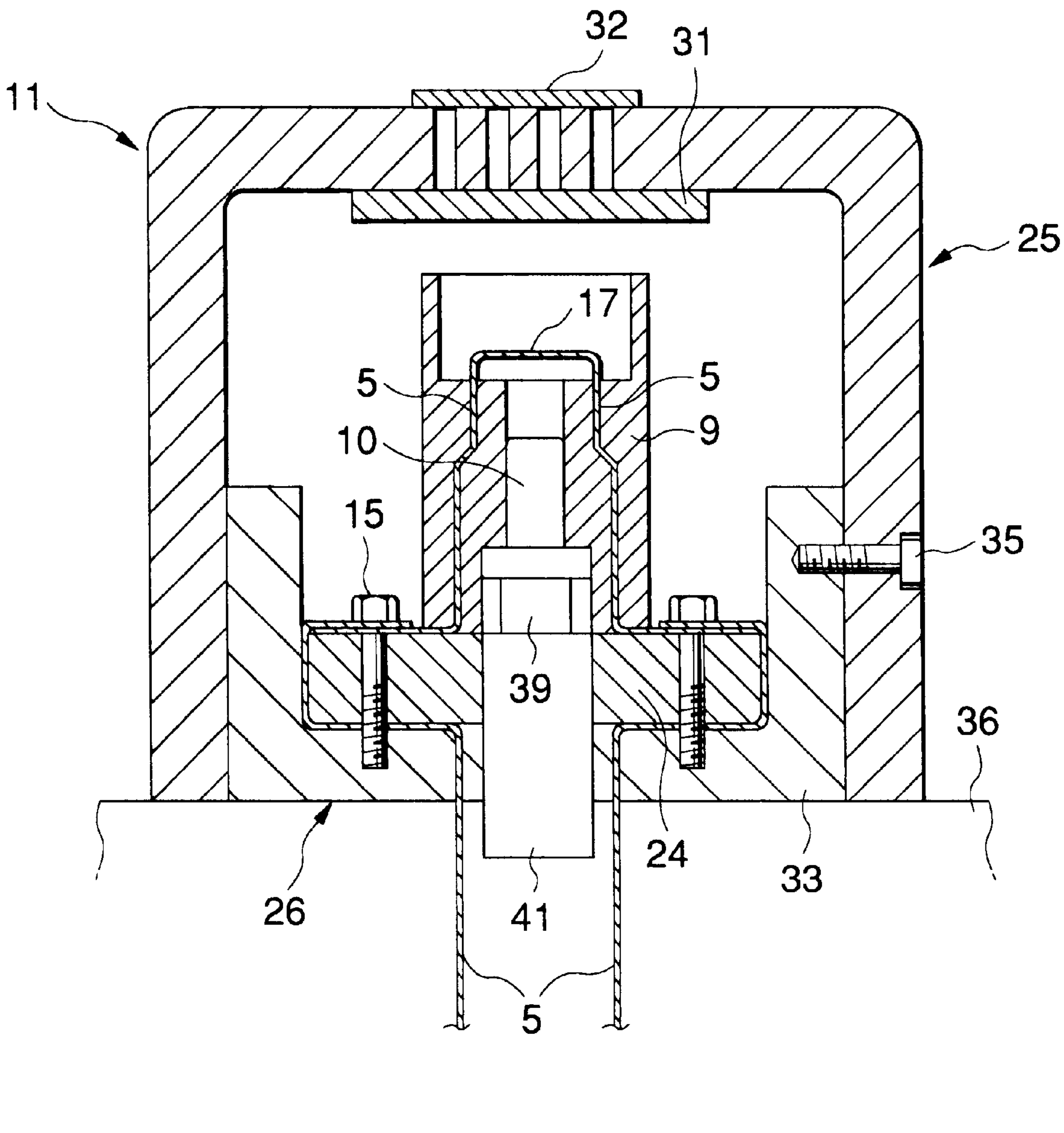
FIG. 38 is a cross-sectional view showing still another example of the electric circuit breaker in accordance with the fourth embodiment of the present invention.

With the foregoing structure, the interval between both ends of the lead wire 5 regulated by means of connectors provided in the mount 36 of the vehicle body may be different from the interval between both ends of the lead wire 5 regulated by the insert holes formed in the hold member 9. Even in such a case, the present invention has the advantage of enabling proper routing of the lead wire 5. Alternatively, as shown in FIG. 38, the upper portion of the lead wire 5 and the lower portion of the same may be formed separately from each other. The thus-formed upper and lower portions of the lead wire 5 may be connected together by overlapping the ends of the upper and lower portions each other at the positions where the mount bolts 15 will be fixed.

Figure 39:
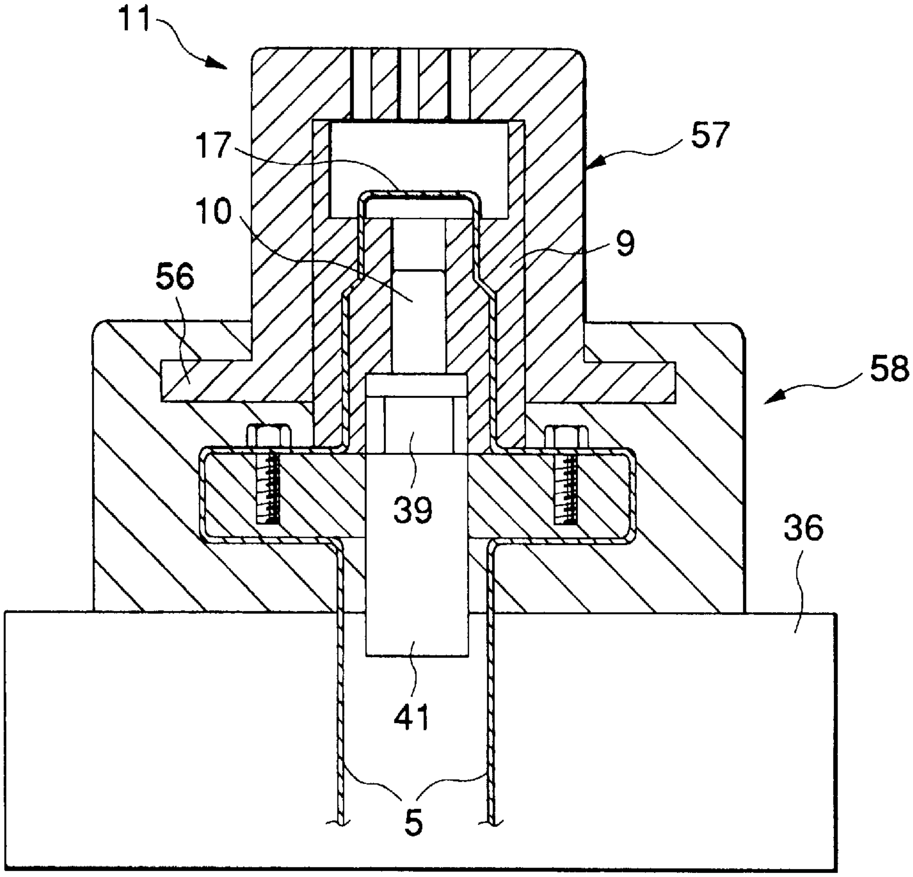
FIG. 39 is a cross-sectional view showing another example of the housing.

As shown in FIG. 39, an upper cover 57 which has a horizontally-protruding flange 56 at the lower end is fitted so as to cover the hold member 9 of the explosive sealing section 10 from outside. A lower cover 58 is molded from synthetic resin in such a way as to integrally surround the lower portion of the upper cover 57 and the outer portion of the bottom plate 24. With such a structure, bonding strength and air-tightness between the upper cover 57, the bottom plate 24, and the lower cover 58 can be effectively improved.

Figure 40:
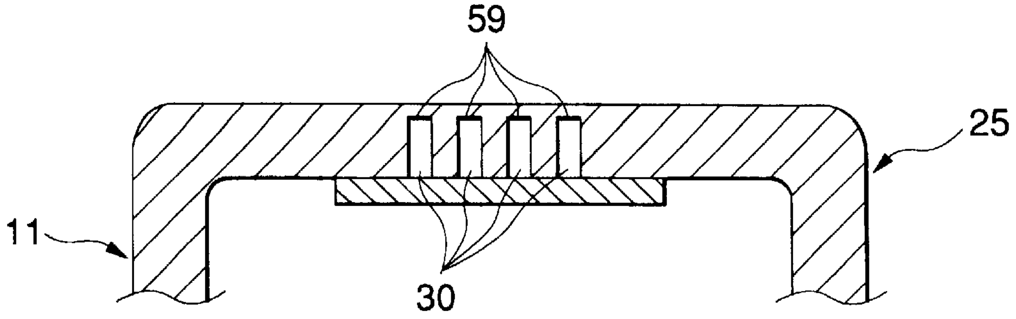
FIG. 40 is a cross-sectional view showing still another example of the housing.

In the previous embodiment, the explanation has been given of the case where the air-release holes 30 formed in the top plate 29 of the upper cover 25 are covered with the separate waterproof sheet 32 is labeled to the top plate 29. However, as shown in FIG. 40, a closing section 59 for closing the upper ends of the air-release holes 30 may be integrally formed in the top plate 29 of the upper cover 25. The closing section 59 may be broken by means of the blasting force of the explosive 21, thereby allowing communication between the inside and outside of the housing 11 through the air-release holes 30.

In the previous embodiment, the explanation has been given of the case where the lead wires 19, 19 of the explosive sealing section 10 are inserted into the upper portion of the female connector 39 connected to the detonating means provided in the housing 11, and the male connector 41 is coupled to the lower portion of the female connector 39. The male connector 41 may be coupled to the lateral side of the female connector 39. Further, the male connector 41 may be positioned in the housing 11, and the female connector 39 connected to the power-application control section may be coupled to the male connector 41.

Further, in place of the foregoing embodiment in which the coupling connector 37 is directly connected to the housing 11 of the circuit break section 6, the explosive sealing section 10 may be connected to the coupling connector 37 via lead wires 60 led out of the explosive sealing section 10 with a circuit configuration such as that shown in FIG. 1. As a result, the coupling connector 37 can be positioned aside from the location of the circuit break section 6. With such a configuration, the structure of the housing 11 may be simplified, and the sealing characteristics of the explosive sealing section 10 may be readily improved. Further, there is the advantage of arbitrary positioning of the coupling connector 37.

A vehicle load which is desirably maintained in an active state at the time of collision of a vehicle; e.g., a vehicle load 1*a* such as a room lamp or hazard flashers used for indicating that the vehicle is a hazard, is desirably connected to the power line 5 in an upstream position with respect to the location of the circuit breaker 6, thereby ensuring supply of an electric current to the vehicle load 1*a* even after the target area 17 of the electric circuit has been broken.

The electric circuit breaker according to the present invention is not limited to vehicle applications but may be applied to various types of electric circuits which are configured so as to interrupt circuitry in the event of an abnormality such as the flow of an overload current or short-circuit current.

As has been mentioned above, in accordance with a fourth aspect of the present invention, there is provided an electric circuit breaker comprising an explosive which breaks a part of the electric circuit by explosion; detonating means for exploding the explosive by application of electric power to the explosive; a pair of lead wires supplying an electric current for detonating purposes to the detonating means; a short-circuit plate for making a short circuit in the lead wires; and release means which releases the lead wires from a short circuit state to their original state by separating the short-circuit plate from the lead wires when the electric circuit breaker is in use. As a result, the explosive can be prevented from erroneously exploding during assembly or inspection under the influence of noise or static electricity stemming from a disturbance. When the electric circuit breaker is in use, the lead wires are released from a short-circuit state, and the electric current for detonating purposes is supplied at the time of collision of a vehicle by connection of the leads connected to the power source for detonating purposes with the detonating means, to thereby enable immediate explosion of the explosive. As a result, a part of the electric circuit is broken by the blasting force of the explosive, thereby instantaneously interrupting the continuity between the power line and the electric wires.

Furthermore, in accordance with the fourth aspect of the present invention, the electric circuit breaker as mentioned above further comprises an area of the electric circuit to be broken; a housing for storing the explosive and the detonating means; a pair of connectors which connect the lead wires connected to the detonating means with another lead wire connected to power-application control means; the connector connected to the detonating means being provided in the housing; the short-circuit plate which makes a short circuit in the pair of lead wires connected to the connector coupled to the detonating means; and the release means which releases the lead wires held in a short circuit state by means of the short-circuit plate to their original state in response to the connection of the lead wires to the connectors. As a result, the terminals of the connector connected to the detonating means can be automatically disconnected from the short-circuit plate as a result of coupling of the connectors, thereby resulting in a remarkable improvement in the ease of assembly of the electric circuit breaker.

Moreover, in accordance with the fourth aspect of the invention, the connector provided in the housing is fixed to the housing through use of sealing material comprising synthetic resin material. As a result of sealing of the area where the connector is provided with the sealing material, there is an advantage of being able to effectively prevent moisture from entering the housing through the area where the connector is provided.

Still further, in accordance with the fourth aspect of the invention, a seal ring is provided between the connector provided in the housing and the connector connected to the power-application control means. The joint between the connectors is sealed with the seal ring, and hence moisture can be effectively prevented from entering the housing through the joint.

What is claimed is:

1. A circuit breaker for interrupting an electric circuit of a vehicle, comprising:

circuit break means having an explosive used for blasting a part of the electric circuit by an explosion force and detonating means for exploding the explosive by application of electric power to the explosive;

collision detection means for detecting a collision of the vehicle;

control means which explodes the explosive by supply of an electric current for detonating purposes to the detonating means in response to a detection signal from the collision detection means;

direction means for directing the explosion force towards the part of the electric circuit to be blasted;

a housing which is made of insulating material and includes a cylindrical section having at least one opening in one direction and a cover for covering the opening of the cylindrical section in such a way as to ensure conductor storage space between the opening and the cover;

wherein the part of the circuit to be broken is disposed in front of the opening of the cylindrical section within the conductor storage space;

said circuit break section is provided in the cylindrical section;

the circuit is broken by means of blasting force of the explosive, wherein the housing comprises a housing body including an outer sheath, the outer sheath having an opening which permits communication between the inside and outside of the housing and the cover; a cylindrical member including an inner cylindrical portion, the inner cylindrical portion having an opening in one direction and being inserted into the outer sheath while the opening is directed toward the inside of the housing body; and wherein said explosive is loaded into the inner cylindrical portion.

2. A circuit breaker as claimed in claim 1, wherein the explosive is positioned so as to break a part of a power line connecting a vehicle power source with a collection section of electric wires connected to a plurality of vehicle loads.

3. A circuit breaker as claimed in claim 1, wherein the explosive is positioned so as to break a fusible link connected across a power line which connects a vehicle power source with a collection section of electric wires connected to a plurality of vehicle loads.

4. A circuit breaker as claimed in claim 3, wherein both ends of said part of the circuit to be broken are connected to connector terminals, portions between the part to be broken and the connector terminals being provided so as to pass through the housing; the connector terminals being led to the outside of the housing.

5. A circuit breaker as claimed in claim 4, wherein an explosive sealing section is formed by encapsulation of the circuit break means into a sealing member, and the explosive sealing section is loaded into the cylindrical section.

6. A circuit breaker as claimed in claim 5, wherein said circuit break means and the sealing member are integrally molded.

7. A circuit breaker as claimed in claim 5, wherein said circuit break means is sealed in a capsule.

8. A circuit breaker as claimed in claim 7, wherein the capsule is formed from resin possessing heat shrinkable properties.

9. A circuit breaker as claimed in claim 4, wherein a small diameter section having a diameter smaller than that of the cylindrical member is interposed between the part to be broken and the circuit break means within the cylindrical section.

10. A circuit breaker as claimed in claim 9, wherein the inner peripheral surface of the small diameter cylindrical section is tapered toward the part to be broken.

11. A circuit breaker as claimed in 4, further comprising a protective member disposed outside the housing so as to cover the same.

12. A circuit breaker as claimed in claim 11, wherein communication holes are formed in said cover so as to permit communication between the inside and outside of the cover.

13. A circuit breaker as claimed in claim 12, further comprising a filter on the cover so as to cover the communication holes.

14. A circuit breaker as claimed in claim 12, further comprising a waterproof section for covering the communication holes ensured in the cover section, and the waterproof section being breakable by means of the blasting force of the explosive.

15. A circuit breaker as claimed in claim 10, wherein the housing body comprises a bottom plate for covering the lower surface of the cylindrical member into which the explosive is loaded, an upper cover for covering the bottom plate and the cylindrical member from above, and a lower cover for covering the same from below, and the lower end of the upper cover and the upper end of the lower cover are joined together while they are overlapped each other.

16. A circuit breaker as claimed in claim 10, wherein the housing body comprises a bottom plate for covering the lower surface of the cylindrical member into which the explosive is loaded, an upper cover for covering the bottom plate and the cylindrical member from above, and a lower cover for covering the same from below, and the lower cover is integrally formed so as to cover the lower outer surface of the upper cover and the outer surface of the bottom plate.

17. A circuit breaker as claimed in claim 4, wherein the housing or the conductor is fixed on the outer surface of an electric connection box, and the connector terminals are electrically connected to a circuit within the electric connection box.

18. A circuit breaker as claimed in claim 1, further comprising a break member which, as a result of explosion of the explosive, projects toward the part of the circuit to be broken.

19. A circuit breaker as claimed in claim 18, wherein the break member is formed from insulating material.

20. A circuit breaker as claimed in claim 19, further comprising a housing for accommodating the part of the circuit to be broken and the circuit break means, and a hold section formed in said housing, which holds the break member projected as a result of the explosion of the explosive; and wherein after having been broken, the part to be broken is held in a separated state by means of the break member retained by the hold member.

21. A circuit breaker as claimed in claim 20, further comprising:

a housing for storing the part of the circuit to be broken and the circuit break means;

a pair of connectors which connect the lead wires connected to the detonating means with another lead wire connected to power-application control means;

the connector connected to the detonating means being provided in the housing;

the short-circuit plate which makes a short circuit in the pair of lead wires connected to the connector coupled to it the detonating means; and the release means which releases the lead wires held in a short circuit state by means of the short-circuit plate to their original state in response to the connection of the lead wires to the connectors.

22. A circuit breaker as claimed in claim 21, wherein the connector provided in the housing is fixed to the housing through use of sealing material comprising synthetic resin material.

23. A circuit breaker as claimed in claim 21, wherein a seal ring is provided between the connector provided in the housing and the connector connected to the power-application control means.

24. A circuit breaker for interrupting an electric circuit of a vehicle, comprising:

circuit break means having an explosive used for blasting a part of the electric circuit by explosion and detonating means for exploding the explosive by application of electric power to the explosive;

collision detection means for detecting a collision of the vehicle;

control means which explodes the explosive by supply of an electric current for detonating purposes to the detonating means in response to a detection signal from the collision detection means;

a pair of lead wires which supply an electric current for detonating purposes to the detonating means;

a short-circuit plate for making a short circuit in the lead wires; and release means which releases the lead wires from a short circuit state to an original state by separating the short-circuit plate from the lead wires when the electric circuit breaker is in use.

25. A circuit breaker for interrupting an electric circuit for a vehicle, comprising:

circuit break means having an explosive used for blasting a part of the electric circuit by explosion and detonating means for exploding the explosive by application of electric power to the explosive;

collision detection means for detecting a collision of the vehicle;

control means which explodes the explosive by supply of an electric current for detonating purposes to the detonating means in response to a detection signal from the collision detection means; and a housing which is made of insulating material and includes a cylindrical section having at least one opening in one direction and a cover for covering the opening of the cylindrical section in such a way as to ensure conductor storage space between the opening and the cover, wherein the part of the circuit to be broken is disposed in front of the opening of the cylindrical section within the conductor storage space and said circuit break means is provided in the cylindrical section, the housing comprises a housing body including an outer sheath, the outer sheath having an opening which permits communication between the inside and outside of the housing and the cover, a cylindrical member including an inner cylindrical portion, the inner cylindrical portion having an opening in one direction and being inserted into the outer sheath while the opening is directed toward the inside of the housing body wherein said explosive is loaded into the inner cylindrical portion, the housing body comprises a bottom plate for covering the lower surface of the cylindrical member into which the explosive is loaded, an upper cover for covering the bottom plate and the cylindrical member from above, and a lower cover for covering the same from below, and the lower end of the upper cover and the upper end of the lower cover are joined together while they overlap each other, wherein the circuit is broken by means of a blasting force of the explosive.

26. A circuit breaker for interrupting an electric circuit of a vehicle, comprising:

circuit break means having an explosive used for blasting a part of the electric circuit by explosion and detonating means for exploding the explosive by application of electric power to the explosive;

collision detection means for detecting a collision of the vehicle;

control means which explodes the explosive by supply of an electric current for detonating purposes to the detonating means in response to a detection signal from the collision detection means; and a housing which is made of insulating material and includes a cylindrical section having at least one opening in one direction and a cover for covering the opening of the cylindrical section in such a way as to ensure conductor storage space between the opening and the cover, wherein the part of the circuit to be broken is disposed in front of the opening of the cylindrical section within the conductor storage space and said circuit break means is provided in the cylindrical section, the housing comprises a housing body including an outer sheath, the outer sheath having an opening which permits communication between the inside and outside of the housing and the cover, a cylindrical member including an inner cylindrical portion, the inner cylindrical portion having an opening in one direction and being inserted into the outer sheath while the opening is directed toward the inside of the housing body, wherein said explosive is loaded into the inner cylindrical portion, the housing body comprises a bottom plate for covering the lower surface of the cylindrical member into which the explosive is loaded, an upper cover for covering the bottom plate and the cylindrical member from above, and a lower cover for covering the same from below, and the lower cover is integrally formed so as to cover the lower outer surface of the upper cover and the outer surface of the bottom plate, wherein the circuit is broken by means of a blasting force of the explosive.

* * * * *